United States Patent
Oh et al.

(10) Patent No.: US 11,962,068 B2
(45) Date of Patent: Apr. 16, 2024

(54) ANTENNA AND ELECTRONIC DEVICE COMPRISING SAME

(71) Applicant: Samsung Electronics Co., Ltd., Suwon-si (KR)

(72) Inventors: Dongjun Oh, Suwon-si (KR); Taeik Kim, Suwon-si (KR); Haeyeon Kim, Suwon-si (KR); Sehyun Park, Suwon-si (KR); Shinho Yoon, Suwon-si (KR); Jonghyuck Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 17/431,861

(22) PCT Filed: Feb. 19, 2020

(86) PCT No.: PCT/KR2020/002374
§ 371 (c)(1),
(2) Date: Aug. 18, 2021

(87) PCT Pub. No.: WO2020/171580
PCT Pub. Date: Aug. 27, 2020

(65) Prior Publication Data
US 2022/0115768 A1    Apr. 14, 2022

(30) Foreign Application Priority Data
Feb. 19, 2019    (KR) .................... 10-2019-0019038

(51) Int. Cl.
*H01Q 1/24*    (2006.01)
*H01Q 5/328*    (2015.01)
(Continued)

(52) U.S. Cl.
CPC ............. *H01Q 1/243* (2013.01); *H01Q 5/328* (2015.01); *H01Q 5/385* (2015.01); *H01Q 21/28* (2013.01);
(Continued)

(58) Field of Classification Search
CPC ........ H01Q 5/385; H01Q 5/328; H01Q 1/243; H01Q 9/42; H01Q 21/28; H04B 1/40; H04M 1/0268; H04M 1/0216
See application file for complete search history.

(56) References Cited

U.S. PATENT DOCUMENTS 9,812,771 B2    11/2017 Sung et al.
9,952,622 B2    4/2018 Kim et al.
(Continued)

FOREIGN PATENT DOCUMENTS

EP    3 439 103 A1    2/2019
KR    10-2017-0020013 A    2/2017
(Continued)

OTHER PUBLICATIONS

Korean Office Action dated Mar. 16, 2023, issued in a counterpart Korean Application No. 10-2019-0019038.
(Continued)

*Primary Examiner* — Hoang V Nguyen
(74) *Attorney, Agent, or Firm* — Jefferson IP Law, LLP

(57) ABSTRACT

An electronic device is provided. The electronic device includes a first housing structure, a second housing structure, and a foldable housing structure for connecting the first housing structure and the second housing structure. The first housing structure and the second housing structure may include a front plate for interconnecting front surfaces with a flexible display, a rear plate which is an opposite surface to the front plate, a side member which surrounds a space between the front plate and the rear plate, and includes at
(Continued)

least in part a conductive portion and an insulating portion, a communication circuit and at least one switch electrically connected to the communication circuit.

20 Claims, 35 Drawing Sheets

(51) Int. Cl.
*H01Q 5/385* (2015.01)
*H01Q 21/28* (2006.01)
*H04B 1/40* (2015.01)
*H04M 1/02* (2006.01)

(52) U.S. Cl.
CPC ............ *H04B 1/40* (2013.01); *H04M 1/0216* (2013.01); *H04M 1/0268* (2013.01); *H04M 1/0277* (2013.01)

(56) References Cited

U.S. PATENT DOCUMENTS

| | | |
|---|---|---|
| 2017/0110786 A1 | 4/2017 | Liu |
| 2017/0229760 A1 | 8/2017 | Karilainen |
| 2017/0244818 A1 | 8/2017 | Kim et al. |
| 2017/0351297 A1 | 12/2017 | Kim et al. |
| 2018/0034135 A1 | 2/2018 | Kwak et al. |
| 2018/0048359 A1 | 2/2018 | Kim et al. |
| 2018/0076507 A1 | 3/2018 | Heo |
| 2018/0095502 A1* | 4/2018 | Yamazaki ............. G06F 1/1681 |
| 2018/0174497 A1 | 6/2018 | Lim |
| 2019/0103656 A1* | 4/2019 | Shi ........................ G06F 1/1683 |
| 2019/0140342 A1 | 5/2019 | Lim et al. |
| 2019/0273307 A1 | 9/2019 | Kwak et al. |
| 2020/0036820 A1 | 1/2020 | Lee et al. |

FOREIGN PATENT DOCUMENTS

| | | |
|---|---|---|
| KR | 10-2017-0098400 A | 8/2017 |
| KR | 10-2017-0120985 A | 11/2017 |
| KR | 10-2017-0136258 A | 12/2017 |
| KR | 10-2018-0014630 A | 2/2018 |

OTHER PUBLICATIONS

European Search Report dated Mar. 7, 2022, issued in European Application No. 20760059.4.
Indian Office Action dated Mar. 31, 2022, issued in Indian Application No. 202117042164.
Indian Hearing Notice dated Mar. 4, 2024, issued in Indian Patent Application No. 202117042164.
Korean Notice of Patent Grant dated Sep. 25, 2023, issued in Korean Patent Application No. 10-2019-0019038.
Chinese Office Action dated Nov. 25, 2023, issued in Chinese Patent Application No. 202080028769.8.

* cited by examiner

|  | LB | | MB | | HB | |
| --- | --- | --- | --- | --- | --- | --- |
|  | A SWITCH (2711) | B SWITCH (2713) | A SWITCH (2711) | B SWITCH (2713) | A SWITCH (2711) | B SWITCH (2713) |
| FIRST CONDUCTIVE ELEMENT (2611) | On | Off | On | Off | - | - |
| SECOND CONDUCTIVE ELEMENT (2612) | - | - | On | On | On | Off |

FIG.27

ANTENNA AND ELECTRONIC DEVICE COMPRISING SAME

CROSS-REFERENCE TO RELATED APPLICATION(S)

This application is a U.S. National Stage application under 35 U.S.C. § 371 of an International application number PCT/KR2020/002374, filed on Feb. 19, 2020, which is based on and claims priority of a Korean patent application number 10-2019-0019038, filed on Feb. 19, 2019, in the Korean Intellectual Property Office, the disclosure of which is incorporated by reference herein in its entirety.

BACKGROUND

1. Field

The disclosure relates to an antenna and an electronic device including the same.

2. Description of Related Art

As electronic communication technology develops, electronic devices having various functions are emerging. These electronic devices may have a convergence function which performs one or more functions in combination.

In recent, as a functional gap for each manufacturer remarkably reduces, the electronic device is reinforcing a design aspect and concurrently becoming slimmer to satisfy consumer's purchase needs.

The above information is presented as background information only to assist with an understanding of the disclosure. No determination has been made, and no assertion is made, as to whether any of the above might be applicable as prior art with regard to the disclosure.

SUMMARY

An electronic device of a rotation type (e.g., a foldable type, a slide type, or a swivel type) in which at least two housings are rotatably operated by a connection unit is emerging. For example, the electronic device of the rotation type may be disposed in a manner of overlapping the at least two housings, and due to this operation, an antenna disposed in one housing may be degraded in radiation performance by a metal member disposed at a corresponding position of the other housing which overlaps it.

Aspects of the disclosure are to address at least the above-mentioned problems and/or disadvantages and to provide at least the advantages described below. Accordingly, an aspect of the disclosure is to provide an antenna for preventing antenna performance degradation caused by overlapping of housings, and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a foldable housing which includes, as a foldable housing, a hinge structure, a first housing structure connected to the hinge structure, and including a first surface facing a first direction, a second surface facing a second direction which is opposite to the first direction, and a first side member which surrounds at least in part a space between the first surface and the second surface, and includes a first conductive unit, a first insulating unit, a second conductive unit, a second insulating unit and a third conductive unit sequentially disposed from the hinge structure, and a second housing structure connected to the hinge structure, including a third surface facing a third direction, a fourth surface facing a fourth direction which is opposite to the third direction, and a second side member which surrounds at least in part a space between the third surface and the fourth surface, and includes a fourth conductive unit, a third insulating unit, a fifth conductive unit, a fourth insulating unit and a sixth conductive unit sequentially disposed from the hinge structure, wherein the second housing structure folds with the first housing structure based on the hinge structure, the first surface faces the third surface in a folded state, the third direction is the same as the first direction in an unfolded state, the first insulating unit and the third insulating unit substantially align in the folded state, and the second insulating unit and the fourth insulating unit substantially align in the folded state, a flexible display extended from the first surface to the third surface, a first printed circuit board disposed between the first surface and the second surface, and including at least one first ground layer, a second printed circuit board disposed between the third surface and the fourth surface, and including at least one second ground layer, at least one wireless communication circuit disposed on the first printed circuit board, and configured to at least one of transmit or receive a first signal of a first frequency band by electrically connecting to a first position, closer to the second insulating unit than the first insulating unit, of the second conductive unit, and a second signal of a second frequency band by electrically connecting to a second position, close to the second insulating unit, of the third conductive unit, and at least one first switch including a first terminal electrically connected to the second ground layer, a second terminal electrically connected to a third position, closer to the fourth insulating unit than the third insulating unit, of the fifth conductive unit, and a third terminal electrically connected to a fourth position, close to the fourth insulating unit, of the sixth conductive unit.

According to various embodiments of the disclosure, a folded state of an electronic device may reduce an influence of at least one conductive unit of a second housing structure on antenna radiation performance of at least one antenna included in a first housing structure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 27 is a table for explaining control on a frequency adjustment circuit of FIG. 26 according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
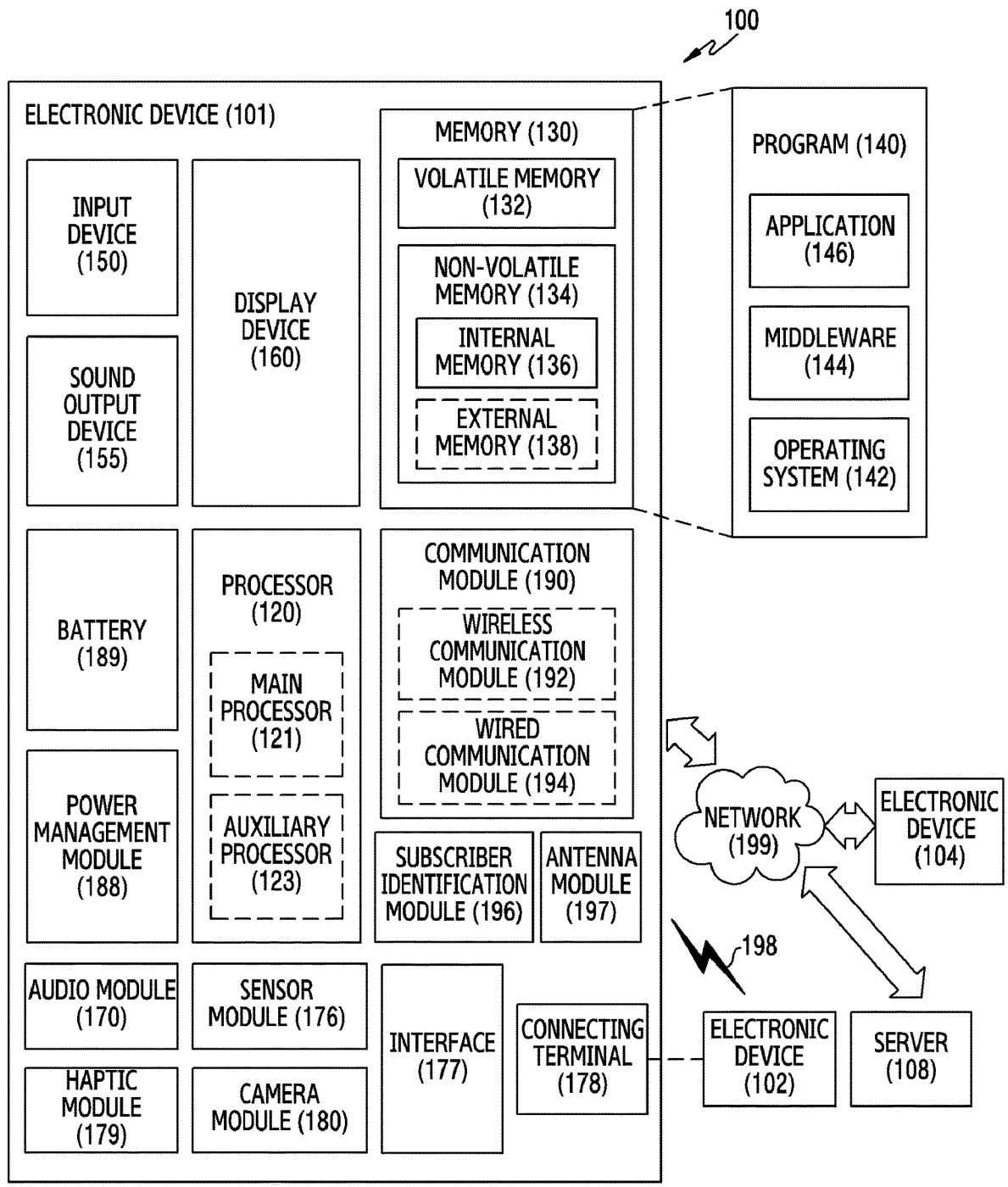
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
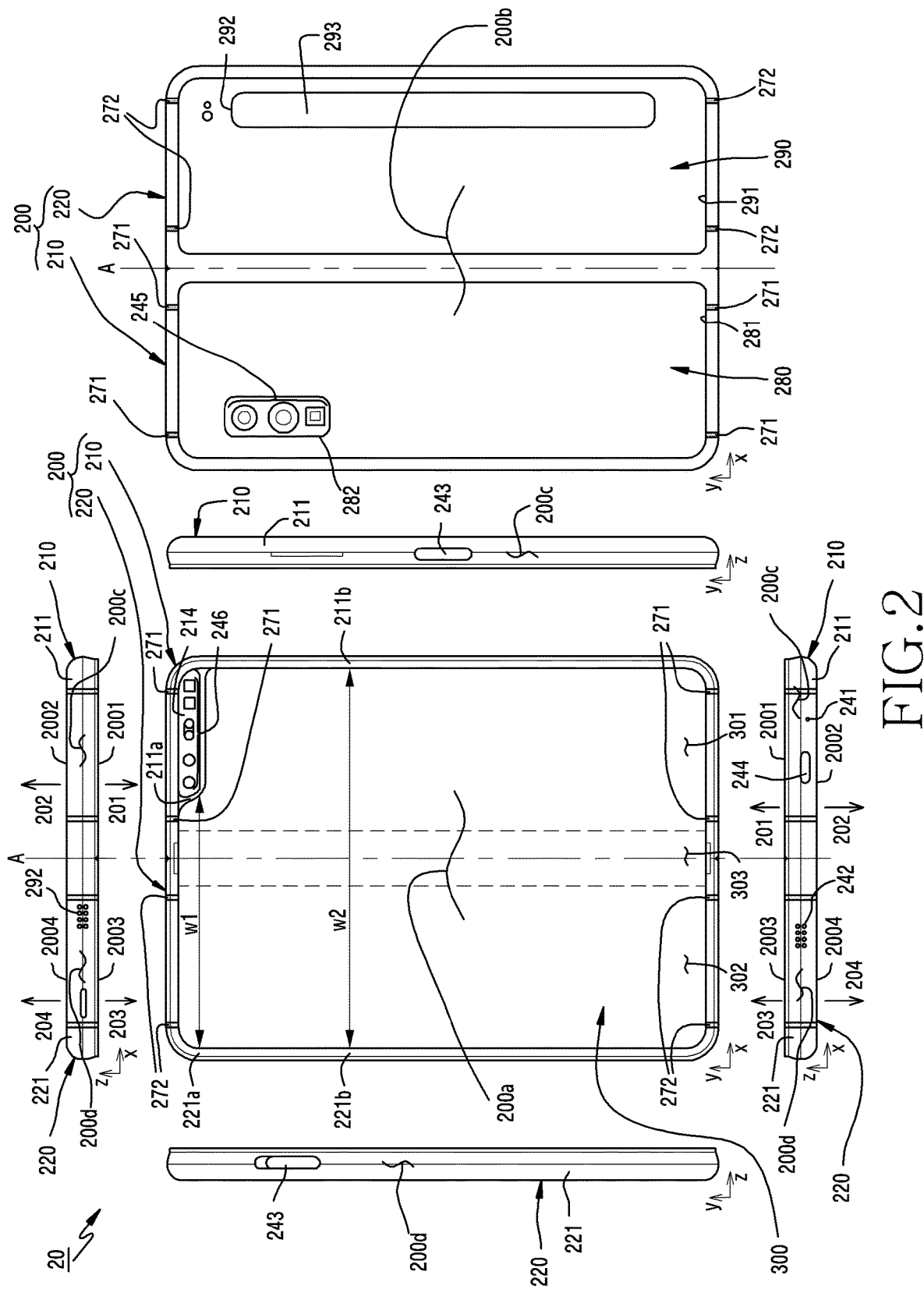
FIG. 2 is a diagram illustrating an unfolded state of an electronic device according to an embodiment of the disclosure.
Figure 3:
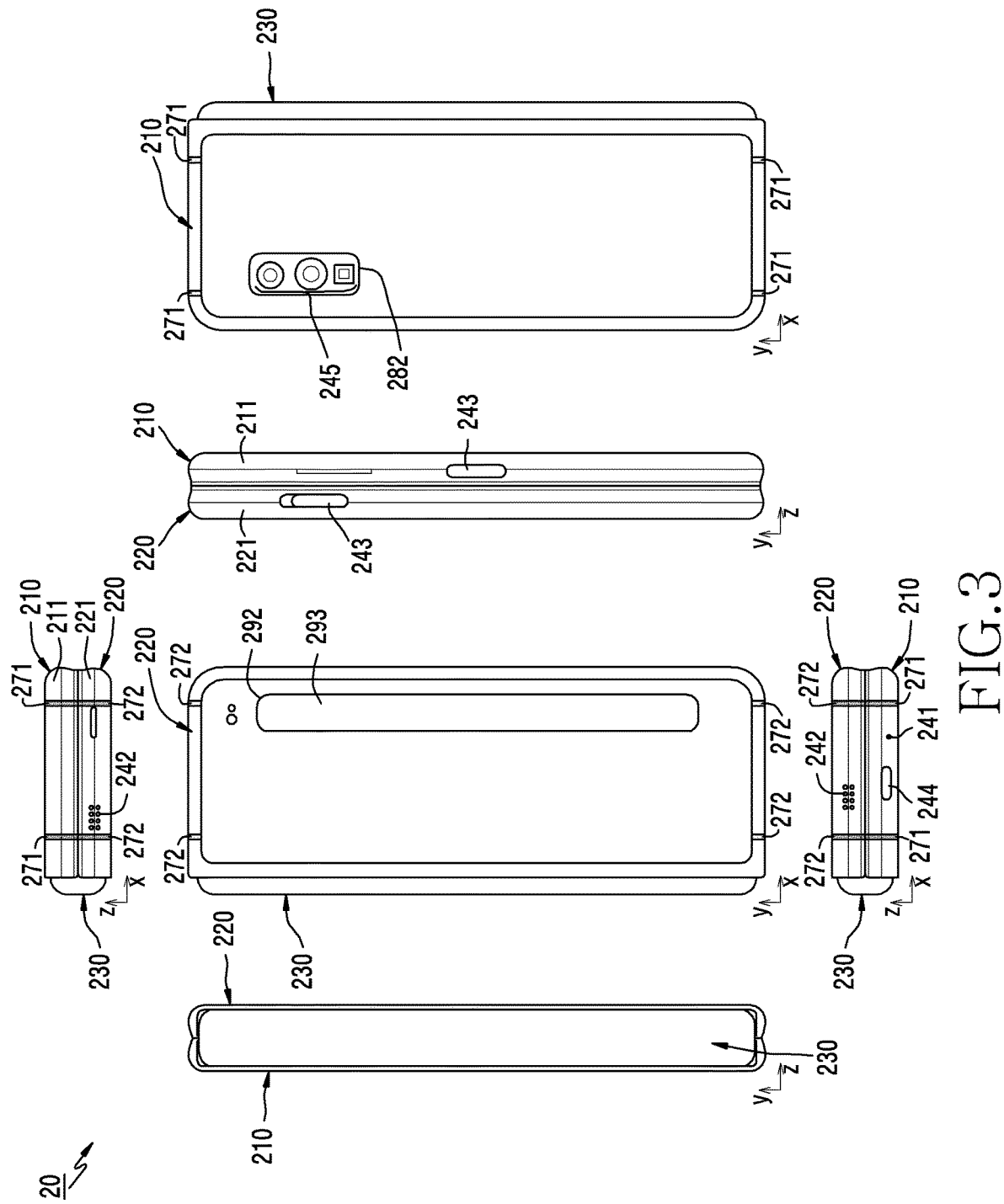
FIG. 3 is a diagram illustrating a folded state of an electronic device according to an embodiment of the disclosure.

FIG. 2 is a diagram illustrating a flat or unfolded state of an electronic device according to an embodiment of the disclosure. FIG. 3 is a diagram illustrating a folded state of an electronic device according to an embodiment of the disclosure.

Referring to FIGS. 2 and 3, in an embodiment, an electronic device 20 (e.g., the electronic device 101 of FIG. 1) may include a foldable housing 200, a hinge cover 230 which covers a foldable unit of the foldable housing 200, and a flexible or foldable display 300 (hereafter, a "display" 300, in short) (e.g., the display device 160 of FIG. 1) disposed in a space formed by the foldable housing 200. According to an embodiment, the foldable housing 200 may include a front surface 200a exposing the display 300, a rear surface 200b facing away from to the front surface 200a, and side surfaces 200c and 200d surrounding a space between the front surface 200a and the rear surface 200b.

According to an embodiment, the foldable housing 200 may include a first housing structure 210 and a second housing structure 220 interconnected by a hinge structure (not shown). For example, in the hinge structure, the first housing structure 210 may be rotatably connected with the second housing structure 220 by the hinge structure.

According to an embodiment, the first housing structure 210 may include a first surface 2001 facing a first direction 201, a second surface 2002 facing a second direction 202 which is opposite to the first direction 201, and a first side surface 200c which surrounds at least part of a space between the first surface 2001 and the second surface 2002. The second housing structure 220 may include a third surface 2003 facing a third direction 203, a fourth surface 2004 facing a fourth direction 204 which is opposite to the third direction 203, and a second side surface 200d which surrounds at least part of a space between the third surface 2003 and the fourth surface 2004. The front surface 200a of the electronic device 20 may include the first surface 2001 and the third surface 2003, and the rear surface 200b of the electronic device 20 may include the second surface 2002 and the fourth surface 2004. In various embodiments (not shown), the first housing structure 210 may refer to a structure which forms part of the first surface 2001, the second surface 2002, and the first side surface 200c. In various embodiments (not shown), the second housing structure 220 may refer to a structure which forms part of the third surface 2003, the fourth surface 2004, and the second side surface 200d.

According to an embodiment, the foldable housing 200 may include a transparent plate (not shown) (e.g., a polymer plate including various coating layers) forming the first side 2001 and the third side 2003. The display 300 may be disposed along the transparent plate, and exposed through the first surface 2001 and the third surface 2003. The transparent plate may have flexibility allowing a folded state of the electronic device 20. According to an embodiment, the display 300 may be implemented to include the transparent plate, and the transparent plate may be omitted from the foldable housing 200.

According to an embodiment, the first housing structure 210 may include a first rear cover 280 disposed on one side of a folding axis A to form at least part of the second surface 2002. For example, the first rear cover 280 may have a substantially rectangular periphery 281, and the periphery 281 may be surrounded by a first side member 211. According to various embodiments, the first side member 211 and the first rear cover 280 may be integrally formed, and may include the same material.

According to an embodiment, the second housing structure 220 may include a second rear cover 290 disposed on the other side of the folding axis A to form at least part of the fourth surface 2004. For example, the second rear cover 290 may have a substantially rectangular periphery 291, and the periphery 291 may be surrounded by a second side member 221. According to various embodiments, the second side member 221 and the second rear cover 290 may be integrally formed, and may include the same material.

According to various embodiments, the first rear cover 280 and/or the second rear cover 290 may be formed with, for example, a coated or colored glass, a ceramic, a polymer, a metal (e.g., aluminum, stainless steel (STS), or magnesium), or a combination of at least two of those materials.

According to an embodiment, the first rear cover 280 and the second rear cover 290 may have a substantially symmetrical shape based on the folding axis A. The first rear cover 280 and the second rear cover 290 do not necessarily have the mutually symmetrical shape, and the first rear cover 280 and/or the second rear cover 290 of other various shapes may be provided in another embodiment.

According to an embodiment, the first housing structure 210 may include the first side member (or a first side bezel structure) 211 which forms the first side surface 200c, and the second housing structure 220 may include the second side member (or a second side bezel structure) 221 which forms the second side surface 200d. The first side member 211 and/or the second side member 221 may include a metal or a polymer.

According to various embodiments, the first side member 211 and the second side member 221 may extend to form a periphery region of the front surface 200a. For example, the front surface 200a of the electronic device 20 may be formed by the display 300, a partial area of the first side member 211 adjacent to the display 300 and a partial area of the second side member 221.

According to various embodiments, a partial area (not shown) adjacent to the periphery 281 of the first rear cover 280 in the first side member 211, and/or a partial area (not shown) adjacent to the periphery 291 of the second rear cover 290 in the second side member 221 may form part of the rear surface 200b. For example, the rear surface 200b of the electronic device 20 may be formed by the first rear cover 280, a partial area of the first side member 211 adjacent to the first rear cover 280, the second rear cover 290 and a partial area of the second side member 221 adjacent to the second rear cover 290.

According to an embodiment, the first side member 211 and the second side member 221 may be disposed on both sides based on the folding axis A, and may have a shape which is generally symmetric with respect to the folding axis A.

According to an embodiment, the first housing structure 210 may further include a component mounting area 214 extending from the first side member 211 or coupled with the first side member 211 to form the first surface 2001 with the display 300. Other area than the component mounting area 214 in the first side member 221 may have a shape mutually symmetric with the second side member 221. At least one component utilizing the first surface 2001 may be disposed in the component mounting area 214. According to an embodiment, the component mounting area 214 may be formed to have a set area adjacent to one corner of the first side member 211. According to various embodiments, the arrangement, the shape, and the size of the component mounting area 214 are not limited to the illustrated example. For example, in another embodiment, the component mounting area 214 may be included in other corner of the first side member 211 or in an arbitrary area between an upper corner and a lower corner. Components for performing various functions embedded in the electronic device 20 may be exposed to the first surface 2001 through the component mounting area 214, or through one or more openings (not shown) provided in the component mounting area 214. According to an embodiment, a component 246 disposed in the component mounting area 214 may include at least one of various sensors such as a proximity sensor, a front camera, a light emitting device, and a receiver. For example, the light emitting device may provide state information of the electronic device 20 in the form of light. In another embodiment, the light emitting device may provide a light source interworking with, for example, an operation of the front camera. The light emitting device may include, for example, a light emitting diode (LED), an infrared (IR) LED, and a xenon lamp.

According to an embodiment, the electronic device 20 may include at least one or more of audio modules 241 and 242, a key input device 243 or a connector hole 244.

According to an embodiment, the audio modules 241 and 242 may include a microphone hole 241 or a speaker hole 242. A microphone for acquiring external sound may be disposed inside the microphone hole 241, and a plurality of microphones may be disposed to detect a sound direction in some embodiment. The speaker hole 242 may include an external speaker hole or a call receiver hole. In some embodiment, the speaker hole 242 and the microphone hole 241 may be implemented as a single hole, or a speaker may be included without the speaker hole 242 (e.g., a piezo speaker).

According to an embodiment, the key input device 243 may be disposed on the side surface 200c and 200d of the folder housing 200. In another embodiment, the electronic device 20 may not include part or whole of the key input device 243 mentioned above, and the key input device 243 which is not included may be implemented in a different form such as a soft key on the display 300. In some embodiment, the key input device may include a sensor module (e.g., one or more components 245 disposed on the first rear area 282) disposed on the second surface 2002 of the first housing structure 210.

According to an embodiment, the connector hole 244 may include a first connector hole for accommodating a connector (e.g., a USB connector) for transmitting and receiving power and/or data to and from an external electronic device, and/or a second connector hole (e.g., an earphone jack) for accommodating a connector for transmitting and receiving an audio signal to and from an external electronic device. The position or number of the connector holes is not limited to the example shown in FIG. 3 and may be formed differently.

In another embodiment (not shown), a back surface of a screen display area of the display 300 may include at least one or more of an audio module (e.g., a receiver for a call), a sensor module (e.g., a proximity sensor, or a fingerprint sensor), a camera module (e.g., a front camera) or a light emitting device. In another embodiment (not shown), the display 300 may be coupled to or disposed close to a touch sensing circuit, a pressure sensor for measuring a touch intensity (pressure), and/or a digitizer for detecting a stylus pen of a magnetic field type.

In an embodiment, the first housing structure 210 and the second housing structure 220 may form a recess which is a space for mounting the display 300. In the embodiment shown, due to the component mounting area 214, the recess may have two or more different widths in a direction perpendicular to the folding axis A.

For example, the recess may include a first width w1 between a first unit 221a parallel to the folding axis A of the second side member 221 and a first unit 211a formed at the periphery of the component mounting area 214 of the first side member 211. The recess may include a second width w2 between a second unit 221b of the second side member 221 and a second unit 211b not corresponding to the component mounting area 214 of the first side member 211 and parallel to the folding axis A. The second width w2 may be formed longer than the first width w1. According to an embodiment, the first unit 211a of the first housing structure 210 and the first unit 221a of the second housing structure 220 having the asymmetric shape may form the first width w1 of the recess, and the second unit 211b of the first housing structure 210 and the second unit 221b of the second housing structure 220 having the symmetrical shape may form the second width w2. According to an embodiment, the first unit 221a and the second unit 221b of the second housing structure 220 may have different distances from the folding axis A. The width of the recess is not limited to the illustrated example. According to various embodiments, the recess may have a plurality of widths due to the shape of the component mounting area 214 or the portion having the asymmetric shape of the first housing structure 210 and the second housing structure 220.

According to various embodiments, one or more components may be disposed or visually exposed on the rear surface 200b of the electronic device 20. For example, at least part of a sub display 293 may be visually exposed through the second rear area 292 of the second rear cover 290. For example, one or more components 245 may be visually exposed through the first rear area 282 of the first rear cover 280. In various embodiments, the one or more components 245 may include a sensor (e.g., a proximity sensor, a heart rate sensor) and/or a rear camera.

Referring to FIG. 3, the hinge cover 230 may be disposed between the first housing structure 210 and the second housing structure 220, to cover an internal component (e.g., the hinge structure). According to some embodiment, the hinge structure may be referred to as an element including the hinge cover 230. In an embodiment, the hinge cover 230 may be covered by part of the first housing structure 210 and the second housing structure 220, or exposed to the outside, according to the state (e.g., the unfolded state or the folded state) of the electronic device 20.

For example, if the electronic device 20 is in the unfolded state as shown in FIG. 2, the hinge cover 230 may be covered by the first housing structure 210 and the second housing structure 220 and not exposed. For example, if the electronic device 20 is in the folded state (e.g., in a fully folded state) as shown in FIG. 3, the hinge cover 230 may be exposed to the outside between the first housing structure 210 and the second housing structure 220. For example, if the electronic device 20 is in an intermediate state in which the first housing structure 210 and the second housing structure 220 are folded with a certain angle (e.g., a state between the unfolded state and the folded state), the hinge cover 230 may be partially exposed to the outside between the first housing structure 210 and the second housing structure 220. The exposed area of the hinge cover 230 in the intermediate state may be smaller than the exposed area of the hinge cover 230 in the fully folded state. In an embodiment, the hinge cover 230 may include a curved surface, and the curved surface may form one side surface of the electronic device 20 in the folded state.

According to various embodiments, the display 300 may indicate a display in which at least some area may be transformed into a flat surface or a curved surface. In an embodiment, referring to FIG. 2, the display 300 may include a folding area 303, a first area 301 disposed on one side (a right side of the folding area 303) based on the folding area 303 and a second area 302 disposed on the other side (a left side of the folding area 303).

According to various embodiments, the area division of the display 300 shown in FIG. 2 is exemplary, and the display 300 may be divided into a plurality of (e.g., 4 or more or 2) areas according to its structure or function. For example, the area of the display 300 may be divided by the folding area 303 extending in parallel to the y axis or the folding axis A in the embodiment shown in FIG. 2, but the display 300 may be divided based on other folding area (e.g., a folding area parallel to the x axis) or another folding axis (e.g., a folding axis parallel to the x axis) in another embodiment.

According to an embodiment, the first area 301 and the second area 302 of the display 300 may have a shape symmetrical on the whole based on the folding area 303. According to an embodiment, unlike the first area 301, the second area 302 may include a cut notch according to the presence of the component mounting area 214, but other areas may have a symmetrical shape based on the first area 301 and the folding area 303. For example, the first area 301 and the second area 302 may include a portion having the symmetrical shape based on the folding area 303, and a portion having the asymmetrical shape.

According to an embodiment, the angle or distance formed by the first housing structure 210 and the second housing structure 220 may vary depending on the unfolded state, the folded state or the intermediate state of the foldable housing 200. Hereinafter, operations of the first housing structure 210 and the second housing structure 220 and each area of the display 300 according to the state (e.g., the unfolded state and the folded state) of the electronic device 20 are described.

According to an embodiment, if the electronic device 20 is in the unfolded state (e.g., see FIG. 2), the first direction 201 of the first surface 2001 of the first housing structure 210 and the third direction 203 of the third surface 2003 of the second housing 220 may be the same. For example, in the unfolded state, the first surface 2001 of the first housing structure 210 and the third surface 2003 of the second housing structure 220 may be disposed to form the angle of about 180 degrees and to face the same direction (e.g., the direction of the front surface 200a of the electronic device 20). If the electronic device 20 is unfolded, a surface of the first area 301 and a surface of the second area 302 of the display 300 may form the angle of about 180 degrees and face the same direction (e.g., the direction of the front surface 200a of the electronic device 20). The folding area 303 of the display 300 may form the same plane as the first area 301 and the second area 302.

In an embodiment, if the electronic device 20 is folded (e.g., see FIG. 3), the first housing structure 210 and the second housing structure 220 may be disposed to face each other. For example, in the folded state, the first surface 2001 of the first housing structure 210 and the third surface 2003 of the second housing 220 may face each other. In the folded state, the surface of the first area 301 and the surface of the second area 302 of the display 300 may form a narrow angle (e.g., between about 0 degree and 10 degrees), and face each other. In the folded state, at least part of the folding area 303 may be formed as a curved surface having a certain curvature.

In an embodiment, if the electronic device 20 is in the intermediate state (e.g., the state between the unfolded state and the folded state), the first housing structure 210 and the second housing structure 220 may be disposed at a certain angle. In the intermediate state, the first surface 2001 of the first housing structure 210 and the third surface 2003 of the second housing structure 220, or the surface of the first area 301 and the surface of the second area 302 of the display 300 may form an angle which is greater than the folded state and smaller than the unfolded state. In the intermediate state, at least part of the folding area 303 may be formed as a curved surface having a certain curvature, wherein the curvature may be smaller than that of the folded state.

According to an embodiment, the first side member 211 may include a plurality of first conductive units (not shown) physically or electrically separated. Nonconductive members 271 may be disposed between the plurality of the first conductive units. According to an embodiment, the nonconductive members 271 may extend from a first nonconductive internal structure (not shown) disposed inside the first housing structure 210. The first internal structure may be coupled with the first side member 211, and thus the plurality of the first conductive units may be physically separated by the first internal structure. For example, the first internal structure may be formed to be coupled with the first side member 211 by insert injection.

According to an embodiment, the second side member 221 may include a plurality of second conductive units (not shown) physically or electrically separated. Nonconductive members 272 may be disposed between the plurality of the second conductive units. According to an embodiment, the nonconductive members 272 may extend from a second nonconductive internal structure (not shown) disposed inside the second housing structure 220. The second internal structure may be coupled with the second side member 221, and thus the plurality of the second conductive units may be physically separated by the second internal structure. For example, the second internal structure may be formed to be coupled with the second side member 221 by the insert injection.

According to an embodiment, at least one of the plurality of the first conductive units of the first side member 211 may be electrically connected to a wireless communication circuit (e.g., the wireless communication module 192 of FIG. 1) and utilized as an antenna radiator (or a radiator, or an antenna) for transmitting or receiving a signal having a selected (or designated) frequency. For example, at least one first conductive unit may be electrically connected to the wireless communication circuit and the ground to operate as an inverted F antenna (IFA). According to some embodiment, at least one of the plurality of the second conductive units of the second side member 221 may be electrically connected to the wireless communication circuit and utilized as an antenna radiator.

Referring to FIG. 3, if the electronic device 20 is folded, the second side member 221 and the first side member 211 are adjacent to each other, and wireless communication using at least one of the first conductive units as the antenna radiator may be electrically affected by the second side member 221. For example, in the folded state, the second side member 221 may deteriorate wireless communication performance (e.g., antenna radiation performance) which utilizes at least one of the first conductive units as the antenna radiator. For example, electromagnetic wave energy (or electromagnetic field) emitted from at least one of the first conductive units utilized as the antenna radiator may be disrupted by the second side member 221. According to an embodiment, to reduce this electrical influence, the nonconductive members 271 of the first side member 211 and the nonconductive members 272 of the second side member 221 may be designed to align substantially with each other in the folded state.

Referring to FIG. 3, the nonconductive members 271 of the first side member 211 and the nonconductive members 272 of the second side member 221 may be substantially aligned with each other in the folded state and the antenna radiation performance may be improved, but it may be difficult to secure the antenna radiation performance over a set value due to electromagnetic coupling between the first conductive unit and the second conductive unit which are adjacent each other. For example, parasitic resonance may be generated in the second conductive unit by the electric field emitted from the first conductive unit utilized as the antenna radiator in the folded state, and this parasitic resonance (or parasitic component) may degrade the antenna radiation performance in the wireless communication utilizing at least one first conductive unit as the antenna radiator. For example, capacitance may be generated between the first conductive unit and the second conductive unit in the folded state by electromagnetic coupling, and the electromagnetic wave energy (or the electromagnetic field) emitted from the first conductive unit utilized as the antenna radiator may be induced to the second conductive unit. Unlike a forward current flowing in the first conductive unit, a reverse current may be generated in the second conductive unit by the induced electromagnetic wave energy, and thus the antenna radiation performance may be degraded in the wireless communication utilizing at least one of the first conductive units as the antenna radiator. According to an embodiment, the electronic device 20 may include a frequency adjustment circuit for reducing the deterioration of the antenna radiation performance for at least one first conductive unit by the second side member 221 in the folded state. The frequency adjustment circuit may include an electrical element such as inductance, capacitance or conductance in a transmission line for the antenna radiator (e.g., at least one first conductive unit).

According to various embodiments, the hinge structure (e.g., the hinge cover 230) may include at least one third conductive unit. At least one third conductive unit of the hinge structure may be electrically connected to the wireless communication circuit (e.g., the wireless communication module 192 of FIG. 1) and utilized as the antenna radiator.

Figure 4:
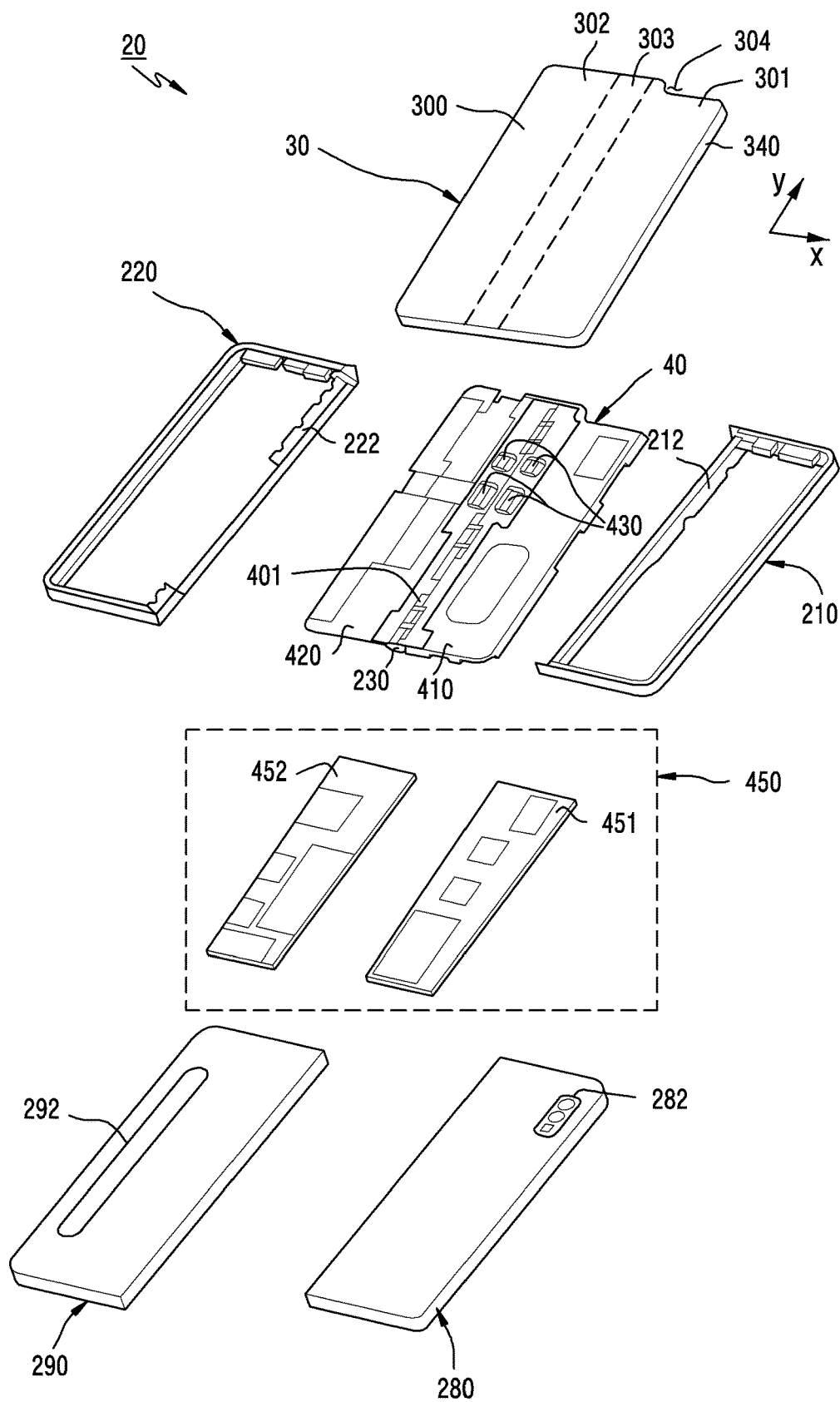
FIG. 4 is an exploded perspective view of an electronic device of FIG. 2 or 3 according to an embodiment of the disclosure.

FIG. 4 is an exploded perspective view of the electronic device 20 of FIG. 2 or 3 according to an embodiment of the disclosure.

Referring to FIG. 4, in an embodiment, the electronic device 20 may include a display unit 30, a support member assembly 40, a substrate unit 450, a first housing structure 210, a second housing structure 220, at least one of a first rear cover 280 or a second rear cover 290. In this document, the display unit 30 may be referred to as a display module or a display assembly.

The display unit 30 may include, for example, a display 300, and one or more plates or layers 340 on which the display 300 is mounted. In an embodiment, the plate 340 may be disposed between the display 300 and the support member assembly 40. The display 300 may be disposed on at least part of one surface (e.g., an upper surface based on FIG. 4) of the plate 340. The plate 340 may be formed in a shape corresponding to the display 300. For example, a partial area of the plate 340 may be formed in a shape corresponding to a notch 304 of the display 300.

According to an embodiment, the support member assembly 40 may include a first support member 410, a second support member 420, a hinge structure 401 disposed between the first support member 410 and the second support member 420, a hinge cover 230 for covering the hinge structure 401 when viewed from outside, and a wiring member 430 (e.g., flexible printed circuit (FPC)) crossing the first support member 410 and the second support member 420.

In an embodiment, the support member assembly 40 may be disposed, between the plate 340 and the substrate unit 450. For example, the first support member 410 may be disposed between a first area 301 of the display 300 and a first substrate (e.g., a first printed circuit board (PCB)) 451. The second support member 420 may be disposed between a second area 302 of the display 300 and a second substrate (e.g., a second PCB) 452.

According to an embodiment, at least part of the wiring member 430 and the hinge structure 401 may be disposed inside the support member assembly 40. The wiring member 430 may be disposed in a direction (e.g., in the x-axis direction) crossing the first support member 410 and the second support member 420. The wiring member 430 may be disposed in a direction (e.g., the x-axis direction) perpendicular to a folding axis (e.g., the y axis or the folding axis A of FIG. 2) of the folding area 303 of the display 300.

According to an embodiment, the substrate unit 450 may include a first substrate 451 disposed on the side of the first support member 410 and a second substrate 452 disposed on the side of the second support member 420. The first substrate 451 and the second substrate 452 may be disposed inside a space formed by the support member assembly 40, the first housing structure 210, the second housing structure 220, the first rear cover 280 and the second rear cover 290. Components for implementing various functions of the electronic device 20 may be mounted on the first substrate 451 and the second substrate 452.

According to an embodiment, the first housing structure 210 and the second housing structure 220 may be assembled to couple with both sides of the support member assembly 40 while the display unit 30 is coupled to the support member assembly 40. According to various embodiments, the first housing structure 210 and the second housing structure 220 may slide on both sides of the support member assembly 40 and be coupled to the support member assembly 40.

In an embodiment, the first housing structure 210 may include a first rotation support surface 212, and the second housing structure 220 may include a second rotation support surface 222 corresponding to the first rotation support surface 212. The first rotation support surface 212 and the second rotation support surface 222 may include a curved surface corresponding to the curved surface included in the hinge cover 230.

In an embodiment, if the electronic device 20 is in the unfolded state (e.g., see FIG. 2), the first rotation support surface 212 and the second rotation support surface 222 may cover the hinge cover 230, and the hinge cover 230 may not be exposed to the rear surface of the electronic device 20 or may be exposed least. If the electronic device 20 is in the folded state (e.g., see FIG. 3), the hinge cover 230 may be exposed to a maximum between the first rotation support surface 212 and the second rotation support surface 222.

Figure 5:
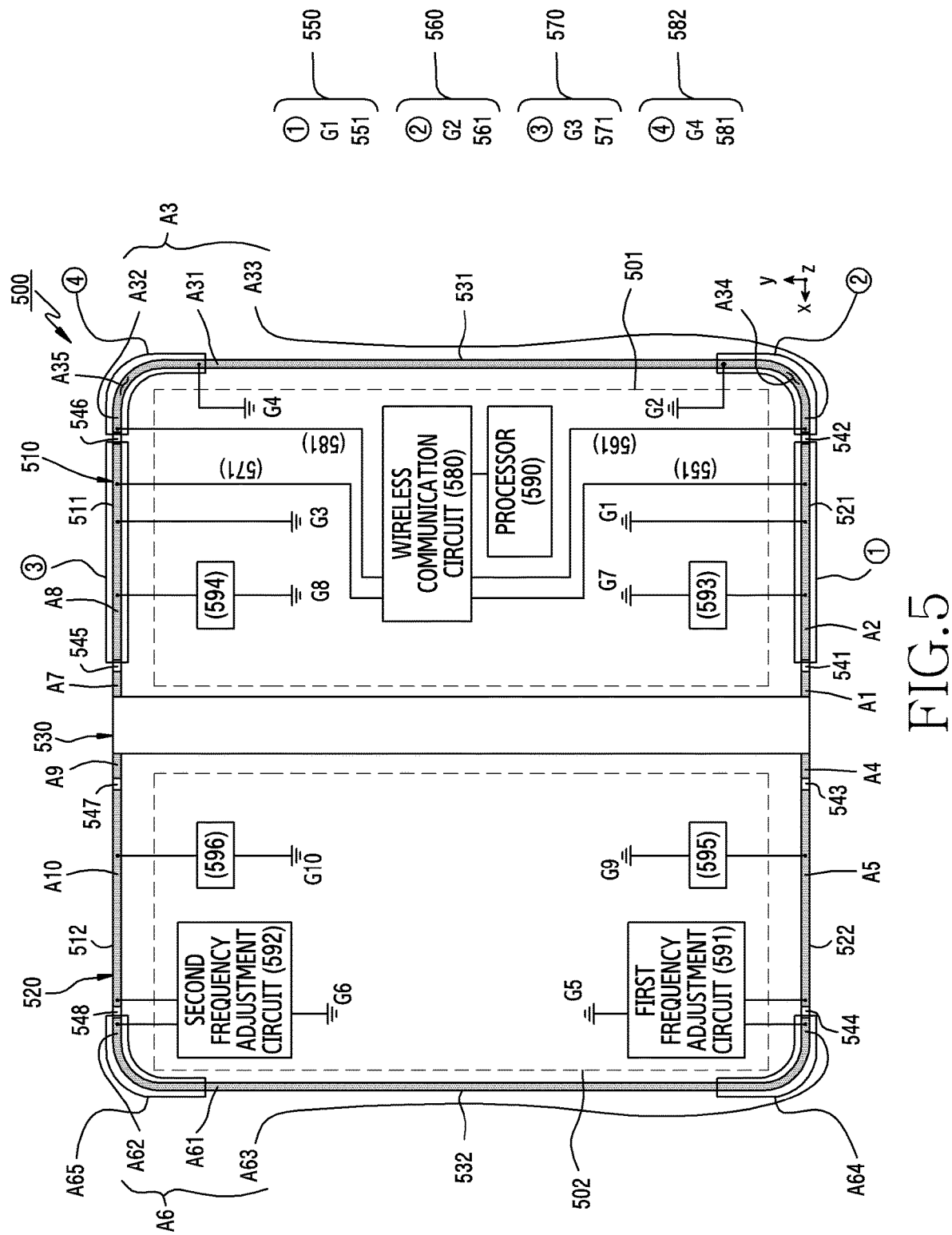
FIG. 5 illustrates an electronic device of an unfolded state according to an embodiment of the disclosure.

FIG. 5 shows an electronic device of an unfolded state according to an embodiment of the disclosure.

Referring to FIG. 5, in an embodiment, an electronic device 500 (e.g., the electronic device 102 of FIG. 1 or the electronic device 20 of FIG. 2) may include at least one of a first side member 510 (e.g., the first side member 211 of FIG. 2), a second side member 520 (e.g., the second side member 221 of FIG. 2), a hinge structure 530, a wireless communication circuit 580 (e.g., the wireless communication module 192 of FIG. 1) or a processor 590 (e.g., the processor 120 of FIG. 1).

According to an embodiment, the electronic device 500 may include first side surfaces 511 and 512 facing a first direction, second side surfaces 521 and 522 facing a second direction which is opposite to the first direction, and third side surfaces 531 and 532 facing a third direction which is perpendicular to the first direction.

The first side surfaces 511 and 512 may include, for example, the first side surface 511 formed by the first side member 510 and the first side surface 512 formed by the second side member 520. If the electronic device 500 is in the unfolded state or the folded state (e.g., see FIG. 3), the first side surfaces 511 and 512 together may form one side surface of the electronic device 500. The second side surfaces 521 and 522 may include, for example, the second side surface 521 formed by the first side member 510 and the second side surface 522 formed by the second side member 520. If the electronic device 500 is in the unfolded or the folded state (e.g., see FIG. 3), the second side surfaces 521 and 522 together may form the other side surface of the electronic device 500.

The third side surfaces 531 and 532 may include, for example, the third side surface 531 formed by the first side member 510 and the third side surface 532 formed by the second side member 520 As shown, if the electronic device 500 is in the unfolded state, the third side surfaces 531 and 532 may be disposed to face opposite directions. If the electronic device 500 is in the folded state (e.g., see FIG. 3), the third side surfaces 531 and 532 together may form one side surface of the electronic device 500.

According to various embodiments, the first side member 510 may include a plurality of conductive units. For example, the first side member 510 may include at least one of a first conductive unit A1, a first insulating unit 541, a second conductive unit A2, a second insulating unit 542 and a third conductive unit A3 which are sequentially disposed from one side of the hinge structure 530. The first side member 510 may include at least one of a seventh conductive unit A7, a fifth insulating unit 545, an eighth conductive unit A8, and a sixth insulating unit 546 which are sequentially disposed from the other side of the hinge structure 530. According to an embodiment, the seventh and eighth conductive units A7 and A8 may form part of the first side surface 511. The first and second conductive units A1 and A2 may form part of the second side surface 521. The third conductive unit A3 may include a portion A31 forming the third side surface 531, a portion A32 forming part of the first side surface 511, and a portion A33 forming part of the second side surface 521. In an embodiment, the first insulating unit 541 may be disposed between the first and second conductive units A1 and A2 and form part of the second side surface 521. The first and second conductive units A1 and A2 may be electrically or physically separated by the first insulating unit 541. The second insulating unit 542 may be disposed between the second and third conductive units A2 and A3 and form part of the second side surface 521. The second and third conductive units A2 and A3 may be electrically or physically separated by the second insulating unit 542. The fifth insulating unit 545 may be disposed between the seventh and eighth conductive units A7 and A8 and form part of the first side surface 511. The seventh and eighth conductive units A7 and A8 may be electrically or physically separated by the fifth insulating unit 545. The sixth insulating unit 546 may be disposed between the third and eighth conductive units A3 and A8 and form part of the first side surface 511. The third and eighth conductive units A3 and A8 may be electrically or physically separated by the sixth insulating unit 546. According to various embodiments, the first insulating unit 541, the second insulating unit 542, the fifth insulating unit 545 or the sixth insulating unit 546 may be the nonconductive member 271 of FIG. 3. In the folded state of the electronic device 500 (see FIG. 3), the first insulating unit 541 and the third insulating unit 543 may substantially align with each other, and the second insulating unit 542 and the fourth insulating unit 544) may substantially align with each other. In the folded state of the electronic device 500, the fifth insulating unit 545 and the seventh insulating unit 547 may substantially align with each other, and the sixth insulating unit 546 and the eighth insulating unit 548 may substantially align with each other.

According to various embodiments, the second side member 520 may include a plurality of conductive units. For example, the second side member 520 may include at least one of a fourth conductive unit A4, a third insulating unit 543, a fifth conductive unit A5, a fourth insulating unit 544 and a sixth conductive unit A6 which are disposed in sequence from one side of the hinge structure 530. The second side member 520 may include at least one of a ninth conductive unit A9, a seventh insulating unit 547, a tenth conductive unit A10 and an eighth insulating unit 548 which are disposed in sequence from the other side of the hinge structure 530. According to an embodiment, the ninth and tenth conductive units A9 and A10 may form part of the first side surface 512. The fourth and fifth conductive units A4 and A5 may form part of the second side surface 522. The sixth conductive unit A6 may include a portion A61 forming the third side surface 532, a portion A62 forming part of the first side surface 512, and a portion A63 forming part of the second side surface 522. According to an embodiment, the third insulating unit 543 may be disposed between the fourth and fifth conductive units A4 and A5 and form part of the second side surface 522. The fourth and fifth conductive units A4 and A5 may be electrically or physically separated by the third insulating unit 543. The fourth insulating unit 544 may be disposed between the fifth and sixth conductive units A5 and A6 and form part of the second side surface 522. The fifth and sixth conductive units A5 and A6 may be electrically or physically separated by the fourth insulating unit 544. The seventh insulating unit 547 may be disposed between the ninth and tenth conductive units A9 and A10 and form part of the first side surface 512. The ninth and tenth conductive units A9 and A10 may be electrically or physically separated by the seventh insulating unit 547. The eighth insulating unit 548 may be disposed between the sixth and tenth conductive units A6 and A10 and form part of the first side surface 512. The sixth and tenth conductive units A6 and A10 may be electrically or physically separated by the eighth insulating unit 548. According to various embodiments, the third insulating unit 543, the fourth insulating unit 544, the seventh insulating unit 547 or the eighth insulating unit 548 may be the nonconductive member 271 of FIG. 3.

According to various embodiments, at least one of the first, second, third, seventh and eighth conductive units A1, A2, A3, A7, and A8 of the first side member 510 may be electrically connected to the wireless communication circuit 580 (e.g., a radio frequency integrated circuit (RFIC) or an intermediate frequency integrated circuit (IFIC)) and utilized as the antenna radiator.

In an embodiment, the second conductive unit A2 forming part of the second side surface 521 may operate as a first antenna radiator ①. The first antenna radiator ① may be electrically connected to the wireless communication circuit 580 at at least one feeding point (not shown), and may be electrically connected to a ground G1 at at least one grounding point (not shown). According to an embodiment, a first antenna system 550 may include the first antenna radiator ①, the ground G1 electrically connected with the first antenna radiator ①, or a first transmission line 551 between the first antenna radiator ① and the wireless communication circuit 580. The first transmission line 551 is a structure for transmitting a signal (voltage, current) of a radio frequency (RF) through the first antenna radiator ①, and may be defined as a conductor system using wave transmission action by an electrical element (e.g., an element having resistance, inductance, conductance, capacitance per unit length). The first transmission line 551 may include wires of various types which interconnect the wireless communication circuit 580 and the first antenna radiator ①. The wireless communication circuit 580 supplies the current to the first antenna radiator ① through the first transmission line 551, and the current may be transmitted along the first antenna radiator ① and flow into the ground G1. Hence, the wireless communication circuit 580 may transmit or receive a wireless electromagnetic wave through the first antenna radiator ①.

In an embodiment, some portion A34 of the third conductive unit A3 disposed between the second side surface 521 and the third side surface 531 to form part of the third side surface 531 and part of the second side surface 521 may operate as a second antenna radiator ②. The second antenna radiator ② may be electrically connected to the wireless communication circuit 580 at at least one feeding point (not shown), and may be electrically connected to a ground G2 at at least one grounding point (not shown). According to an embodiment, the second antenna system 560 may include the second antenna radiator ②, the ground G2 electrically connected to the second antenna radiator ②, or a second transmission line 561 between the second antenna radiator ② and the wireless communication circuit 580. The second transmission line 561 is a structure for transmitting an RF signal (voltage, current) through the second antenna radiator ②, and may be defined as a conductor system using the wave transmission action by the electrical element (e.g., an element having resistance, inductance, conductance, capacitance per unit length). The second transmission line 561 may include wires of various types which interconnect the wireless communication circuit 580 and the second antenna radiator ②. The wireless communication circuit 580 supplies current to the second antenna radiator ② through the second transmission line 561, and the current may be transmitted along the second antenna radiator ② and fed into the ground G2. Hence, the wireless communication circuit 580 may transmit or receive a wireless electromagnetic wave through the second antenna radiator ②. The second transmission line 561 may include wires of various types for interconnecting the wireless communication circuit 580 and the second antenna radiator ②.

In an embodiment, the eighth conductive unit A8 forming part of the first side surface 511 may operate as a third antenna radiator ③. The third antenna radiator ③ may be electrically connected to the wireless communication circuit 580 at at least one feeding point (not shown), and may be electrically connected to a ground G3 at at least one grounding point (not shown). According to an embodiment, the third antenna system 570 may include the third antenna radiator ③, the ground G3 electrically connected to the third antenna radiator ③, or a third transmission line 571 between the third antenna radiator ③ and the wireless communication circuit 580. The third transmission line 571 is a structure for transmitting an RF signal (voltage, current) through the third antenna radiator ③, and may be defined as a conductor system using the wave transmission action by the electrical element (e.g., an element having resistance, inductance, conductance, capacitance per unit length). The third transmission line 571 may include wires of various types for interconnecting the wireless communication circuit 580 and the third antenna radiator ③. The wireless communication circuit 580 supplies current to the third antenna radiator ③ through the third transmission line 571, and the current may be transmitted along the third antenna radiator ③ and fed into the ground G3. Thus, the wireless communication circuit 580 may transmit or receive a wireless electromagnetic wave through the third antenna radiator ③.

In an embodiment, some portion A35 of the third conductive unit A3 disposed between the first side surface 511 and the third side surface 531 to form part of the third side surface 531 and part of the first side surface 511 may operate as a fourth antenna radiator ④. The fourth antenna radiator ④ may be electrically connected to the wireless communication circuit 580 at at least one feeding point (not shown), and may be electrically connected to a ground G4 at at least one grounding point (not shown). According to an embodiment, the fourth antenna system 582 may include the fourth antenna radiator ④, the ground G4 electrically connected to the fourth antenna radiator ④, or a fourth transmission line 581 between the fourth antenna radiator 10 and the wireless communication circuit 580. The fourth transmission line 581 is a structure for transmitting an RF signal (voltage, current) through the fourth antenna radiator ④, and may be defined as a conductor system using the wave transmission action by the electrical element (e.g., an element having resistance, inductance, conductance, capacitance per unit length). The fourth transmission line 581 may include wires of various types for interconnecting the wireless communication circuit 580 and the fourth antenna radiator ④. The wireless communication circuit 580 supplies the current to the fourth antenna radiator ④ through the fourth transmission line 581, and the current may be transmitted along the fourth antenna radiator ④ and fed into the ground G4. Hence, the wireless communication circuit 580 may transmit or receive the wireless electromagnetic wave through the fourth antenna radiator ④.

According to an embodiment, at least part of the ground G1, G2, G3, or G4 may be a first ground or a first ground layer disposed on a first PCB 501 (e.g., the first substrate 451 of FIG. 4) on which the wireless communication circuit 580 or the processor 590 is disposed.

According to an embodiment, reflection characteristics and impedance of the antenna radiator (e.g., the first antenna radiator ①, the second antenna radiator ②, the third antenna radiator ③, or the fourth antenna radiator ④) are related to the antenna radiation performance, and may vary depending on its shape, size, and material. The radiation characteristics of the antenna radiator may include an antenna radiation pattern (or an antenna pattern) which is a directional function representing a relative distribution of the power radiated from the antenna radiator, and a polarization state (or antenna polarization) of the wave radiated from the antenna radiator. The impedance of the antenna radiator may be related to the power transfer from the transmitter (e.g., the wireless communication circuit 580) to the antenna radiator or the power transfer from the antenna radiator to the receiver (e.g., the wireless communication circuit 580). The impedance of the antenna radiator may be designed to match impedance of the transmission line to minimize reflection at a connection between the transmission line (e.g., the first transmission line 551, the second transmission line 561, the third transmission line 571 or the fourth transmission line 581) and the antenna radiator (e.g., the first antenna radiator ①, the second antenna radiator ②, the third antenna radiator ③ or the fourth antenna radiator ④). Thus, maximum power transmission (or power loss minimization) or efficient signal transmission through the antenna radiator may be possible. Such impedance matching may lead to efficient signal flow at a specific frequency.

According to an embodiment, if the electronic device 500 is folded (e.g., see FIG. 3), the antenna radiator (e.g., the first antenna radiator ①, the second antenna radiator ②, the third antenna radiator ③ or the fourth antenna radiator ④) formed as at least part of the first side member 510 may be close to at least part of the second side member 520. For example, in the folded state of the electronic device 500, when viewed from above the first housing structure 510, the first antenna radiator ① may at least partially overlap the fifth conductive unit A5, and the second antenna radiator ② may at least partially overlap the sixth conductive unit A6. For example, in the folded state of the electronic device 500, when viewed from above the first housing structure 510, the third antenna radiator ③ may at least partially overlap the tenth conductive unit A10, and the fourth antenna radiator ④ may at least partially overlap the sixth conductive unit A6. In the folded state of the electronic device 500, the second side member 520 may affect the antenna radiation performance of the antenna radiator (e.g., the first antenna radiator ①, the second antenna radiator ②, the third antenna radiator ③ or the fourth antenna radiator ④) formed as at least part of the first side member 510. For example, the antenna radiation performance of the first antenna radiator 10 may be degraded by the fifth conductive unit A5 which is close to the first antenna radiator ① if the electronic device 500 is folded. In the folded state of the electronic device 500, parasitic resonance may be generated at the fifth conductive unit A5 by an electric field emitted from the first antenna radiator ①, and this parasitic resonance (or parasitic component) may deteriorate the antenna radiation performance of the first antenna radiator ①. Capacitance may be generated between the first antenna radiator ① and the fifth conductive unit A5 by the electromagnetic coupling in the folded state of the electronic device 500, and the electromagnetic wave energy (or electromagnetic field) emitted from the first antenna radiator ① may be induced into the fifth conductive unit A5. Unlike a forward current flowing in the first antenna radiator ①, a reverse current may be generated in the fifth conductive unit A5 by the induced electromagnetic wave energy, and thus the antenna radiation performance related to the first antenna radiator ① may be deteriorated. The antenna radiation performance of the second antenna radiator ② or the fourth antenna radiator ④ may be degraded by the sixth conductive unit A6 close to the second antenna radiator ②or fourth antenna radiator (④) in the folded state of the electronic device 500, similarly to the degradation of the antenna radiation performance of the first antenna radiator ①. The antenna radiation performance of the third antenna radiator ③ may be deteriorated by the tenth conductive unit A10 which is close to the third antenna radiator ③ in the folded state of the electronic device 500, similarly to the deterioration of the antenna radiation performance of the first antenna radiator ①. The deterioration of the antenna radiation performance may indicate a state that it is difficult to transmit or receive a signal having a selected or designated frequency (or a signal of a frequency designated in the corresponding communication mode) through the antenna radiator (e.g., the first antenna radiator ①, the second antenna radiator ②, the third antenna radiator ③ or the fourth antenna radiator ④). According to various embodiments of the disclosure, the electronic device 500 may include at least one frequency adjustment circuit for reducing the influence of the second side member 520 on the first antenna radiator ①, the second antenna radiator ②, the third antenna radiator ③ or the fourth antenna radiator ④ in the folded state.

According to an embodiment, the frequency adjustment circuit may include an electrical element having a component such as inductance, capacitance or conductance acting on the antenna system (e.g., the first antenna system 550, the second antenna system 560, the third antenna system 570 or the fourth antenna system 582). For example, the frequency adjustment circuit may apply the electrical element to the antenna system, and this phenomenon may be referred to as loading of the electrical element (or a loading effect of the electrical element). For example, the frequency adjustment circuit may generate inductance loading (or inductance loading effect) which acts the inductance (or inductance component) on the antenna system. According to an embodiment, the frequency adjustment circuit may include various elements such as a lumped element or a passive element.

According to an embodiment, the electronic device 500 may include a first frequency adjustment circuit 591 which is electrically connected to the second side member 520 and is related to the first antenna radiator ① and/or the second antenna radiator ②. The first frequency adjustment circuit 591 may be electrically connected to the fifth conductive unit A5 disposed close to the first antenna radiator ① in the folded state of the electronic device 500, and a ground G5. The first frequency adjustment circuit 591 may be electrically connected to the sixth conductive unit A6 disposed close to the second antenna radiator ② in the folded state of the electronic device 500, and the ground G5. The ground G5 may be, for example, a second ground or a second ground layer included in a second PCB 502 (e.g., the second substrate 452 of FIG. 4) on which the first frequency adjustment circuit 591 is disposed. According to an embodiment, in the folded state of the electronic device 500, the first frequency adjustment circuit 591 may include an electrical element (e.g., an inductor) having the component such as inductance, capacitance or conductance acting on the first antenna system 550 and/or the second antenna system 560, and thus reduce the influence of the second side member 520 on the antenna radiation performance of the first antenna radiator ① and/or the second antenna radiator ②.

For example, in the folded state of the electronic device 500 (see FIG. 3), the second side member 520 is close to the first antenna radiator ① and/or the second antenna radiator ② to generate the capacitance (or capacitance component) (e.g., parasitic capacitance), and a parasitic resonance frequency may be generated due to the capacitance. According to an embodiment, the first frequency adjustment circuit 591 may adjust the parasitic resonance frequency not to include the parasitic resonance frequency generated in the folded state of the electronic device 500 in a resonance frequency band of the first antenna radiator ① and/or the second antenna radiator ②. The parasitic resonance frequency generated in the folded state of the electronic device 500 may be moved out of the resonance frequency band of the first antenna radiator ① and/or the second antenna radiator ② by the first frequency adjustment circuit 591, thus reducing the degradation of the antenna radiation performance due to the parasitic resonance frequency.

According to an embodiment, part of the second side member 520 electrically connected to the first frequency adjustment circuit 591 may operate as an additional antenna radiator for transmitting or receiving a signal having the selected or designated frequency, together with the first antenna radiator ① and/or the second antenna radiator ② in the folded state of the electronic device 500 (see FIG. 3). In an embodiment, part of the side member 520 operating as the additional antenna radiator may include the fifth conductive unit A5 at least partially overlapping the first antenna radiator ①, and/or a part A64 of the sixth conductive unit A6 at least partially overlapping with the second antenna radiator ②, when viewed from above the first housing structure 510 in the folded state of the electronic device 500. For example, the fifth conductive unit A5 may operate as the antenna radiator electromagnetically coupled with the first antenna radiator ① and/or the second antenna radiator ② in the folded state of the electronic device 500. For example, the part A64 of the sixth conductive unit A6 may operate as the antenna radiator electromagnetically coupled with the second antenna radiator ② and/or the first antenna radiator ① in the folded state of the electronic device 500. According to an embodiment, the first frequency adjustment circuit 591 may have inductance (e.g., inductance component) for reducing capacitance (e.g., parasitic capacitance) which may occur if the fifth conductive unit A5 is close to the first antenna radiator ①. According to an embodiment, the first frequency adjustment circuit 591 may have inductance (or inductance component) for reducing capacitance (e.g., parasitic capacitance) which may occur if the part A64 of the sixth conductive unit A6 is close to the second antenna radiator ②. For example, the first frequency adjustment circuit 591 electrically connected to the ground G5 may be electrically connected to part (e.g., the fifth conductive unit A5 and/or the part A64 of the sixth conductive unit A6) of the second side member 520 and operate as an inductor. According to an embodiment, the first frequency adjustment circuit 591 may adjust the impedance of part (e.g., the fifth conductive unit A5 and/or the part A64 of the sixth conductive unit A6) of the second side member 520 to match the impedance of the transmission line with respect to the first antenna radiator ① and/or the second antenna radiator ②. For example, the inductance of the first frequency adjustment circuit 591 may adjust the impedance of the part (e.g., the fifth conductive unit A5 and/or the part A64 of the sixth conductive unit A6) of the second side member 520.

According to an embodiment, the first frequency adjustment circuit 591 in the folded state of the electronic device 500 (see FIG. 3) may reduce the degradation of the antenna radiating performance due to the parasitic resonance frequency by moving the parasitic resonance frequency generated by the second side member 520 which is close to first the antenna radiator ① and/or the second antenna radiator ②). In addition, the first frequency adjustment circuit 591 may operate part (e.g., the fifth conductive unit A5 and/or the part A64 of the sixth conductive unit A6) of the second side member 520 as an additional antenna radiator coupled with the first antenna radiator ① and/or the second antenna radiator ② by adjusting the impedance.

According to an embodiment, the first frequency adjustment circuit 591 may include a lumped element (or a passive element) such as an inductor, and/or a switch. For example, if the switch is turned on by the control of the processor 590, the fifth conductive unit A5 and/or the sixth conductive unit A6 may be electrically connected to the ground G5 through the lumped element. According to an embodiment, if the lumped element electrically interconnects the fifth conductive unit A5 and the ground G5 in the folded state of the electronic device 500, the lumped element may have a function of reducing the degradation of the antenna radiation performance due to the parasitic resonance frequency by moving the parasitic resonance frequency generated due to the fifth conductive unit A5 which is close to the first antenna radiator ①, and a function of operating the fifth conductive unit A5 as the additional antenna radiator coupled with the first antenna radiator ① and/or the second antenna radiator ② by adjusting the impedance.

According to an embodiment, if the lumped element electrically interconnects the sixth conductive unit A6 and the ground G5 in the folded state of the electronic device 500, the lumped element may have a function of reducing the degradation of the antenna radiation performance due to the parasitic resonance frequency by moving the parasitic resonance frequency generated due to the sixth conductive unit A6 which is close to the second antenna radiator ②, and a function of operating the part A64 of the sixth conductive unit A6 as the additional antenna radiator coupled with the first antenna radiator ① and/or the second antenna radiator ② by adjusting the impedance.

According to various embodiments, the first frequency adjustment circuit 591 may move the resonance frequency of the first antenna radiator ① and/or the second antenna radiator ② to a designated frequency, or move it as designated in the folded state of the electronic device 500 (see FIG. 3).

For example, in the folded state of the electronic device 500 (see FIG. 3), if the switch included in the first frequency adjustment circuit 591 is turned on under the control of the processor 590, the fifth conductive unit A5 and/or the sixth conductive unit A6 may be electrically connected to the ground G5 through the lumped element. The lumped element may reduce the resonance frequency of the parasitic component which may generate in the frequency band of the first antenna radiator ① and/or the second antenna radiator ② if the second side member 520 is close to the first antenna radiator ① and/or the second antenna radiator ②. For example, in the folded state of the electronic device 500, if the switch included in the first frequency adjustment circuit 591 is turned off by the control of the processor 590, the fifth conductive unit A5 and/or the sixth conductive unit A6 may be electrically separated from the ground G5. If the fifth conductive unit A5 and/or the sixth conductive unit A6 is electrically separated from the ground G5, the impedance (or, the condition of the parasitic resonance) may be changed to thus reduce the antenna radiation performance degradation of the first antenna system 550 and/or the second antenna system 560 due to the parasitic resonance. Hence, according to on or off of the switch included in the first frequency adjustment circuit 591, the resonance frequency of the first antenna radiator ① and/or the resonance frequency of the second antenna radiator ② may be moved in the folded state of the electronic device 500.

According to an embodiment, the electronic device 500 may include a second frequency adjustment circuit 592 electrically connected to the second side member 520 and related to the third antenna radiator ③ and/or the fourth antenna radiator ④. The second frequency adjustment circuit 592 may be electrically connected to the tenth conductive unit A10 disposed close to the third antenna radiator ③ in the folded state of the electronic device 500, and a ground G6. The ground G6 may be, for example, a second ground or a second ground layer included in the second PCB 502 (e.g., the second substrate 452 of FIG. 4) on which the second frequency adjustment circuit 592 is disposed. According to an embodiment, the second frequency adjustment circuit 592 may be electrically connected with the sixth conductive unit A6 disposed close to the fourth antenna radiator ④ in the folded state of the electronic device 500, and the ground G6. According to an embodiment, the second frequency adjustment circuit 592 may include an electrical element (e.g., an inductor) having the component such as inductance, capacitance or conductance acting on the third antenna system 570 and/or the fourth antenna system 582, and thus reduce influence of the second side member 520 on the antenna radiation performance of the third antenna radiator ③ and/or the fourth antenna radiator ④.

For example, in the folded state of the electronic device 500 (see FIG. 3), the second side member 520 is close to the third antenna radiator ③ and/or the fourth antenna radiator ④ and the capacitance (or capacitance component) (e.g., parasitic capacitance) may occur, and a parasitic resonance frequency may be generated due to the capacitance. According to an embodiment, the second frequency adjustment circuit 592 may adjust the parasitic resonance frequency not to include the parasitic resonance frequency generated in the folded state of the electronic device 500 in a parasitic resonance frequency of the third antenna radiator ③ and/or the fourth antenna radiator ④. The parasitic resonance frequency generated in the folded state of the electronic device 500 may be moved out of the resonance frequency band of the third antenna radiator ③ and/or the fourth antenna radiator ④ by the second frequency adjustment circuit 592, thus reducing the degradation of the antenna radiation performance due to the parasitic resonance frequency.

According to an embodiment, part of the second side member 520 electrically connected to the second frequency adjustment circuit 592 may operate as an additional antenna radiator for transmitting or receiving a signal having a selected or designated frequency, together with the third antenna radiator ③ and/or the fourth antenna radiator ④ in the folded state of the electronic device 500 (see FIG. 3). In an embodiment, the part of the side member 520 operating as the additional antenna radiator may include the tenth conductive unit A10 at least partially overlapping the third antenna radiator ③, and/or part A65 of the sixth conductive unit A6 at least partially overlapping the fourth antenna radiator ④. For example, the tenth conductive unit A10 may operate as the antenna radiator electromagnetically coupled with the third antenna radiator ③ and/or the fourth antenna radiator ④ in the folded state of the electronic device 500. For example, the sixth conductive unit A6 may operate as the antenna radiator electromagnetically coupled with the fourth antenna radiator ④ and/or the third antenna radiator ③ in the folded state of the electronic device 500. According to an embodiment, the second frequency adjustment circuit 592 may have inductance (e.g., inductance component) for reducing capacitance (e.g., parasitic capacitance) which may occur if the tenth conductive unit A10 is close to the third antenna radiator ③. According to an embodiment, the second frequency adjustment circuit 592 may have inductance (e.g., inductance component) for reducing capacitance (e.g., parasitic capacitance) which may occur if the part A65 of the sixth conductive unit A6 is close to the fourth antenna radiator ④. For example, the second frequency adjustment circuit 592 electrically connected to the ground G6 may be electrically connected to part (e.g., the tenth conductive unit A10 and/or the part A65 of the sixth conductive unit A6) of the second side member 520 and operate as an inductor. According to an embodiment, the second frequency adjustment circuit 592 may adjust impedance of part (e.g., the tenth conductive unit A10 and/or the part A65 of the sixth conductive unit A6) of the second side member 520 to match impedance of a transmission line related to the third antenna radiator ③ and/or the fourth antenna radiator ④. For example, the inductance of the second frequency adjustment circuit 592 may adjust the impedance of the part (e.g., the tenth conductive unit A10 and/or the part A65 of the sixth conductive unit A6) of the second side member 520.

According to an embodiment, the second frequency adjustment circuit 592 in the folded state of the electronic device 500 (see FIG. 3) may function to reduce the degradation of the antenna radiating performance due to the parasitic resonance frequency by moving the parasitic resonance frequency generated by the second side member 520 which is close to the third antenna radiator ③ and/or the fourth antenna radiator ④. In addition, the second frequency adjustment circuit 592 may function to operate the part (e.g., the tenth conductive unit A10 and/or the part A65 of the sixth conductive unit A6) of the second side member 520 as the additional antenna radiator coupled with the third antenna radiator ③ and/or the fourth antenna radiator ④ by adjusting the impedance.

According to an embodiment, the second frequency adjustment circuit 592 may include a lumped element (or a passive element) such as an inductor, and/or a switch. For example, if the switch is turned on by control of the processor 590, the tenth conductive unit A10 and/or the sixth conductive unit A6 may be electrically connected to the ground G6 through the lumped element. According to an embodiment, if the lumped element electrically interconnects the tenth conductive unit A10 and the ground G6 in the folded state of the electronic device 500, the lumped element may have a function of reducing the degradation of the antenna radiation performance due to the parasitic resonance frequency by moving the parasitic resonance frequency generated by the tenth conductive unit A10 which is close to the third antenna radiator ③, and a function of operating the tenth conductive unit A10 as the additional antenna radiator coupled with the third antenna radiator ③ and/or the fourth antenna radiator ④ by adjusting the impedance. According to an embodiment, if the lumped element electrically interconnects the sixth conductive unit A6 and the ground G6 in the folded state of the electronic device 500, the lumped element may have a function of reducing the degradation of the antenna radiation performance due to the parasitic resonance frequency by moving the parasitic resonance frequency generated by the sixth conductive unit A6 which is close to the fourth antenna radiator ④, and a function of operating the part A65 of the sixth conductive unit A6 as the additional antenna radiator coupled to the fourth antenna radiator ④ and/or the third antenna radiator ③ by adjusting the impedance.

According to various embodiments, the second frequency adjustment circuit 592 may move the resonance frequency of the third antenna radiator ③ and/or the fourth antenna radiator ④ to a designated frequency, or move it as designated in the folded state of the electronic device 500. For example, if the switch included in the second frequency adjustment circuit 592 is turned on by the control of the processor 590, the tenth conductive unit A10 and/or the sixth conductive unit A6 may be electrically connected to the ground G6 through the lumped element. The lumped element may reduce the resonance frequency of the parasitic component which may generate in the frequency band for the third antenna radiator ③ and/or the fourth antenna radiator ④ if the second side member 520 is close to the third antenna radiator ③ and/or the fourth antenna radiator ④. For example, in the folded state of the electronic device 500, if the switch included in the second frequency adjustment circuit 592 is turned off by the control of the processor 590, the tenth conductive unit A10 and/or the sixth conductive unit A6 may be electrically separated from the ground G6. If the tenth conductive unit A10 and/or the sixth conductive unit A6 is electrically separated from the ground G6, the impedance (or the parasitic resonance condition) may be changed to thus reduce the antenna radiation performance degradation of the third antenna system 570 and/or the fourth antenna system 582 due to the parasitic resonance. Hence, according to on or off of the switch included in the second frequency adjustment circuit 592, the resonance frequency of the third antenna radiator ③ and/or the resonance frequency of the fourth antenna radiator ④ may be moved in the folded state of the electronic device 500.

According to various embodiments, the electronic device 500 may further include at least one of a third frequency adjustment circuit 593 electrically connected to the first antenna radiator ① and a ground G7, a fourth frequency adjusting circuit 594 electrically connected to the third antenna radiator ③ and a ground G8, a fifth frequency adjusting circuit 595 electrically connected to the fifth conductive unit A5 and a ground G9, or a sixth frequency adjustment circuit 596 electrically connected to the tenth conductive unit A10 and a ground G10. The ground G7 or G8 may be, for example, the first ground or the first ground layer included in the first PCB 501 (e.g., the first substrate 451 of FIG. 4) on which the third frequency adjustment circuit 593, the fourth frequency adjustment circuit 594, the wireless communication circuit 580 or the processor 590 is disposed. The ground G9 or G10 may be, for example, the second ground or the second ground layer included in the second PCB 502 (e.g., the second substrate 452 of FIG. 4) on which the first frequency adjustment circuit 591, the second frequency adjustment circuit 592, the fifth frequency adjustment circuit 595 or the sixth frequency adjustment circuit 596 is disposed.

According to an embodiment, the third frequency adjustment circuit 593 or the fifth frequency adjustment circuit 595 may reduce influence of at least part (e.g., the fifth conductive unit A5) of the second side member 520 on the antenna radiation performance of the first antenna radiator ① and/or the second antenna radiator ②, or move the resonance frequency of the first antenna radiator ① and/or the second antenna radiator ②, in the folded state of the electronic device 500. According to an embodiment, the fourth frequency adjustment circuit 594 or the sixth frequency adjustment circuit 596 may reduce influence of at least part (e.g., the tenth conductive unit A10) of the second side member 520 on the antenna radiation performance of the third antenna radiator ③ and/or the fourth antenna radiator ④, or move the resonance frequency of the third antenna radiator ③ and/or the fourth antenna radiator ④, in the folded state of the electronic device 500 is folded. According to an embodiment, the third or fifth frequency adjustment circuit 593 or 595 may include an electrical element having a component such as inductance, capacitance or conductance acting on the first antenna system 550 and/or the second antenna system 560. According to an embodiment, the fourth or sixth frequency adjustment circuit 594 or 596 may include an electrical element having a component such as inductance, capacitance or conductance acting on the third antenna system 570 and/or the fourth antenna system 582.

According to various embodiments, the electronic device 500 may further include a seventh frequency adjustment circuit (not shown) electrically connected to the second antenna ② and the ground G2. The seventh frequency adjustment circuit may, in the folded state of the electronic device 500, reduce influence of at least part (e.g., the sixth conductive unit A6) of the second side member 520 on the antenna radiation performance of the first antenna radiator ① and/or the second antenna radiator ②, or move the resonance frequency of the first antenna radiator ① and/or the second antenna radiator ②.

According to various embodiments, the electronic device 500 may further include an eighth frequency adjustment circuit (not shown) electrically connected to the fourth antenna radiator ④ and the ground G4. The eighth frequency adjustment circuit may, in the folded state of the electronic device 500, reduce influence of at least part (e.g., the sixth conductive unit A6) of the second side member 520 on the antenna radiation performance of the third antenna radiator ③ and/or the fourth antenna radiator ④, or move the resonance frequency of the third antenna radiator ③ and/or the fourth antenna radiator ④.

According to various embodiments, at least part of the first conductive unit A1 adjacent to the hinge structure 530 and a conductive unit (not shown) included in the hinge structure 530 electrically connected to the first conductive unit A1 may operate as a fifth antenna radiator. According to various embodiments, at least part of the seventh conductive unit A7 adjacent to the hinge structure 530 and a conductive unit (not shown) included in the hinge structure 530 electrically connected to the seventh conductive unit A7 may operate as a sixth antenna radiator. According to various embodiments (not shown), at least part of a conductive unit (not shown) of the hinge structure 530 adjacent to the first conductive unit A1 forming part of the second side surface 521 may operate as a seventh antenna radiator. According to various embodiments (not shown), a conductive unit (not shown) of the hinge structure 530 adjacent to the seventh conductive unit A7 forming part of the first side surface 511 may operate as an eighth antenna radiator. According to various embodiments, the electronic device 500 may further include a frequency adjustment circuit including an electrical element having inductance, capacitance or conductance acting on a fifth antenna system for the fifth antenna radiator, a sixth antenna system for the sixth antenna, a seventh antenna system for the seventh antenna or an eighth antenna system for the eighth antenna.

Figure 6A:
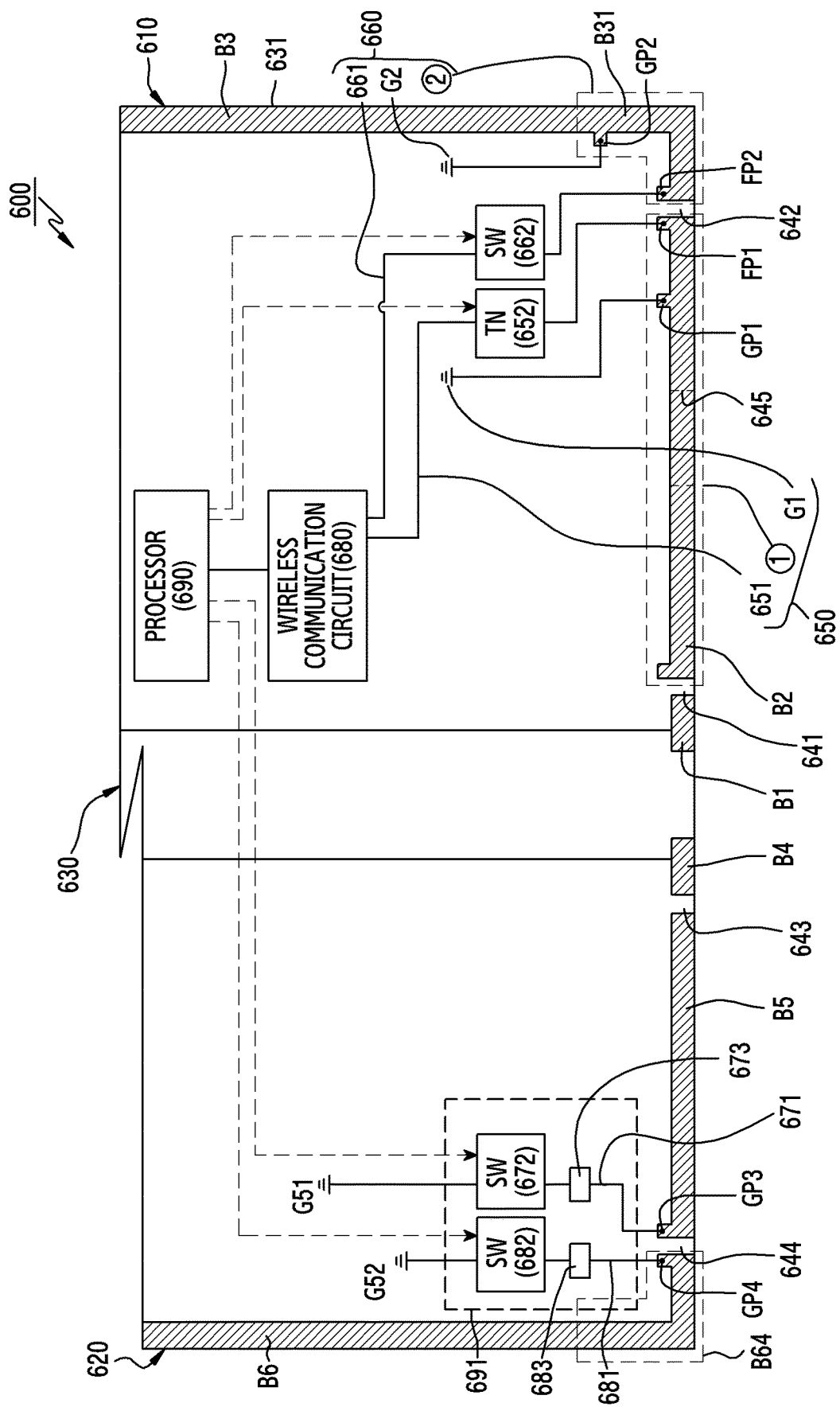
FIG. 6A illustrates a circuit of an electronic device of an unfolded state according to an embodiment of the disclosure.
Figure 6B:
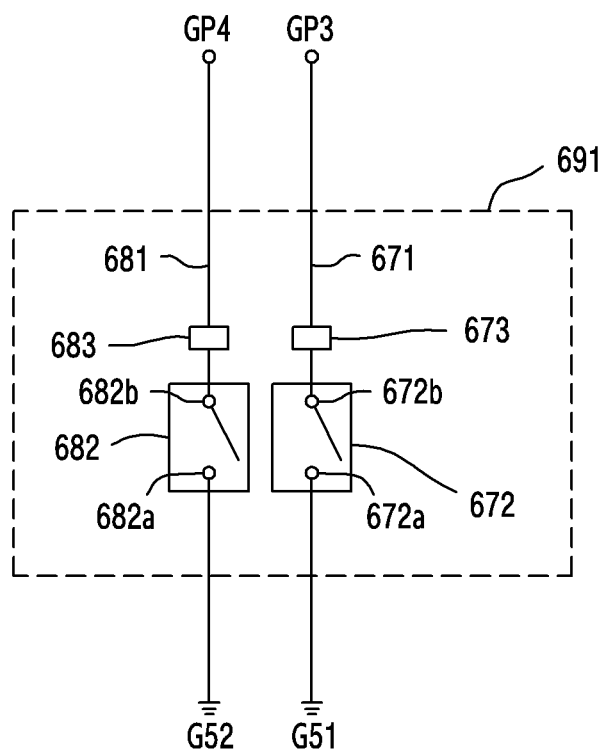
FIG. 6B illustrates a frequency adjustment circuit of FIG. 6A according to an embodiment of the disclosure.

FIG. 6A illustrates a circuit of an electronic device of an unfolded state according to an embodiment of the disclosure. FIG. 6B illustrates a frequency adjustment circuit according to an embodiment of the disclosure.

Referring to FIG. 6A, in an embodiment, an electronic device 600 (e.g., the electronic device 500 of FIG. 5) may include at least one of a first side member 610 (e.g., the first side member 510 of FIG. 5), a second side member 620 (e.g., the second side member 520 of FIG. 5), a hinge structure 630 (e.g., the hinge structure 530 of FIG. 5), at least one wireless communication circuit 680 (e.g., the wireless communication circuit 580 of FIG. 5), a processor 690 (e.g., the processor 590 of FIG. 5) or a frequency adjustment circuit 691 (e.g., the first frequency adjustment circuit 591 of FIG. 5).

According to an embodiment, the first side member 610 may include at least one of a first conductive unit B1 (e.g., the first conductive unit A1 of FIG. 5), a first insulating unit 641 (e.g., the first insulating unit 541 of FIG. 5), a second conductive unit B2 (e.g., the second conductive unit A2 of FIG. 5), a second insulating unit 642 (e.g., the second insulating unit 542 of FIG. 5), and a third conductive unit B3 (e.g., the third conductive unit A3 of FIG. 5) which are sequentially disposed from the hinge structure 630.

According to an embodiment, the second side member 620 may include at least one of a fourth conductive unit B4 (e.g., the fourth conductive unit A4 of FIG. 5), a third insulating unit 543 (e.g., the third insulating unit 543 of FIG. 5), a fifth conductive unit B5 (e.g., the fifth conductive unit A5 of FIG. 5), a fourth insulating unit 644 (e.g., the fourth insulating unit 544 of FIG. 5), and a sixth conductive unit B6 (e.g., the sixth conductive unit A6 of FIG. 5) which are sequentially disposed from the hinge structure 630.

According to an embodiment, a first antenna radiator ① (e.g., the first antenna radiator ① of FIG. 5) may be formed as at least part of the second conductive unit B2 included in the first side member 610. A second antenna radiator ② (e.g., the second antenna radiator ② of FIG. 5) may be formed as at least part of the third conductive unit B3 included in the first side member 610. The first antenna radiator ① may be electrically connected to the at least one wireless communication circuit 680 at at least one feeding point, and may be electrically connected a ground G1 (e.g., the ground G1 of FIG. 5) at at least one grounding point. The second antenna radiator ② may be electrically connected to the wireless communication circuit 680 at at least one feeding point, and may be connected to a ground G2 (e.g., the ground G2 of FIG. 5) at at least one grounding point.

According to an embodiment, the at least one wireless communication circuit 680 may be electrically connected to a first position (e.g., a first feeding point FP1) of the second conductive unit B2 closer to the second insulating unit 642 than the first insulating unit 641. The at least one wireless communication circuit 680 may transmit and/or receive a first signal of a first frequency band via the first antenna radiator ① formed as at least part of the second conductive unit B2.

According to an embodiment, the at least one wireless communication circuit 680 may be electrically connected to a second position (e.g., a second feeding point FP2) of the third conductive unit B3 adjacent to the second insulating unit 642. The at least one wireless communication circuit 680 may transmit and/or receive a second signal of a second frequency band via the second antenna radiator ② formed as at least part of the third conductive unit B3.

For example, the first feeding point FP1 of the first antenna radiator ① or the second feeding point FP2 of the second antenna radiator ② may be positioned near (e.g., within 10 mm) the second insulating unit 642 between the first antenna radiator ① and the second antenna radiator ②. The first grounding point GP1 (or a seventh position) of the first antenna radiator ① may be positioned away from the first feeding point FP1 toward the hinge structure 630. For example, the first grounding point GP1 of the first antenna radiator ① may be positioned between the first feeding point FP1 and a connector hole 645 (e.g., the connector hole 244 of FIG. 2). For example, the second grounding point GP2 (or an eighth position) of the second antenna radiator ② may be disposed in a portion B31 (e.g., the portion A31 of FIG. 5) forming a third side surface 631 (e.g., the third side surface 531 of FIG. 5).

According to an embodiment, the electronic device 600 may include a first antenna system (or a first antenna device) 650 electrically connected to the at least one wireless communication circuit 680. The first antenna system 650 may include the first antenna radiator ①, the ground G1 electrically connected to the first antenna radiator ①, and a first transmission line 651 (e.g., the first transmission line 551 of FIG. 5) between the first antenna radiator ① and the at least one wireless communication circuit 680.

According to an embodiment, the first antenna system 650 may include a tuner 652 connected to the first transmission line 651. The tuner 652 is a frequency adjustment circuit for adjusting a resonance frequency of the first antenna radiator ①, and may include, for example, one or more switching elements, or elements such as series and/or parallel tunable capacitors for implementing various capacitances. According to an embodiment, the tuner 652 may move the resonance frequency of the first antenna radiator ① to a designated frequency under control of the processor 690 (or the wireless communication circuit 680) to support a corresponding communication mode, or move the resonance frequency of the first antenna radiator ① as designated.

According to an embodiment, the electronic device 600 may include a second antenna system (or a second antenna device) 660 electrically connected to the at least one wireless communication circuit 680. The second antenna system 660 may include the second antenna radiator ②, the ground G2 electrically connected to the second antenna radiator ②, and a second transmission line 661 (e.g., the second transmission line 561 of FIG. 5) between the second antenna radiator ② and the at least one wireless communication circuit 680.

According to an embodiment, the second antenna system 660 may include a switch 662 connected to the second transmission line 661. The second antenna radiator ② may be electrically connected to the at least one wireless communication circuit 680 if the switch 662 is turned on, and may not be electrically connected to (to e.g., electrically separated from) the at least one wireless communication circuit 680 if the switch 662 is turned off. According to an embodiment, the processor 690 may control the switch 662 based on the communication mode. For example, the processor 690 may turn on the switch 662 in a first communication mode, and the at least one wireless communication circuit 680 may transmit and/or receive a signal of a designated frequency related to the first communication mode via the second antenna radiator ②. For example, the processor 690 may turn off the switch 662 in a second communication mode which utilizes a different frequency from the first communication mode.

According to various embodiments, the processor 690 may control the switch 662 according to the unfolded state or the folded state of the electronic device 600 (e.g., see FIG. 3). For example, the processor may turn on the switch 662 in the unfolded state of the electronic device 600, and turn off the switch 662 in the folded state of the electronic device 600.

According to an embodiment, a frequency band usable by the electronic device 600 may include a low band (LB) (about 600~1 gigahertz (GHz)), a middle band (MB) (about 1~2.2 GHz), a high band (HB) (about 2.2~2.7 GHz), or an ultra high band (UHB) (about 2.7~3.6 GHz). According to various embodiments, the electronic device 600 may further utilize other frequency band. According to an embodiment, the first antenna system 650 or the second antenna system 660 may correspond to a transmission line supporting the communication mode using the LB, the MB, the HB, or the UHB. For example, the first antenna system 650 or the second antenna system 660 may support various communication services such as global system for mobile communication (GSM), long term evolution (LTE) or 5th generation (5G) network utilizing a corresponding frequency band.

According to an embodiment, the second side member 620 may include a fifth conductive unit B5 (e.g., the fifth conductive unit A5 of FIG. 5) disposed close to the first antenna radiator ①, and a sixth conductive unit B6 (e.g., the sixth conductive unit A6 of FIG. 5) disposed close to the second antenna radiator ②, in the folded state of the electronic device 600 (e.g., see FIG. 3).

Referring to FIGS. 6A and 6B, in an embodiment, the frequency adjustment circuit 691 (e.g., the first frequency adjustment circuit 591 of FIG. 5) may include at least part of a first electrical path (or a first conductive path) 671 electrically connected between the fifth conductive unit B5 disposed close to the first antenna radiator ① and a ground G51 (e.g., the ground G5 of FIG. 5), in the folded state of the electronic device 600 (e.g., FIG. 3). The frequency adjustment circuit 691 may include a first switch 672 disposed on the first electrical path 671. According to an embodiment, the first switch 672 may include a first terminal 672a electrically connected to the ground G51, and a second terminal 672b electrically connected to a third position (e.g., a third grounding point GP3) closer to the fourth insulating unit 644 than the third insulating unit 643. For example, the fifth conductive unit B5 may be electrically connected to the first conductive path 671 at the third grounding point GP3 positioned near (e.g., within 10 mm) the fourth insulating unit 644 between the fifth and sixth conductive units B5 and B6.

According to an embodiment, the frequency adjustment circuit 691 may further include at least one first lumped element (or a first passive element) 673 such as an inductor disposed on the first electrical path 671. For example, the first lumped element 673 may be connected to a wire between the first switch 672 and the third grounding point GP3. According to various embodiments (not shown), the first lumped element 673 may be connected to a wire between the first switch 672 and the ground G51.

Referring to FIGS. 6A and 6B, in an embodiment, the frequency adjustment circuit 691 may include at least part of a second electrical path (or a second conductive path) 681 electrically connected between the second conductive unit B6 disposed close to the second antenna radiator ② in the folded state of the electronic device 600 (e.g., see FIG. 3) and a ground G52 (e.g., the ground G5 of FIG. 5). The frequency adjustment circuit 691 may include a second switch 682 disposed on the second electrical path 681. According to an embodiment, the second switch 682 may include a third terminal 682a electrically connected to the ground G52, and a fourth terminal 682b electrically connected to a fourth position (e.g., a fourth grounding point GP4) close to the fourth insulating unit 644. For example, the sixth conductive unit B6 may be electrically connected to the second electrical path 681 at the fourth grounding point GP4 positioned near (e.g., within 10 mm) the fourth insulating unit 644 between the fifth and sixth conductive units B5 and B6.

According to an embodiment, the frequency adjustment circuit 691 may further include at least one second lumped element (or a second passive element) 683 such as an inductor disposed on the second electrical path 681. For example, the second lumped element 683 may be connected to a wire between the second switch 682 and the fourth grounding point GP4. According to various embodiments (not shown), the second lumped element 683 may be connected to a wire between the second switch 682 and the ground G52.

According to an embodiment, in the folded state of the electronic device 600 (see FIG. 3), the frequency adjustment circuit 691 may include an electrical element (e.g., an inductor) having a component such as inductance, capacitance or conductance acting on the first antenna system 650 and/or the second antenna system 660, and thus reduce influence of the second side member 620 on the antenna radiation performance of the first antenna radiator ① and/or the second antenna radiator ②.

For example, the processor 690 may turn on the first switch 672 in the folded state of the electronic device 600 (see FIG. 3), and the fifth conductive unit B5 may be electrically connected to the ground G51 through the first lumped element 673. In the folded state of the electronic device 600, the first lumped element 673 may reduce the influence of the fifth conductive unit B5 on the antenna radiation performance of the first antenna radiator ① and/or the antenna radiation performance of the second antenna radiator ②. In the folded state of the electronic device 600, the second side member 620 is close to the first antenna radiator ① and/or the second antenna radiator ② and capacitance (or capacitance component) (e.g., parasitic capacitance) may occur, and a parasitic resonance frequency may be generated due to the capacitance. According to an embodiment, the first lumped element 673 may adjust the parasitic resonance frequency not to include the parasitic resonance frequency generated in the folded state of the electronic device 600 in the resonance frequency band of the first antenna radiator ① and/or the second antenna radiator ②. The parasitic resonance frequency generated in the folded state of the electronic device 600 may be moved out of the resonance frequency band of the first antenna radiator ① and/or the second antenna radiator ② by the first lumped element 673, thus reducing degradation of the antenna radiation performance due to the parasitic resonance frequency.

According to an embodiment, the fifth conductive unit B5 electrically connected to the first lumped element 673 may operate as an additional antenna radiator for transmitting or receiving a signal having a selected or designated frequency, together with the first antenna radiator ① and/or the second antenna radiator ②, in the folded state of the electronic device 600 (see FIG. 3). For example, the fifth conductive unit B5 may operate as an antenna radiator electromagnetically coupled with the first antenna radiator ① and/or the second antenna radiator ② in the folded state of the electronic device 600. According to an embodiment, the first lumped element 673 may have inductance (e.g., inductance component) for reducing capacitance (e.g., parasitic capacitance) which may occur if the fifth conductive unit B5 is close to the first antenna radiator ①. For example, the first lumped element 673 electrically connected to the ground G51 may be electrically connected to the fifth conductive unit B5 to operate as an inductor. According to an embodiment, the first lumped element 673 may adjust impedance of the fifth conductive unit B5 to match impedance of the transmission line related to the first antenna radiator ① and/or the second antenna radiator ②. For example, the inductance of the first lumped element 673 may adjust the impedance of the fifth conductive unit B5.

For example, the processor 690 may turn on the second switch 682 in the folded state of the electronic device 600 (see FIG. 3), and the sixth conductive unit B6 may be electrically connected to the ground G52 through the second lumped element 683. The second lumped element 683 may reduce influence of the sixth conductive unit B6 on the antenna radiation performance of the first antenna radiator ① and/or the antenna radiation performance of the second antenna radiator ②, in the folded state of the electronic device 600. In the folded state of the electronic device 600, the second side member 620 is close to the first antenna radiator ① and/or the second antenna radiator ② and capacitance (or capacitance component) (e.g., parasitic capacitance) may occur, and a parasitic resonance frequency may be generated due to the capacitance. According to an embodiment, the second lumped element 683 may adjust the parasitic resonance frequency not to include the parasitic resonance frequency generated in the folded state of the electronic device 600 in the resonance frequency band of the first antenna radiator ① and/or the second antenna radiator ②. The parasitic resonance frequency generated in the folded state of the electronic device 600 may be moved out of the resonance frequency band of the first antenna radiator ① and/or the second antenna radiator ② by the second lumped element 683, thus reducing the degradation of the antenna radiation performance due to the parasitic resonance frequency.

According to an embodiment, part B64 (e.g., the part A64 of the sixth conductive unit A6 of FIG. 5) of the sixth conductive unit B6 electrically connected to the second lumped element 683 may operate as an additional antenna radiator for transmitting or receiving a signal having a selected or designated frequency, together with the first antenna radiator ① and/or the second antenna radiator ② in the folded state of the electronic device 600 (see FIG. 3). For example, the part B64 of the sixth conductive unit B6 may operate as the antenna radiator electromagnetically coupled with the first antenna radiator ① and/or the second antenna radiator ② in the folded state of the electronic device 600. According to an embodiment, the second lumped element 683 may have inductance (or inductance component) for reducing capacitance (e.g., parasitic capacitance) which may occur if the part B64 of the sixth conductive unit B6 is close to the second antenna radiator ②. For example, the second lumped element 683 electrically connected to the ground G52 may be electrically connected to the sixth conductive unit B6 to operate as an inductor. According to an embodiment, the second lumped element 683 may adjust impedance of the part B64 of the sixth conductive unit B6 to match the impedance of the transmission line related to the first antenna radiator ① and/or the second antenna radiator ②. For example, the inductance of the second lumped element 683 may adjust the impedance of the part B64 of the sixth conductive unit B6.

According to an embodiment, the frequency adjustment circuit 691 in the folded state of the electronic device 600 (see FIG. 3) may function to reduce degradation of the antenna radiating performance due to the parasitic resonance frequency by moving the parasitic resonance frequency generated by the second side member 620 which is close to the first antenna radiator ① and/or the second antenna radiator ②, and function to operate part (e.g., the fifth conductive unit B5 and/or the part B64 of the sixth conductive unit B6) of the second side member 620 as the additional antenna radiator coupled with the first antenna radiator ① and/or the second antenna radiator ② by adjusting the impedance.

According to various embodiments, the frequency adjustment circuit 691 may move the resonance frequency of the first antenna radiator ① and/or the resonance frequency of the second antenna radiator ④ to a designated frequency in the folded state of the electronic device 600 (see FIG. 3), or move it as designated, according to on or off of the first switch 672 or the second switch 682.

For example, in the folded state of the electronic device 600 (see FIG. 3), if the first switch 672 is turned on under control of the processor 690, the first lumped element 673 may be electrically connected to the fifth conductive unit B5, to reduce a resonance frequency of the parasitic component which may occur in the frequency band related to the first antenna radiator ① if the fifth conductive unit B5 is close to the first antenna radiator ①, and/or a resonance frequency of the parasitic component which may occur in the frequency band related to the second antenna radiator ② if the sixth conductive unit B6 is close to the second antenna radiator ②. In the folded state of the electronic device 600, if the first switch 672 is turned off by the control of the processor 690, the fifth conductive unit B5 may be electrically separated from the ground G51. If the fifth conductive unit B5 is electrically separated from the ground G51, the impedance (or the condition of the parasitic resonance) may be changed to reduce the antenna radiation performance degradation of the first antenna system 650 and/or the second antenna system 660 due to the parasitic resonance.

For example, in the folded state of the electronic device 600 (see FIG. 3), if the second switch 682 is turned on under the control of the processor 690, the second lumped element 683 may be electrically connected to the sixth conductive unit B6, to reduce the resonance frequency of the parasitic component which may occur in the frequency band related to the second antenna radiator ② if the sixth conductive unit B6 is close to the second antenna radiator ②, and/or the resonance frequency of the parasitic component which may occur in the frequency band related to the first antenna radiator ① if the fifth conductive unit B5 is close to the second antenna radiator ①. In the folded state of the electronic device 600, if the second switch 682 is turned off by the control of the processor 690, the sixth conductive unit B6 may be electrically separated from the ground G52. If the sixth conductive unit B6 is electrically separated from the ground G52, the impedance (or, the condition of the parasitic resonance) may be changed to reduce the antenna radiation performance degradation of the first antenna system 650 and/or the second antenna system 660 due to the parasitic resonance.

Figure 7A:
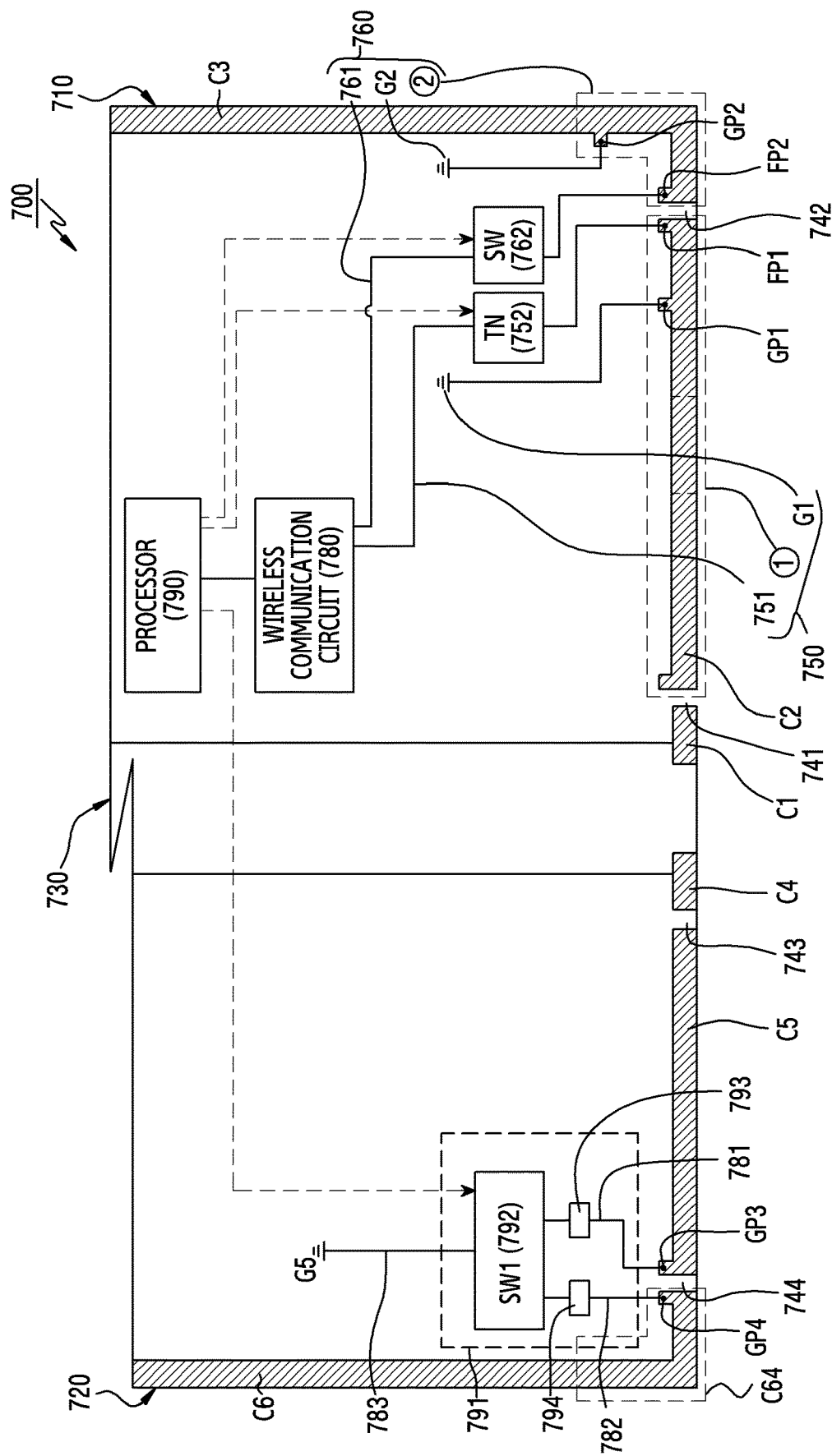
FIG. 7A illustrates a circuit of an electronic device of an unfolded state according to an embodiment of the disclosure.
Figure 7B:
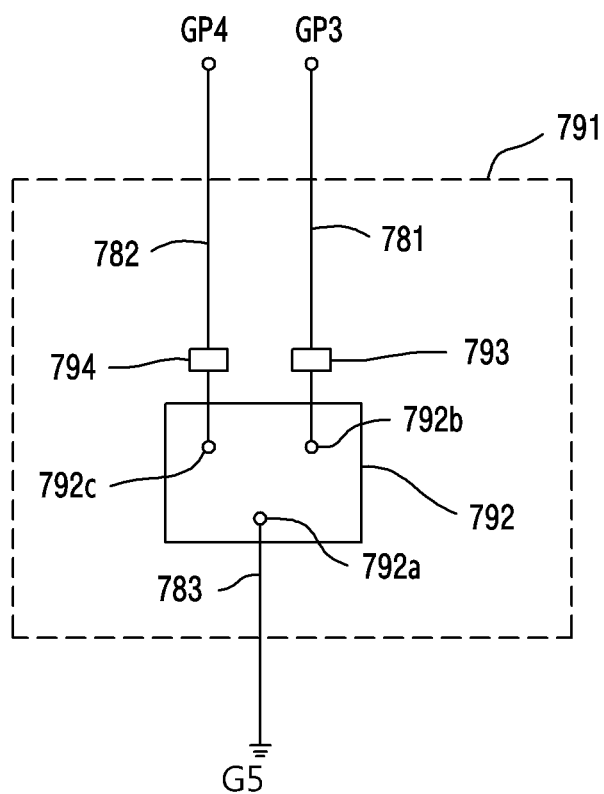
FIG. 7B illustrates a frequency adjustment circuit of FIG. 7A according to an embodiment of the disclosure.

FIG. 7A illustrates a circuit of an electronic device in an unfolded state according to an embodiment of the disclosure. FIG. 7B illustrates a frequency adjustment circuit of FIG. 7A according to an embodiment of the disclosure.

Referring to FIG. 7A, in an embodiment, an electronic device 700 (e.g., the electronic device 500 of FIG. 5) may include at least one of a first side member 710 (e.g., the first side member 510 of FIG. 5), a second side member 720 (e.g., the second side member 620 of FIG. 6A), a hinge structure 730 (e.g., the hinge structure 530 of FIG. 5), at least one wireless communication circuit 780 (e.g., the wireless communication circuit 580 of FIG. 5), a processor 790 (e.g., the processor 590 of FIG. 5) or a frequency adjustment circuit 791 (e.g., the first frequency adjustment circuit 591 of FIG. 5).

According to an embodiment, the first side member 710 may include at least one of a first conductive unit C1 (e.g., the first conductive unit A1 of FIG. 5), a first insulating unit 741 (e.g., the first insulating unit 541 of FIG. 5), a second conductive unit C2 (e.g., the second conductive unit A2 of FIG. 5), a second insulating unit 742 (e.g., the second insulating unit 542 of FIG. 5), and a third conductive unit C3 (e.g., the third conductive unit A3 of FIG. 5) which are sequentially disposed from the hinge structure 730.

According to an embodiment, the second side member 720 may include at least one of a fourth conductive unit C4 (e.g., the fourth conductive unit A4 of FIG. 5), a third insulating unit 743 (e.g., the third insulating unit 543 of FIG. 5), a fifth conductive unit C5 (e.g., the fifth conductive unit A5 of FIG. 5), a fourth insulating unit 744 (e.g., the fourth insulating unit 544 of FIG. 5), and a sixth conductive unit C6 (e.g., the sixth conductive unit A6 of FIG. 5) which are sequentially disposed from the hinge structure 730.

According to an embodiment, a first antenna radiator ① (e.g., the first antenna radiator ① of FIG. 5) may be formed as at least part of the second conductive unit C2 included in the first side member 710. A second antenna radiator ② (e.g., the second antenna radiator 2 of FIG. 5) may be formed as at least part of the third conductive unit C3 included in the first side member 710. A first antenna system 750 (e.g., the first antenna system 650 of FIG. 6A) may include the first antenna radiator ① (e.g., the first antenna radiator ① of FIG. 6A), a ground G1 (e.g., the ground G1 of FIG. 6A) electrically connected with the first antenna radiator ①, a first transmission line 751 (e.g., the first transmission line 651 of FIG. 6A) between the first antenna radiator ① and at least one wireless communication circuit 780 or a tuner 752 (e.g., the tuner 652 of FIG. 6A). A second antenna system 760 (e.g., the second antenna system 660 of FIG. 6A) may include the second antenna radiator ② (e.g., the second antenna radiator ② of FIG. 6A), a ground G2 (e.g., the ground G2 of FIG. 6A) electrically connected to the second antenna radiator ②, a second transmission line 761 (e.g., the second transmission line 661 of FIG. 6A) between the second antenna radiator ② and the at least one wireless communication circuit 780 or a switch 762 (e.g., the switch 662 of FIG. 6A). The first antenna radiator ① or the second antenna radiator ② may be formed as at least part of the first side member 710. Since the first antenna system 750 or the second antenna system 760 is substantially the same as FIG. 6A, its detailed descriptions are omitted.

According to an embodiment, the at least one wireless communication circuit 780 may be electrically connected to a first position (e.g., a first feeding point FP1) of the second conductive unit C2 closer to the second insulating unit 742 than the first insulating unit 741. The at least one wireless communication circuit 780 may transmit and/or receive a first signal of a first frequency band through the first antenna radiator ① formed as at least part of the second conductive unit C2. For example, the first feeding point FP1 may be positioned near (e.g., within about 10 mm) the second insulating unit 742.

According to an embodiment, the at least one wireless communication circuit 780 may be electrically connected to a second position (e.g., a second feeding point FP2) of the third conductive unit C3 close to the second insulating unit 742. The at least one wireless communication circuit 780 may transmit and/or receive a second signal of a second frequency band through the second antenna radiator ② formed as at least part of the third conductive unit C3. For example, the second feeding point FP2 may be positioned near (e.g., within about 10 mm) the second insulating unit 742.

According to an embodiment, the second side member 720 may include a fifth conductive unit C5 (e.g., the fifth conductive unit A5 of FIG. 5) disposed close to the first antenna radiator ①, and a sixth conductive unit C6 (e.g., the sixth conductive unit A6 of FIG. 5) disposed close to the second antenna radiator ②, in the folded state of the electronic device 700 (e.g., see FIG. 3).

Referring to FIGS. 7A and 7B, in an embodiment, the frequency adjustment circuit 791 (e.g., the first frequency adjustment circuit 591 of FIG. 5) may include at least one first switch 792 including a first terminal 792a electrically connected to a ground G5 (e.g., the ground G5 of FIG. 5), a second terminal 792b electrically connected to a third position (e.g., a third grounding point GP3) of the fifth conductive unit C5 closer to the fourth insulating unit 744 than the third insulating unit 743, and a third terminal 792c electrically connected to a fourth position (e.g., a fourth grounding point GP4) of the sixth conductive unit C6 close to the fourth insulating unit 744. For example, the third grounding point GP3 or the fourth grounding point GP4 may be positioned near (e.g., within about 10 mm) the fourth insulating unit 744.

According to an embodiment, the frequency adjustment circuit 791 may further include at least one first lumped element (or a first passive element) 793 disposed on a first electrical path 781 electrically connected between the third grounding point GP3 and the ground G5. For example, the at least one first lumped element 793 may be connected between the second terminal 792b of the at least one first switch 792 and the third grounding point GP3.

According to an embodiment, the frequency adjustment circuit 791 may further include at least one second lumped element (or a second passive element) 794 disposed on a second electrical path 782 electrically connected between the fourth grounding point GP4 and the ground G5. For example, the at least one second lumped element 794 may be connected between the third terminal 792c of the at least one first switch 792 and the fourth grounding point GP4.

According to an embodiment, the first switch 792 may electrically connect the first terminal 792a with at least one of the second terminal 792b and the third terminal 792c, under control of the processor 790. For example, if the first switch 792 electrically connects the first terminal 792a and the second terminal 792b, the fifth conductive unit C5 may be electrically connected to the ground G5 through the first lumped element 793. For example, if the first switch 792 electrically connects the first terminal 792a and the third terminal 792c, the sixth conductive unit C6 may be electrically connected to the ground G5 through the second lumped element 794. According to an embodiment (not shown), in place of the first lumped element 793 and the second lumped element 794, a lumped element connected to an electrical path 783 electrically connected between the first switch 792 and the ground G5 may be included.

According to an embodiment, in the folded state of the electronic device 700 (see FIG. 3), the frequency adjustment circuit 791 may include an electrical element (e.g., an inductor) having the component such as inductance, capacitance or conductance acting on the first antenna system 750 and/or the second antenna system 760, thus reducing influence of the second side member 720 on antenna radiation performance of the first antenna radiator ① and/or the second antenna radiator ②.

For example, the fifth conductive unit C5 may be electrically connected to the ground G5 through the first lumped element 793 in the folded state of the electronic device 700 (see FIG. 3). The first lumped element 793 may reduce the influence of the fifth conductive unit C5 on the antenna radiation performance for the first antenna radiator ① and/or the antenna radiation performance for the second antenna ②, in the folded state of the electronic device 700. In the folded state of the electronic device 700, the side member 720 may be close to the first antenna radiator ① and/or the second antenna radiator ② to generate parasitic capacitance, and the parasitic resonance may generate a parasitic resonance frequency. According to an embodiment, the first lumped element 793 may adjust the parasitic resonance frequency not to include the parasitic resonance frequency generated in the folded state of the electronic device 700 in a resonance frequency band of the first antenna radiator ① and/or the second antenna radiator ②. The parasitic resonance frequency generated in the folded state of the electronic device 700 may be moved out of the resonance frequency band of the first antenna radiator ① and/or the second antenna radiator ② by the first lumped element 793, thus reducing degradation of the antenna radiation performance due to the parasitic resonance frequency.

According to an embodiment, the fifth conductive unit C5 electrically connected to the first lumped element 793 may operate as an additional antenna radiator for transmitting or receiving a signal having a selected or designated frequency, together with the first antenna radiator ① and/or the second antenna radiator ② in the folded state of the electronic device 700 (see FIG. 3). For example, the fifth conductive unit C5 may operate as the antenna radiator electromagnetically coupled with the first antenna radiator ① and/or the second antenna radiator ② in the folded state of the electronic device 700. According to an embodiment, the first lumped element 793 may have inductance for reducing the parasitic capacitance which may occur if the fifth conductive unit C5 is close to the first antenna radiator ①. For example, the first lumped element 793 electrically connected to the ground G5 may be electrically connected to the fifth conductive unit C5 to operate as an inductor. According to an embodiment, the first lumped element 793 may adjust impedance of the fifth conductive unit C5 to match impedance of a transmission line related to the first antenna radiator ① and/or the second antenna radiator ②. For example, the inductance of the first lumped element 793 may adjust the impedance of the fifth conductive unit C5.

For example, in the folded state of the electronic device 700 (see FIG. 3), the sixth conductive unit C6 may be electrically connected to the ground G5 through the second lumped element 794. In the folded state of the electronic device 700, the second lumped element 794 may reduce influence of the sixth conductive unit C6 on the antenna radiation performance for the first antenna radiator ① and/or the antenna radiation performance for the second antenna radiator ②. In the folded state of the electronic device 700, the second side member 720 may be close to the first antenna radiator ① and/or the second antenna radiator ② to generate parasitic capacitance, and the parasitic capacitance may generate a parasitic resonance frequency. According to an embodiment, the second lumped element 794 may adjust the parasitic resonance frequency not to include the parasitic resonance frequency generated in the folded state of the electronic device 700 in the resonance frequency band of the first antenna radiator ① and/or the second antenna radiator ②. The parasitic resonance frequency generated in the folded state of the electronic device 700 may be moved out of the resonance frequency band of the first antenna radiator ① and/or the second antenna radiator ② by the second lumped element 794, thus reducing degradation of the antenna radiation performance due to the parasitic resonance frequency.

According to an embodiment, part C64 (e.g., the part A64 of the sixth conductive unit A6 of FIG. 5) of the sixth conductive unit C6 electrically connected to the second lumped element 794 may operate as an additional antenna radiator for transmitting or receiving a signal having a selected or designated frequency, together with the first antenna radiator ① and/or the second antenna radiator ② in the folded state of the electronic device 700 (see FIG. 3). For example, the part C64 of the sixth conductive unit C6 may operate as the antenna radiator electromagnetically coupled to the first antenna radiator ① and/or the second antenna radiator ② in the folded state of the electronic device 700. According to an embodiment, the second lumped element 794 may have inductance (or inductance component) for reducing capacitance (e.g., parasitic capacitance) which may occur if the part C64 of the sixth conductive unit C6 is close to the second antenna radiator ②. For example, the second lumped element 794 electrically connected to the ground G5 may be electrically connected to the sixth conductive unit C6 to operate as an inductor. According to an embodiment, the second lumped element 794 may adjust impedance of the part C64 of the sixth conductive unit C6 to match impedance of a transmission line related to the first antenna radiator ① and/or the second antenna radiator ②. For example, the inductance of the second lumped element 794 may adjust the impedance of the part C64 of the sixth conductive unit C6.

According to an embodiment, the frequency adjustment circuit 791 in the folded state of the electronic device 700 (see FIG. 3) may function to reduce degradation of the antenna radiating performance due to the parasitic resonance frequency by moving the parasitic resonance frequency generated by the second side member 720 which is close to the first antenna radiator ① and/or the second antenna radiator ②, and function to operate the part (e.g., the fifth conductive unit C5 and/or the part C64 of the sixth conductive unit C6) of the second side member 720 as the additional antenna radiator coupled with the first antenna radiator ① and/or the second antenna radiator ② by adjusting the impedance.

According to various embodiments, the frequency adjustment circuit 791 may move the resonance frequency of the first antenna radiator ① and/or the second antenna radiator ④ to a designated frequency in the folded state of the electronic device 700 (see FIG. 3), or move it as designated, according to on or off of the switch 792.

For example, in the folded state of the electronic device 700 (see FIG. 3), according to the switching state of the first switch 792, the fifth conductive unit C5 may be electrically connected to the G5 through the first lumped element 793, or the sixth conductive unit C6 may be electrically connected to the ground G5 through the second lumped element 794. Impedance characteristics of the first antenna system 750 or the second antenna system 760 may vary according to the switching state of the first switch 792, and thus the resonance frequency of the first antenna radiator ① and/or the resonance frequency of the second antenna radiator ② may be moved.

Figure 8:
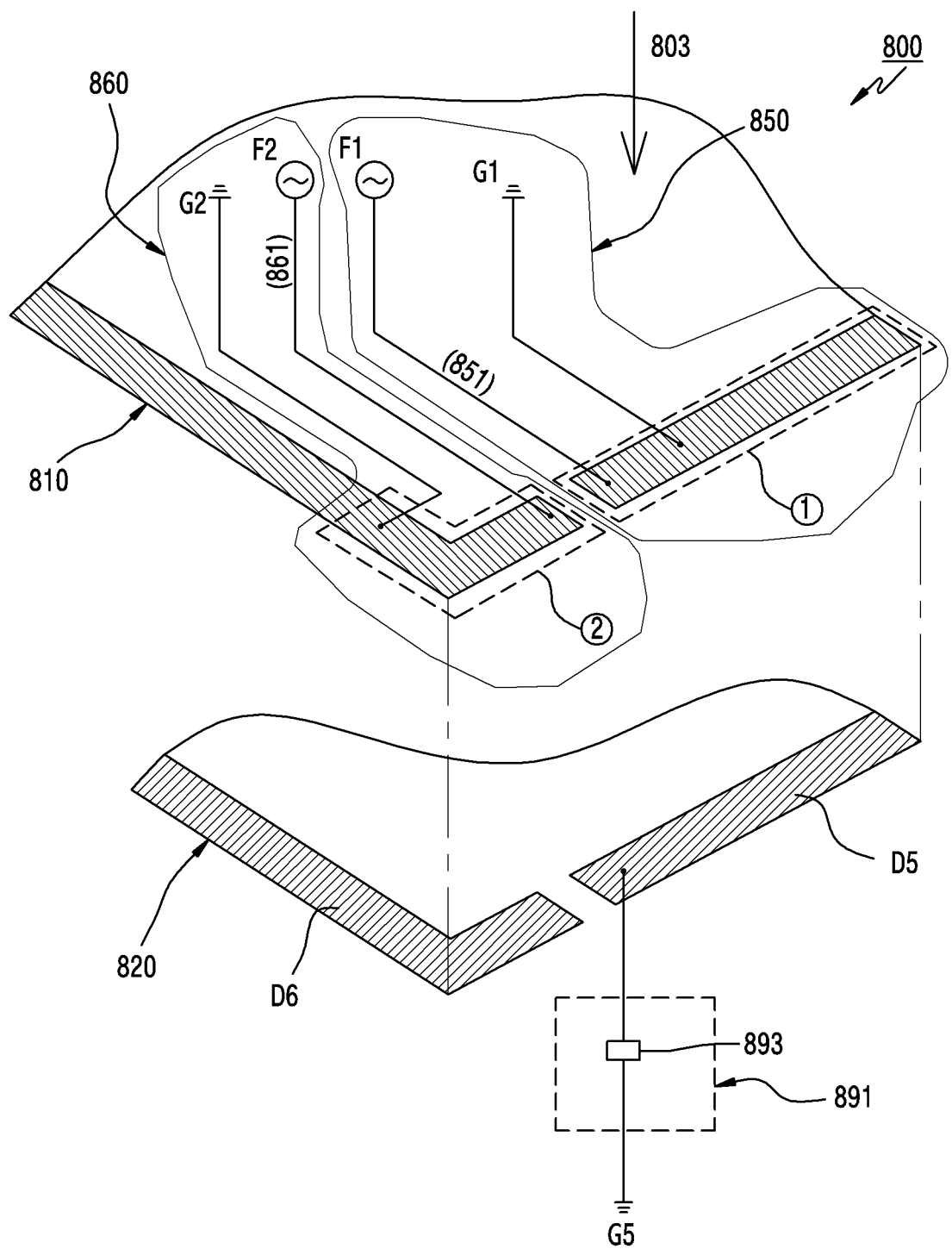
FIG. 8 illustrates a circuit related to a folded state of an electronic device according to an embodiment of the disclosure.
Figure 9A:
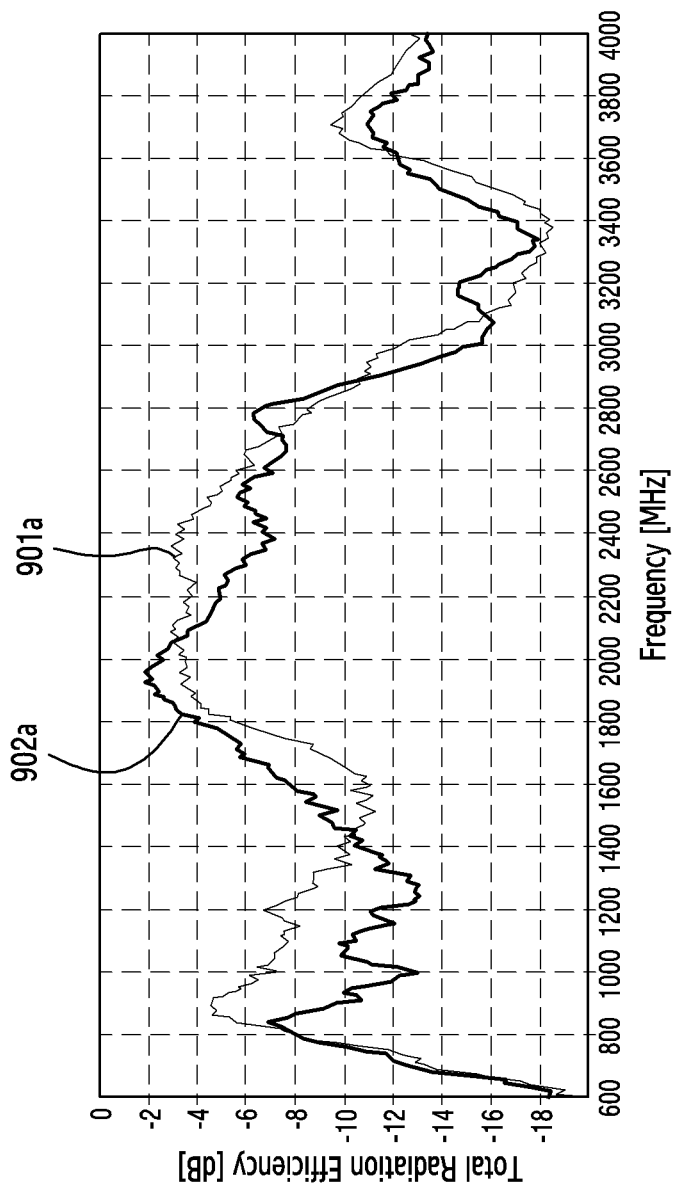
FIG. 9A is a graph showing antenna radiation performance on a frequency distribution for a first antenna system if an electronic device not including a frequency adjustment circuit is unfolded or folded according to an embodiment of the disclosure.
Figure 9B:
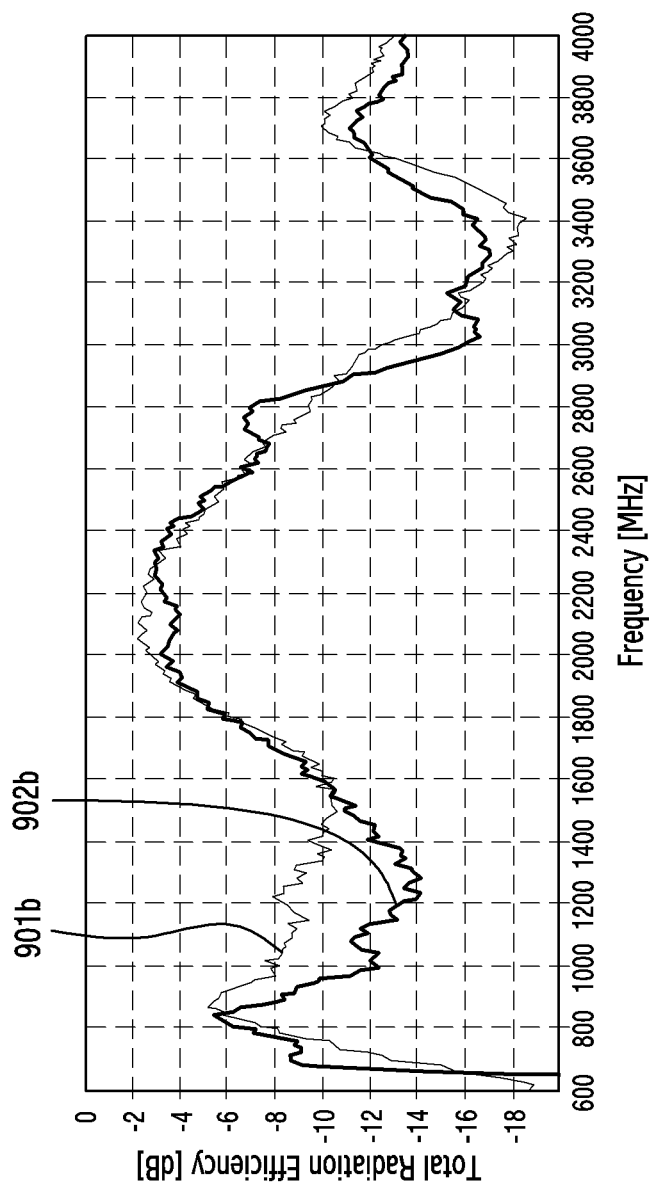
FIG. 9B is a graph showing the antenna radiation performance on the frequency distribution for the first antenna system if the electronic device including the frequency adjustment circuit is unfolded or folded according to an embodiment of the disclosure.
Figure 10A:
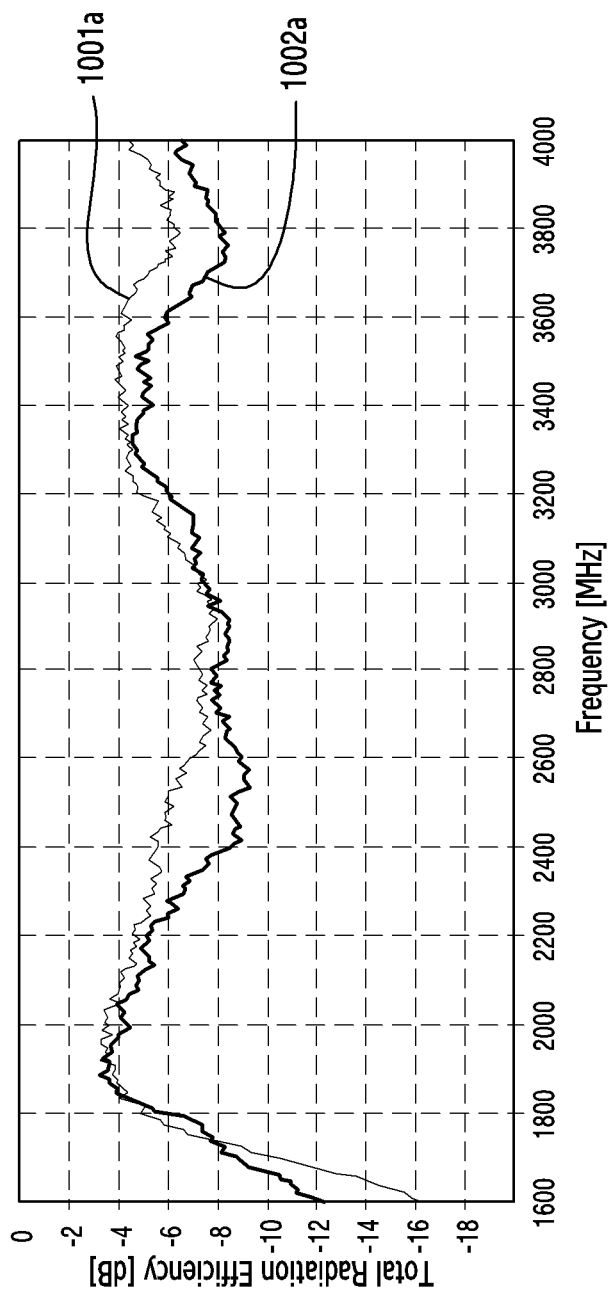
FIG. 10A is a graph showing antenna radiation performance on a frequency distribution for a second antenna system if an electronic device not including a frequency adjustment circuit is unfolded or folded according to an embodiment of the disclosure.
Figure 10B:
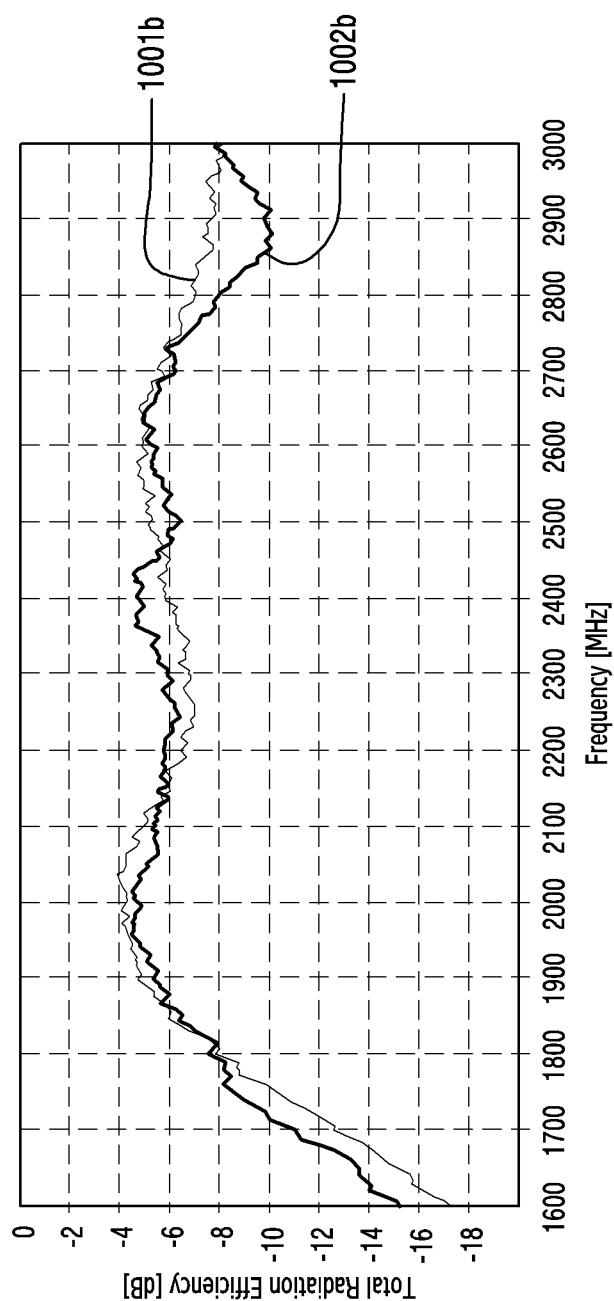
FIG. 10B is a graph showing the antenna radiation performance on the frequency distribution for the second antenna system if the electronic device including the frequency adjustment circuit is unfolded or folded according to an embodiment of the disclosure.

FIG. 8 illustrates a circuit related to a folded state of an electronic device according to an embodiment of the disclosure. FIG. 9A is a graph showing antenna radiation performance on a frequency distribution for a first antenna system if an electronic device not including a frequency adjustment circuit is unfolded or folded according to an embodiment of the disclosure. FIG. 9B is a graph showing the antenna radiation performance on the frequency distribution for the first antenna system if the electronic device including the frequency adjustment circuit is unfolded or folded according to an embodiment of the disclosure. FIG. 10A is a graph showing antenna radiation performance on a frequency distribution for a second antenna system if an electronic device not including a frequency adjustment circuit is unfolded or folded according to an embodiment of the disclosure. FIG. 10B is a graph showing the antenna radiation performance on the frequency distribution for the second antenna system if the electronic device including the frequency adjustment circuit is unfolded or folded according to an embodiment of the disclosure.

Referring to FIG. 8, in various embodiments, an electronic device 800 may be the electronic device 500 of FIG. 5, the electronic device 600 of FIG. 6A or the electronic device 700 of FIG. 7A. The electronic device 800 may include a first antenna system 850 or a second antenna system 860. In an embodiment, the first antenna system 850 may include a first antenna radiator ① formed as at least part of a first side member 810, a ground G1 electrically connected to the first antenna radiator ①, and a first transmission line 851 between a first feed unit F1 and the first antenna radiator ①. In an embodiment, the second antenna system 860 may include a second antenna radiator ② formed as at least part of the first side member 810, a ground G2 electrically connected to the second antenna radiator ②, and a second transmission line 861 between a second feed unit F2 and the second antenna radiator ②. According to various embodiments, the first antenna system 850 may include the first antenna system 550 of FIG. 5, the first antenna system 650 of FIG. 6A, or the first antenna system 750 of FIG. 7A. According to various embodiments, the second antenna system 860 may include the second antenna system 560 of FIG. 5, the second antenna system 660 of FIG. 6A, or the second antenna system 760 of FIG. 7A.

According to an embodiment, when viewed in a third direction 803 (e.g., the third direction 203 of FIG. 2) in the folded state of the electronic device 600, the first antenna radiator ① may be disposed by at least overlapping a fifth conductive unit D5 (e.g., the fifth conductive unit B5 of FIG. 6A, or the fifth conductive unit C5 of FIG. 7A) of the second side member 820. When viewed in the third direction (e.g., the third direction 203 of FIG. 2) in the folded state of the electronic device 600, the second antenna radiator ② may be disposed by at least overlapping a sixth conductive unit D6 (e.g., the sixth conductive unit B6 of FIG. 6A or the sixth conductive unit C6 of FIG. 7A) of the second side member 820.

According to an embodiment, by controlling a frequency adjustment circuit 891 (e.g., the frequency adjustment circuit 691 of FIG. 6A, or the frequency adjustment circuit 791 of FIG. 7A) in the folded state, the electronic device 800 may electrically connect the fifth conductive unit D5 to the ground G5 (e.g., the ground G51 of FIG. 6A, or the ground G5 of FIG. 7A) through a first lumped element 893 (e.g., the first lumped element 673 of FIG. 6A, or the first lumped element 793 of FIG. 7A). In the folded state, the electronic device 800 may control the frequency adjustment circuit 891, to electrically separate the sixth conductive unit D6 and the ground G5.

Referring to FIG. 9A, 901a indicates the antenna radiation performance on the frequency distribution of the first antenna system 850, if the electronic device not including the frequency adjustment circuit 891 is unfolded. 902a indicates the antenna radiation performance on the frequency distribution for the first antenna system 850, if the electronic device not including the frequency adjustment circuit 891 is folded. Referring to 901a and 902a, the antenna radiation performance of the first antenna system 850 in at least some frequency band deteriorates if the electronic device is changed from the unfolded state to the folded state.

Referring to FIG. 9B, 901b indicates the antenna radiation performance on the frequency distribution of the first antenna system 850, if the electronic device 800 including the frequency adjustment circuit 891 is unfolded (see FIG. 2). 902b indicates the antenna radiation performance on the frequency distribution for the first antenna system 850, if the electronic device 800 including the frequency adjustment circuit 891 has the circuit state of FIG. 8 in the folded state. Referring to FIG. 8, in the folded state of the electronic device 800, the first lumped element 893 may reduce the influence of the second side member 820 on the antenna radiation performance for the first antenna system 850 in at least some frequency band. Referring to 901b and 902b, the antenna radiation performance for the first antenna system 850 in at least some frequency band does not deteriorate even if the electronic device 800 is changed from the unfolded state to the folded state, or its deterioration degree may be smaller than the case not including the frequency adjustment circuit 891.

Referring to FIG. 10A, 1001a indicates the antenna radiation performance on the frequency distribution for the second antenna system 860, if the electronic device not including the frequency adjustment circuit 891 is unfolded. 1002a indicates the antenna radiation performance on the frequency distribution for the second antenna system 860, if the electronic device not including the frequency adjustment circuit 891 is folded. Referring to 1001a and 1002a, the antenna radiation performance of the second antenna system in at least some frequency band deteriorates, if the electronic device is changed from the unfolded state to the folded state.

Referring to FIG. 10B, 1001b indicates the antenna radiation performance on the frequency distribution of the second antenna system 860, if the electronic device 800 including the frequency adjustment circuit 891 is unfolded. 902b indicates the antenna radiation performance on the frequency distribution of the second antenna system 860, if the electronic device 800 including the frequency adjustment circuit 891 has the circuit state of FIG. 8 in the folded state. Referring to FIG. 8, in the folded state of the electronic device 800, the first lumped element 893 may reduce the influence of the second side member 820 on the antenna radiation performance of the second antenna system 860 in at least some frequency band. Referring to 1001b and 1002b, the antenna radiation performance of the second antenna system 860 in at least some frequency band does not deteriorate even if the electronic device 800 is changed from the unfolded state to the folded state, or its deterioration degree may be smaller than the case not including the frequency adjustment circuit 891.

In various embodiments (not shown), the electronic device 800 may electrically connect the sixth conductive unit D6 to the ground (e.g., the ground G52 of FIG. 6A, or the ground G5 of FIG. 7A) through the second lumped element (e.g., the second lumped element 683 of FIG. 6A, or the second lumped element 794 of FIG. 7A), by controlling the frequency adjustment circuit 891 (e.g., the frequency adjustment circuit 691 of FIG. 6A, or the frequency adjustment circuit 791 of FIG. 7A) in the folded state. According to various embodiments, the second side member 820 may be electrically connected to the ground (e.g., the ground G51 or G52 of FIG. 6A, or the ground G5 of FIG. 7A) through at least one lumped element (e.g., the first lumped element 673 and the second lumped element of FIG. 6A, or the first lumped element 793 and the second lumped element 794 of FIG. 7A) by the control of the frequency adjustment circuit 891. Hence, the loading of the electrical element by the at least one lumped element may reduce the influence of the second side member 820 on the antenna radiation performance of the first antenna system 850 and/or the second antenna system 860 in at least some frequency band in the folded state of the electronic device 800.

Figure 11:
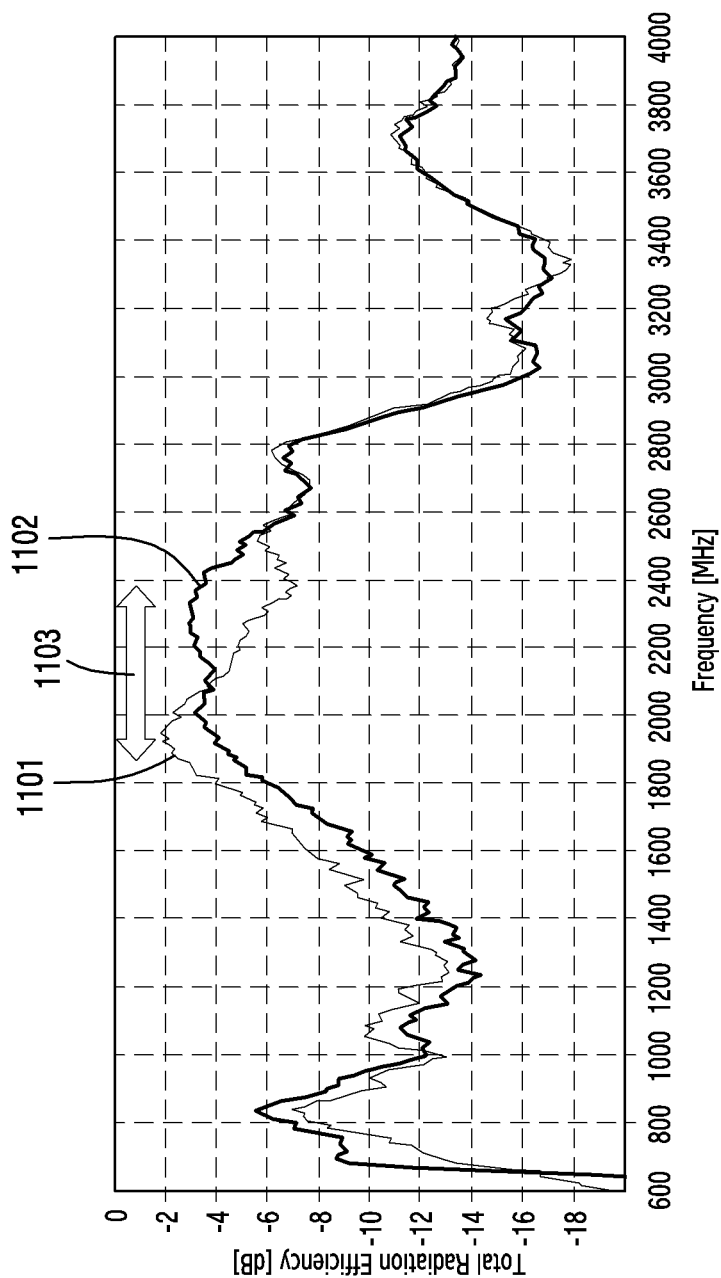
FIG. 11 is a graph showing antenna radiation performance on a frequency distribution of a first antenna system, if an electronic device of FIG. 6A in a folded state turns off or on a first switch of a frequency adjustment circuit according to an embodiment of the disclosure.

FIG. 11 is a graph showing antenna radiation performance on a frequency distribution of a first antenna system 650, if a first switch 672 of a frequency adjustment circuit 691 is turned off and on in a folded state of an electronic device 600 of FIG. 6A according to an embodiment of the disclosure.

Referring to FIGS. 6A and 11, 1101 indicates the antenna radiation performance on the frequency distribution for the first antenna system 650, if the first switch 672 of the frequency adjustment circuit 691 is turned off in the folded state of the electronic device 600. 1102 indicates the antenna radiation performance on the frequency distribution of the first antenna system 650, if the first switch 672 of the frequency adjustment circuit 691 is turned on in the folded state of the electronic device 600. According to an embodiment, if the first switch 672 is on, the third conductive element B4 may be electrically connected to the ground G51 through the first lumped element 673 (e.g., see FIG. 8).

According to an embodiment, if the first switch 672 is turned on, the first lumped element 673 may act loading of an electrical element (e.g., inductance loading) on the first antenna system 650. Hence, the antenna radiation performance on the frequency distribution for the first antenna system 650 may differ if the first switch 672 is turned off or on (see 1101 and 1102).

For example, the antenna radiation performance for the first antenna system 650 in a first frequency band (e.g., the LB or the MB) may be higher if the first switch 672 is turned off. For example, the antenna radiation performance for the first antenna system 650 in a second frequency band (e.g., the HB) different from the first frequency band may be higher if the first switch 672 is turned on. According to an embodiment, the resonance frequency of the first antenna system 650 (or, the first antenna radiator ①) in the folded state of the electronic device 600 may be generated in the first frequency band if the first switch 672 is turned off, and the resonance frequency of the first antenna system 650 (or, the first antenna radiator ①) may be generated in the second frequency band if the first switch 672 is turned on.

According to an embodiment, the electronic device 600 in the folded state may change the frequency band utilizing the first antenna radiator ① according to on or off of the first switch 672 (see 1103). For example, if the first switch 672 is off, the electronic device 600 may be set to transmit or receive the electromagnetic wave via the first antenna radiator ① in the first frequency band. For example, if the first switch 672 is turned on, the electronic device 600 may be set to transmit or receive the electromagnetic wave via the first antenna radiator ① in the second frequency band.

According to various embodiments, referring to FIGS. 7A and 11, 1101 may indicate the antenna radiation performance on the frequency distribution of the first antenna system 750 if the first terminal 792*a* and the second terminal 792*b* are not electrically connected by controlling the first switch 792 of the frequency adjustment circuit 791 in the folded state of the electronic device 700. According to various embodiments, referring to FIGS. 7A and 11, 1102 may indicate the antenna radiation performance on the frequency distribution of the first antenna system 750 if the first terminal 792*a* and the second terminal 792*b* are electrically connected by controlling the first switch 792 of the frequency adjustment circuit 791 in the folded state of the electronic device 700. In an embodiment, if the first terminal 792*a* and the second terminal 792*b* are electrically connected, the first lumped element 793 may act the loading (e.g., the inductance loading) of the electrical element on the first antenna system 750. For example, not electrically connecting the first terminal 792*a* and the second terminal 792*b* in the frequency adjustment circuit 791 may be substantially the same as turning off the first switch 672 in the frequency adjustment circuit 691 of FIG. 6A. For example, electrically connecting the first terminal 792*a* and the second terminal 792*b* in the frequency adjustment circuit 791 may be substantially the same as turning on the first switch 672 in the frequency adjustment circuit 691 of FIG. 6A.

Figure 12:
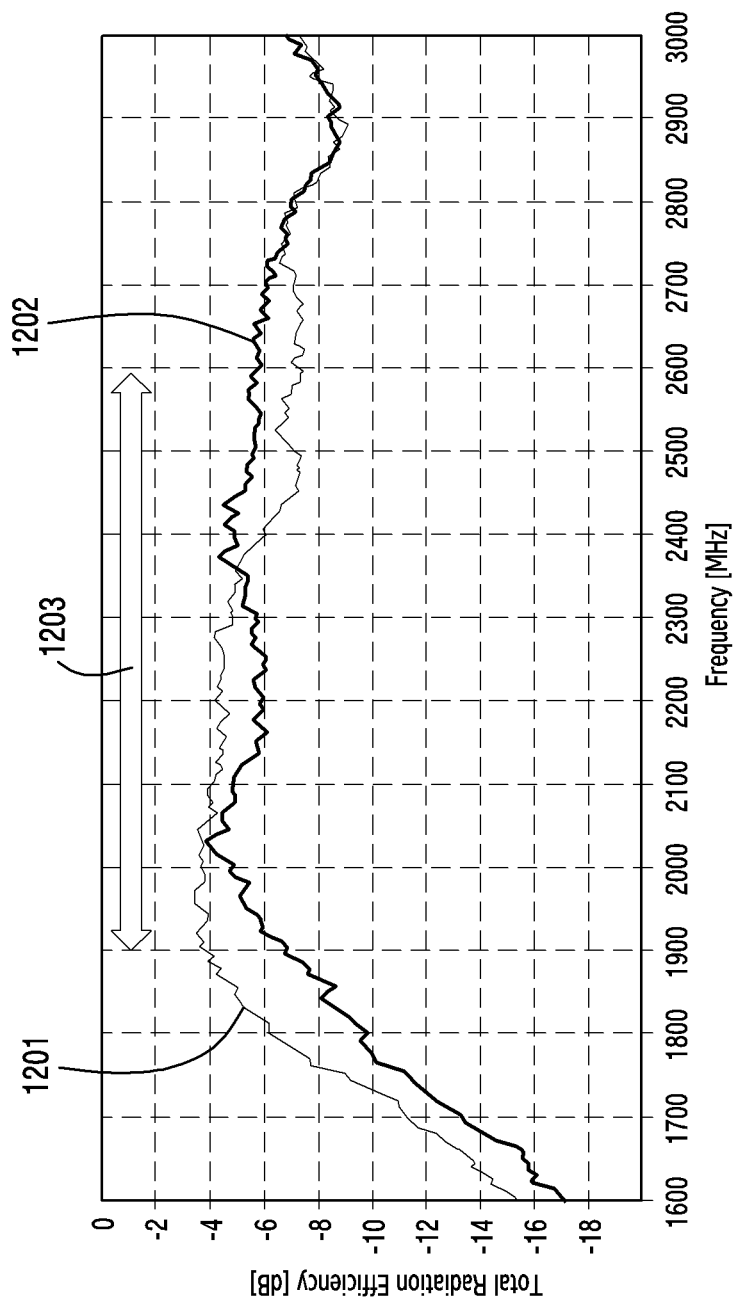
FIG. 12 is a graph showing antenna radiation performance on a frequency distribution of a second antenna system, if an electronic device of FIG. 6A in a folded state turns off or on a first switch of a frequency adjustment circuit according to an embodiment of the disclosure.

FIG. 12 is a graph showing antenna radiation performance on a frequency distribution of a second antenna system 660, if a first switch 672 of a frequency adjustment circuit 691 is turned off and on in a folded state of an electronic device 600 of FIG. 6A according to an embodiment of the disclosure.

Referring to FIGS. 6A and 12, 1201 indicates the antenna radiation performance on the frequency distribution of the second antenna system 660 if the first switch 672 of the frequency adjustment circuit 691 is turned off in the folded state of the electronic device 600. 1202 indicates the antenna radiation performance on the frequency distribution of the second antenna system 660 if the first switch 672 of the frequency adjustment circuit 691 is turned on in the folded state of the electronic device 600. According to an embodiment, if the first switch 672 is on, the third conductive element B3 may be electrically connected to the ground G51 through the first lumped element 673 (e.g., see FIG. 8).

According to an embodiment, if the first switch 672 is turned on, the first lumped element 673 may act the loading of the electrical element (e.g., the inductance loading) on the second antenna system 660. Hence, the antenna radiation performance on the frequency distribution for the second antenna system 660 may differ if the first switch 672 is turned off or on (see 1201 and 1202).

For example, the antenna radiation performance for the first antenna system 650 in the first frequency band (e.g., about 1600~about 2350 MHz) may be higher if the first switch 672 is turned off. For example, the antenna radiation performance for the second antenna system 660 in the second frequency band different from the first frequency band (e.g., 2350~about 2700 MHz) may be higher if the first switch 672 is turned on. According to an embodiment, the resonance frequency of the second antenna system 660 (or, the second antenna radiator ②) in the folded state of the electronic device 600 may be generated in the first frequency band if the first switch 672 is turned off, and the resonance frequency of the second antenna system 660 (or, the second antenna radiator ②) if the first switch 672 is turned on may be generated in the second frequency band.

According to an embodiment, the electronic device 600 may change the frequency band utilizing the second antenna radiator ② in the folded state according to on or off of the first switch 672 (see 1203). For example, if the first switch 672 is turned off, the electronic device 600 may be set to transmit or receive the electromagnetic wave through the second antenna radiator ② in the first frequency band. For example, if the first switch 672 is turned on, the electronic device 600 may be set to transmit or receive the electromagnetic wave through the second antenna radiator ② in the second frequency band.

According to various embodiments, referring to FIGS. 7A and 12, 1201 may indicate the antenna radiation performance on the frequency distribution of the second antenna system 760 if the first terminal 792*a* and the second terminal 792*b* are not electrically connected by controlling the first switch 792 of the frequency adjustment circuit 791 in the folded state of the electronic device 700. According to various embodiments, referring to FIGS. 7A and 11, 1202 may indicate the antenna radiation performance on the frequency distribution of the second antenna system 760 if the first terminal 792*a* and the second terminal 792*b* are electrically connected by controlling the first switch 792 of the frequency adjustment circuit 791 in the folded state of the electronic device 700. In an embodiment, if the first terminal 792*a* and the second terminal 792*b* are electrically connected, the first lumped element 793 may act the loading of the electrical element (e.g., the inductance loading) on the first antenna system 750. For example, not electrically connecting the first terminal 792*a* and the second terminal 792*b* in the frequency adjustment circuit 791 may be substantially the same as turning off the first switch 672 in the frequency adjustment circuit 691 of FIG. 6A. For example, electrically connecting the first terminal 792*a* and the second terminal 792*b* in the frequency adjustment circuit 791 may be substantially the same as turning on the first switch 672 in the frequency adjustment circuit 691 of FIG. 6A.

Figure 13:
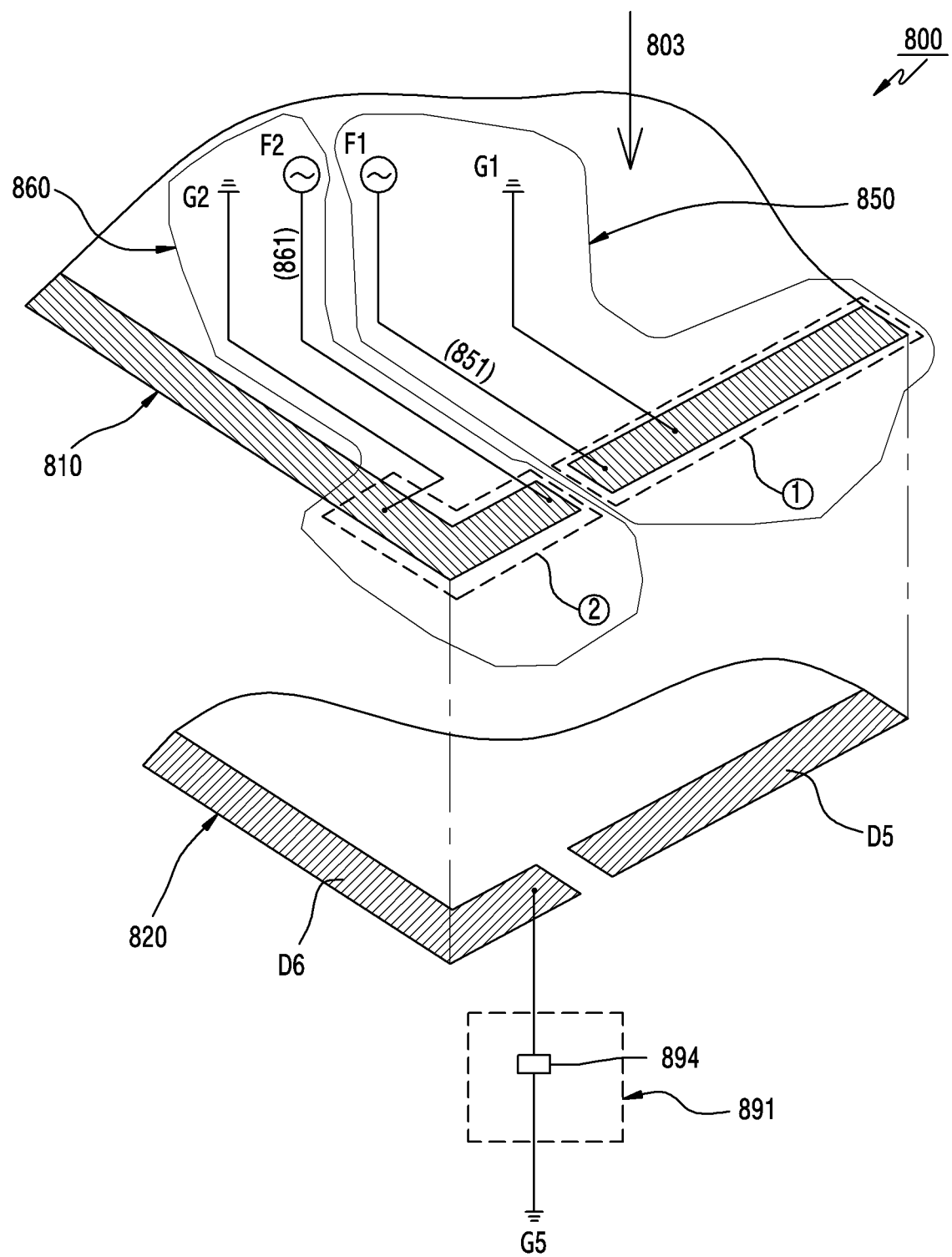
FIG. 13 illustrates a circuit related to a folded state of an electronic device according to an embodiment of the disclosure.
Figure 14:
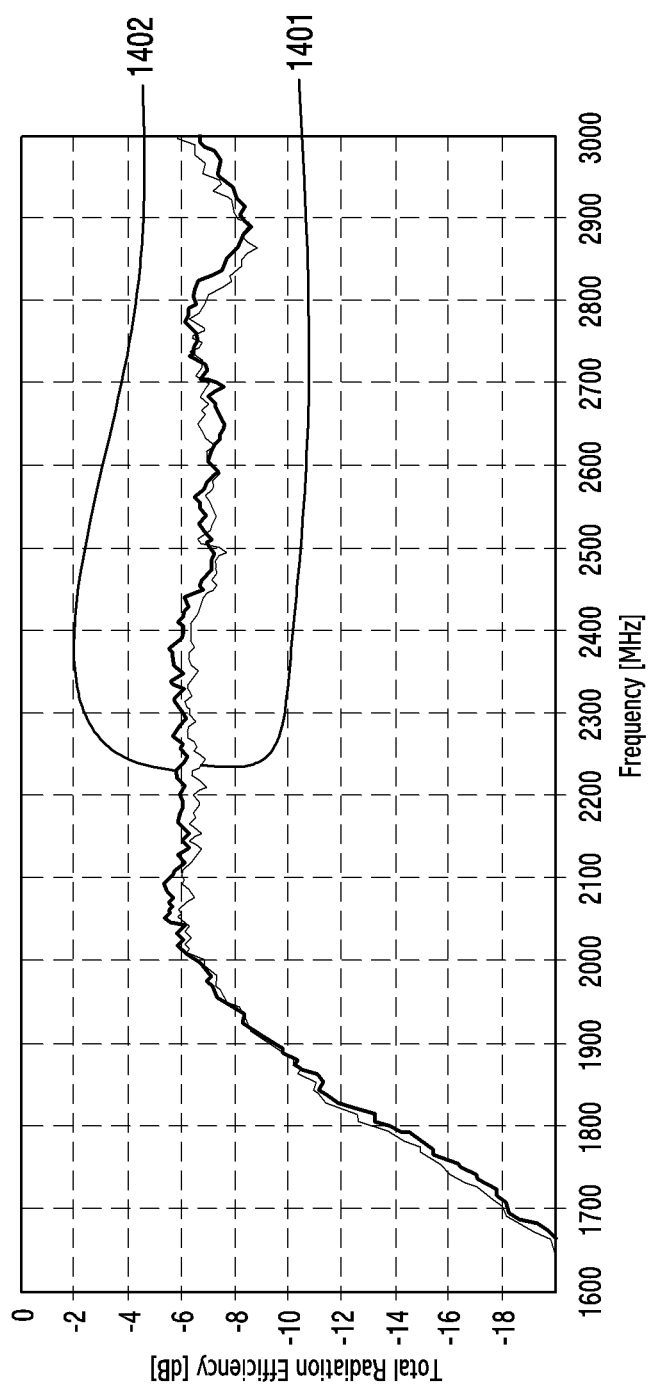
FIG. 14 is a graph illustrating antenna radiation performance on a frequency distribution of a second antenna system, if a sixth conductive unit and a ground are electrically connected and not electrically connected while an electronic device is folded according to an embodiment of the disclosure.

FIG. 13 illustrates a circuit related to a folded state of an electronic device 800 according to an embodiment of the disclosure. FIG. 14 is a graph illustrating antenna radiation performance on a frequency distribution of a second antenna system 860, if a sixth conductive unit D6 and a ground G5 are electrically connected and are not electrically connected in a folded state of an electronic device 800 according to an embodiment of the disclosure.

Referring to FIG. 13, in an embodiment, a first antenna system 850 may include a first antenna radiator ① formed as at least part of a first side member 810, a ground G1 electrically connected to the first antenna radiator ①, and a first transmission line 851 between a first feed unit F1 and the first antenna radiator ①. In an embodiment, a second antenna system 860 may include a second antenna radiator ② formed as at least part of the first side member 810, a ground G2 electrically connected to the second antenna radiator ②, and a second transmission line 861 between a second feed unit F2 and the second antenna radiator ②. According to various embodiments, the first antenna system 850 may include the first antenna system 550 of FIG. 5, the first antenna system 650 of FIG. 6A, or the first antenna system 750 of FIG. 7A. According to various embodiments, the second antenna system 860 may include the second antenna system 560 of FIG. 5, the second antenna system 660 of FIG. 6A, or the second antenna system 760 of FIG. 7A.

According to an embodiment, the electronic device 800 may electrically connect a sixth conductive unit D6 (e.g., the sixth conductive unit B6 of FIG. 6A, or the sixth conductive unit C6 of FIG. 7A) to the ground G5 (e.g., the ground G51 of FIG. 6A, or the ground G5 of FIG. 7A) through a second lumped element 894 (e.g., the second lumped element 683 of FIG. 6A, or the second lumped element 794 of FIG. 7A), by controlling a frequency adjustment circuit 891 (e.g., the frequency adjustment circuit 691 of FIG. 6A, or the frequency adjustment circuit 791 of FIG. 7A) in the folded state. In the folded state, the electronic device 800 may electrically separate the sixth conductive unit D6 (e.g., the sixth conductive unit B6 of FIG. 6A, or the sixth conductive unit C6 of FIG. 7A) and the ground G5, by controlling the frequency adjustment circuit 891.

Referring to FIGS. 13 and 14, 1401 may indicate the antenna radiation performance on the frequency distribution of the second antenna system 860 if the sixth conductive unit D6 and the ground D5 are electrically separated by the frequency adjustment circuit 891 in the folded state of the electronic device 800. 1402 may indicate the antenna radiation performance of the second antenna system 660 if the sixth conductive unit D6 and the ground D5 are electrically connected through the second lumped element 894 by the frequency adjustment circuit 891 in the folded state of the electronic device 800.

According to an embodiment, if the sixth conductive unit D6 is electrically connected to the ground G5 through the second lumped element 894, the second lumped element 894 may act the loading of the electrical device (e.g., the inductance loading) on the second antenna system 860. Hence, the antenna radiation performance on the frequency distribution of the second antenna system 860 may differ if the sixth conductive unit D6 is electrically connected or is not electrically connected to the ground G5. According to an embodiment, in at least some frequency band, the antenna radiation performance for the second antenna system 860 may be higher if the sixth conductive unit D6 is electrically connected to the ground G5 through the second lumped element 894 (see 1401 and 1402).

Figure 15A:
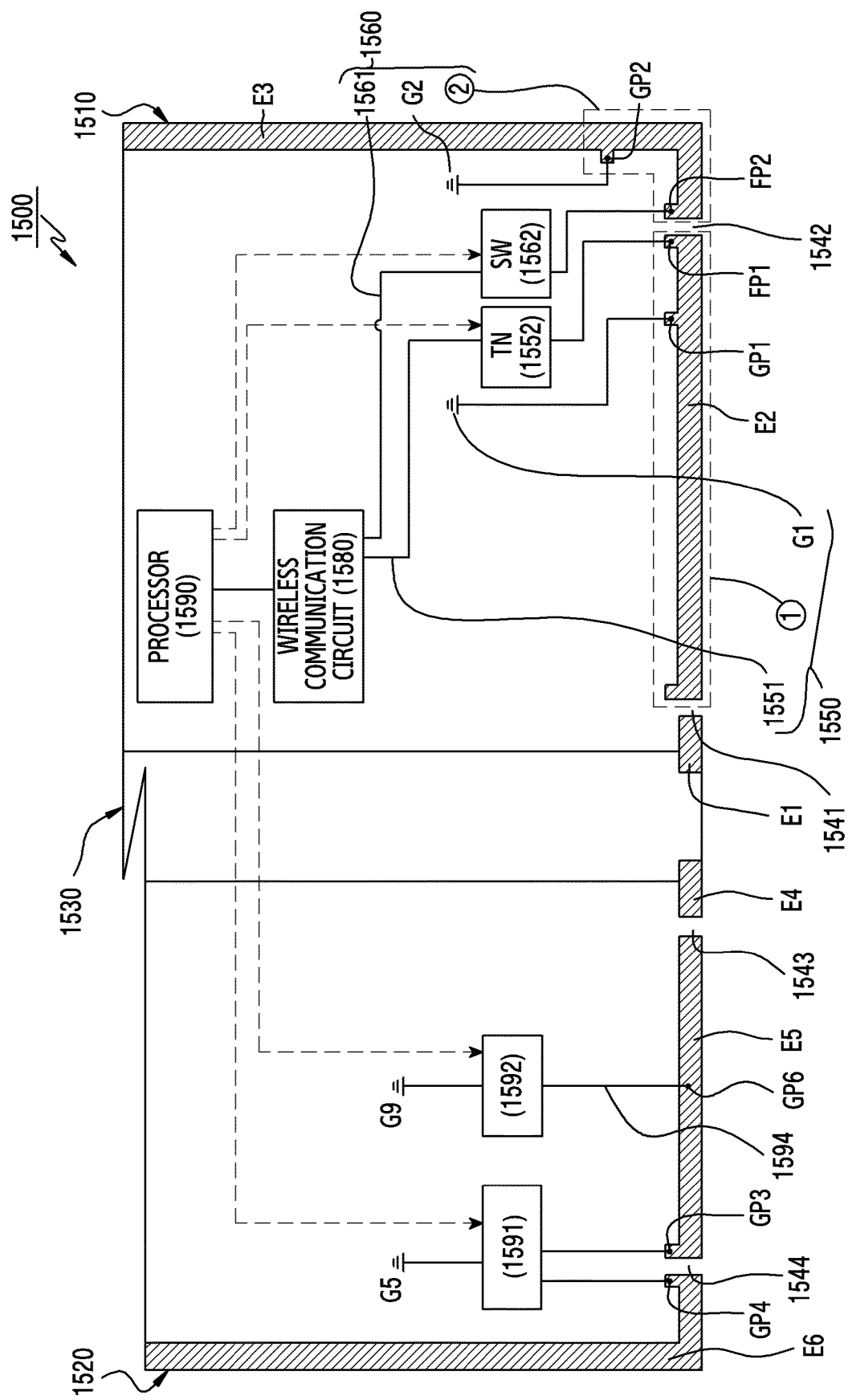
FIG. 15A illustrates a circuit of an electronic device of an unfolded state according to an embodiment of the disclosure.
Figure 15B:
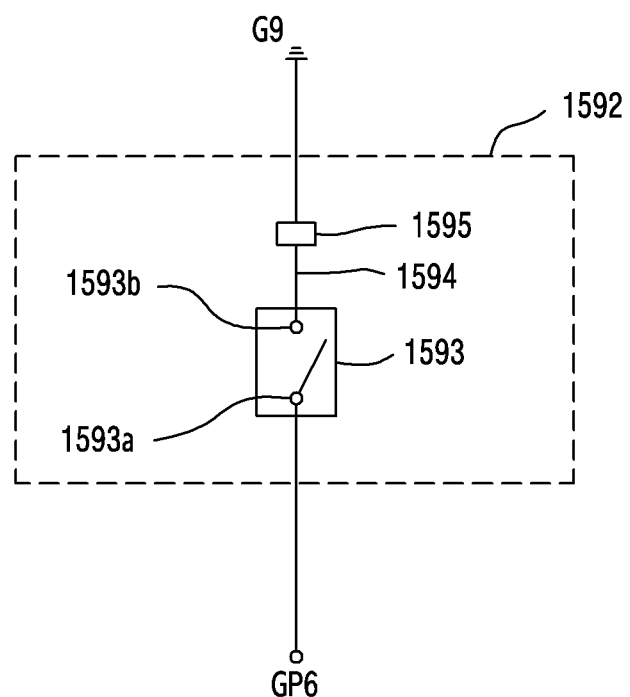
FIG. 15B illustrates a frequency adjustment circuit according to an embodiment of the disclosure.
Figure 15C:
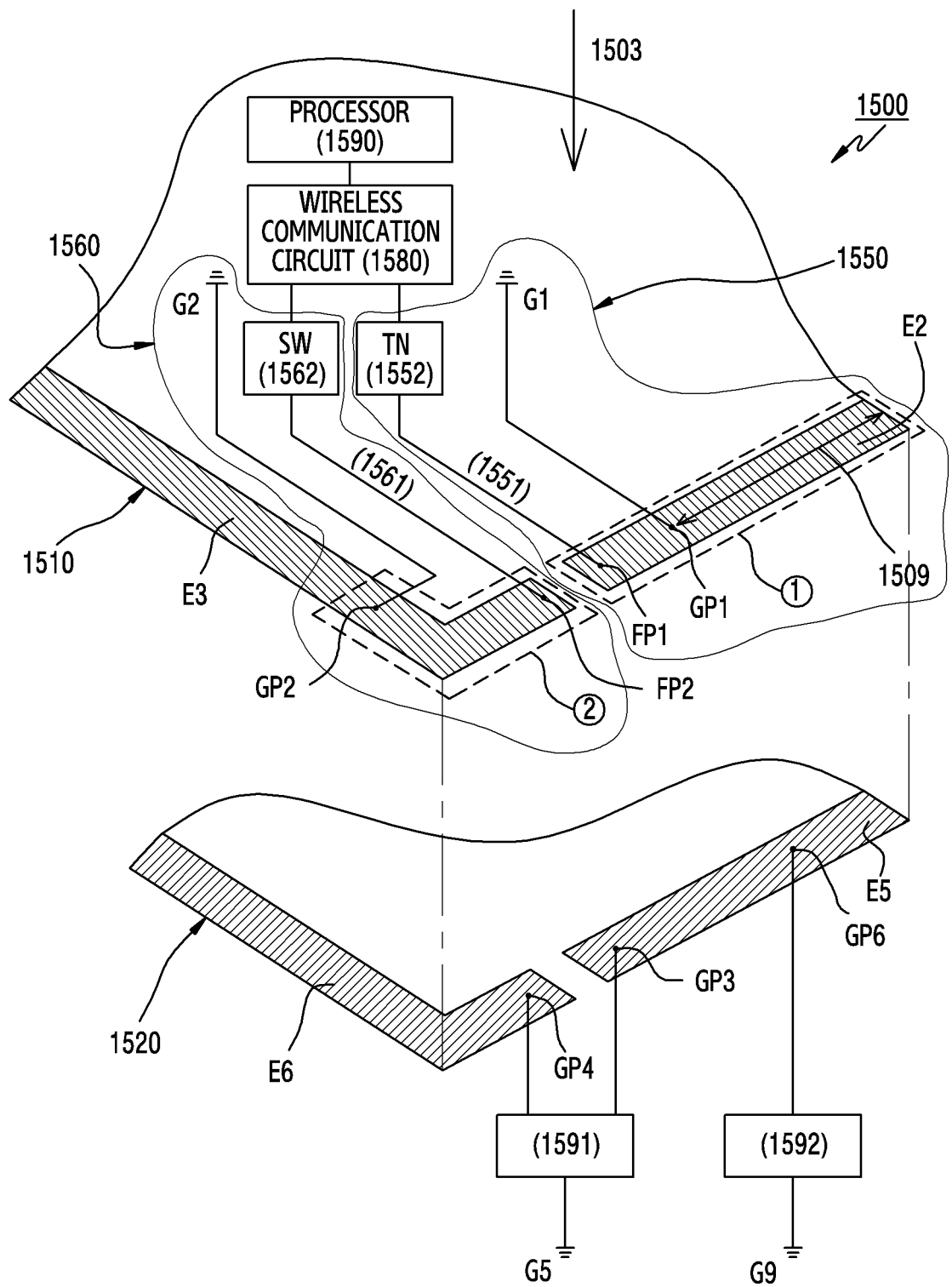
FIG. 15C illustrates a circuit of an electronic device of a folded state according to an embodiment of the disclosure.
Figure 16:
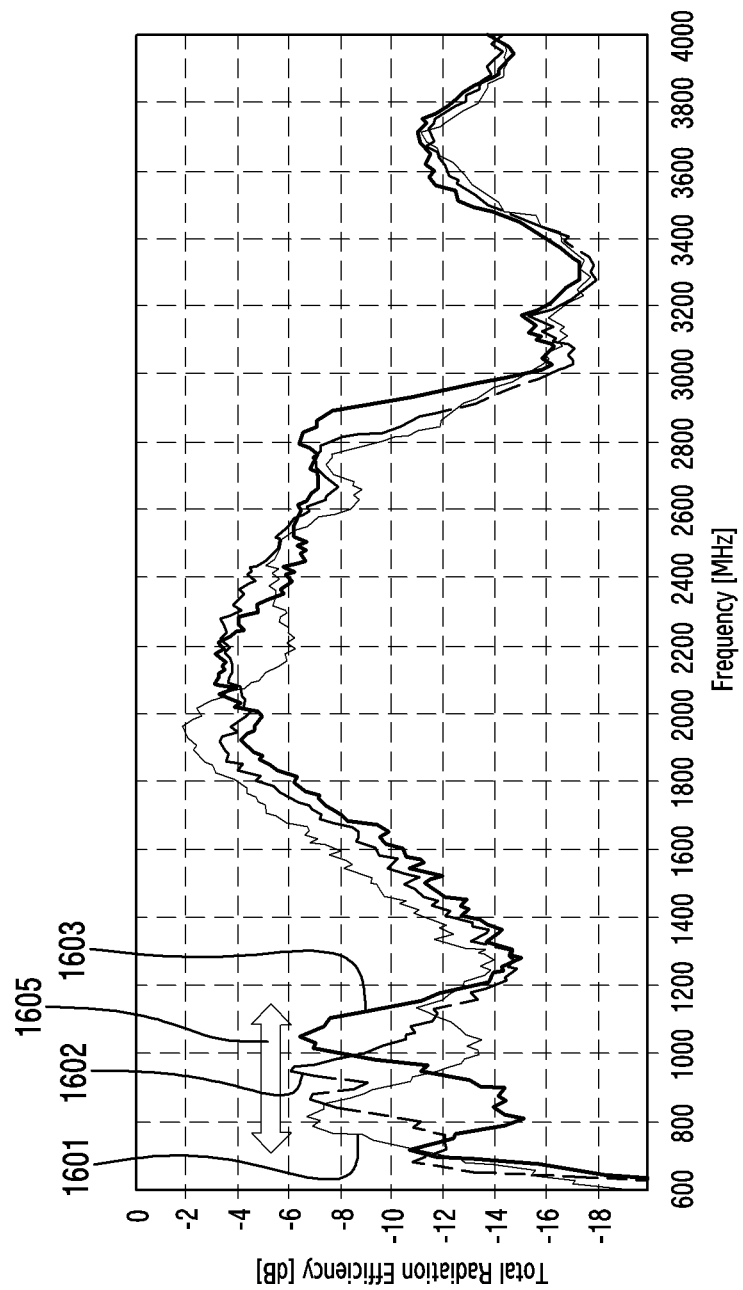
FIG. 16 is a graph showing antenna radiation performance on a frequency distribution of a first antenna system in an electronic device of a folded state according to an embodiment of the disclosure.

FIG. 15A illustrates a circuit of an electronic device in an unfolded state according to an embodiment of the disclosure. FIG. 15B illustrates a frequency adjustment circuit according to an embodiment of the disclosure. FIG. 15C illustrates a circuit of the electronic device in a folded state according to an embodiment of the disclosure. FIG. 16 is a graph showing antenna radiation performance on a frequency distribution of a first antenna system in an electronic device of a folded state according to an embodiment of the disclosure.

Referring to FIGS. 15A and 15B, in an embodiment, an electronic device 1500 (e.g., the electronic device 500 of FIG. 5) may include at least one of a first side member 1510 (e.g., the first side member 510 of FIG. 5), a second side member 1520 (e.g., the second side member 620 of FIG. 5), a hinge structure 1530 (e.g., the hinge structure 530 of FIG. 5), at least one wireless communication circuit 1580 (e.g., the at least one wireless communication circuit 580 of FIG. 5), a processor 1590 (e.g., the processor 590 of FIG. 5), a first frequency adjustment circuit 1591 or a fifth frequency adjustment circuit 1592.

According to an embodiment, the first side member 1510 may include at least one of a first conductive unit E1 (e.g., the first conductive unit A1 of FIG. 5), a first insulating unit 1541 (e.g., the first insulating unit 541 of FIG. 5), a second conductive unit E2 (e.g., the second conductive unit A2 of FIG. 5), a second insulating unit 1542 (e.g., the second insulating unit 542 of FIG. 5), and a third conductive unit E3 (e.g., the third conductive unit A3 of FIG. 5) which are sequentially disposed from the hinge structure 1530.

According to an embodiment, the second side member 1520 may include at least one of a fourth conductive unit E4 (e.g., the fourth conductive unit A4 of FIG. 5), a third insulating unit 1543 (e.g., the third insulating unit 543 of FIG. 5), a fifth conductive unit E5 (e.g., the fifth conductive unit A5 of FIG. 5), a fourth insulating unit 1544 (e.g., the fourth insulating unit 544 of FIG. 5), and a sixth conductive unit E6 (e.g., the sixth conductive unit A6 of FIG. 5) which are sequentially disposed from the hinge structure 1530.

According to an embodiment, a first antenna radiator ① (e.g., the first antenna radiator ① of FIG. 5, the first antenna radiator ① of FIG. 6A, or the first antenna radiator ① of FIG. 7A) may be formed as at least part of a second conductive unit E2 (e.g., the second conductive unit A2 of FIG. 5, the second conductive unit B2 of FIG. 6A, or the second conductive unit C2 of FIG. 7A) included in the first side member 1510. A second antenna radiator ② (e.g., the second antenna radiator ② of FIG. 5, the second antenna radiator ② of FIG. 6A, or the second antenna radiator ② of FIG. 7A) may be formed as at least part of a third conductive unit E3 (e.g.: the third conductive unit A3 of FIG. 5, the third conductive unit B3 of FIG. 6A, or the third conductive unit C3 of FIG. 7A) included in the first side member 1510. The first antenna radiator ① may be electrically connected to the at least one wireless communication circuit 1580 at at least one feeding point FP1 (e.g., the first feeding point FP1 of FIG. 6A or 7A), and may be electrically connected to the ground G1 (e.g., the ground G1 of FIG. 6A or 7A) at at least one grounding point GP1 (e.g., the first grounding point GP1 of FIG. 6A or 7B). The second antenna radiator ② may be electrically connected to the at least one wireless communication circuit 1580 at at least one feeding point FP2 (e.g., the second feeding point FP2 of FIG. 6A or 7A), and may be electrically connected to the ground G2 (e.g., the ground G2 of FIG. 6A or 7A) at at least one grounding point GP2 (e.g., the second grounding point GP2 of FIG. 6A or 7A).

According to an embodiment, the electronic device 1500 may include a first antenna system 1550 (e.g., the first antenna system 550 of FIG. 5, the first antenna system 650 of FIG. 6A, or the first antenna system 750 of FIG. 7A), or a second antenna system 1560 (e.g., the second antenna system 560 of FIG. 5, the second antenna system 660 of FIG. 6A, or the second antenna system 760 of FIG. 7A) electrically connected to the at least one wireless communication circuit 1580. For example, the first antenna system 1550 may include the first antenna radiator ①, the ground G1 electrically connected to the first antenna radiator ①, a first transmission line 1551 (e.g., the first transmission line 551 of FIG. 5, the first transmission line 651 of FIG. 6A, or the first transmission line 751 of FIG. 7A) between the first antenna radiator ① and the at least one wireless communication circuit 1580, or a tuner 1552 (e.g., the tuner 652 of FIG. 6A, or the tuner 752 of FIG. 7A) connected to the first transmission line 1551. For example, the second antenna system 1560 may include the second antenna radiator ②, the ground G2 electrically connected to the second antenna radiator ②, a second transmission line 1561 (e.g., the second transmission line 561 of FIG. 5, the second transmission line 661 of FIG. 6A, or the second transmission line 761 of FIG. 7A) between the second antenna radiator ② and the at least one wireless communication circuit 1580, or a switch 1562 (e.g., the switch 662 of FIG. 6A, or the switch 762 of FIG. 7A) connected to the second transmission line 1561. Since the first antenna system 1550 or the second antenna system 1560 is substantially the same as FIG. 5, 6A or 7A, its detailed descriptions are omitted.

According to an embodiment, the second side member 1520 may include a fifth conductive unit E5 (e.g., the fifth conductive unit A5 of FIG. 5A, the fifth conductive unit B5 of FIG. 6A, or the fifth conductive unit C5 of FIG. 7A) disposed close to the first antenna radiator ①, and a sixth conductive unit E6 (e.g., the sixth conductive unit A6 of FIG. 5A, the sixth conductive unit B6 of FIG. 6A, or the sixth conductive unit C6 of FIG. 7A) disposed close to the second antenna radiator ②, in the folded state of the electronic device 1500 (see FIG. 15C).

According to an embodiment, the first frequency adjustment circuit 1591 may include an electrical element (e.g., an inductor) having the component such as inductance, capacitance, or conductance acting on the first antenna system 1550 and/or the second antenna system 1560, in the folded state of the electronic device 1500 (see FIG. 15C). The first frequency adjustment circuit 1591 may include the first frequency adjustment circuit 591 of FIG. 5, the frequency adjustment circuit 691 of FIG. 6A or the frequency adjustment circuit 791 of FIG. 7A, and detailed descriptions thereof are omitted.

According to an embodiment, the fifth frequency adjustment circuit 1592 (e.g., the fifth frequency adjustment circuit 595 of FIG. 5) may be electrically connected with the fifth conductive unit E5 and a ground G9 (e.g., the ground of FIG. 5). The fifth conductive unit E5 may be electrically connected to the ground G9 through the fifth frequency adjustment circuit 1592.

Referring to FIGS. 15A, 15B, and 15C, in an embodiment, the fifth frequency adjustment circuit 1592 may include a third switch 1593 including a sixth terminal 1593a and a seventh terminal 1593b. The sixth terminal 1593a may be electrically connected to a sixth position (e.g., a sixth grounding point GP6) on the fifth conductive unit E5 between a third position (e.g., a third grounding point GP3) and a third insulating unit 1543 (e.g., the third insulating unit 543 of FIG. 5, and the third insulating unit 643 of FIG. 6A, or the third insulating unit 743 of FIG. 7A). The seventh terminal 1593b may be electrically connected to a ground G9 (e.g., the ground G9 of FIG. 5). For example, referring to FIG. 15C, the sixth grounding point GP6 may be positioned to overlap an area 1509 opposite to the feeding point FP1 of the first antenna radiator ① based on the grounding point GP1 of the first antenna radiator ①, when viewed in a third direction 1503 (e.g., the third direction 203 of FIG. 2).

According to an embodiment, the fifth frequency adjustment circuit 1592 may include at least one fourth lumped element (or, a fourth passive element) 1595 such as inductor disposed on a fourth electrical path 1594 electrically connected between the sixth grounding point GP6 and the ground G9. According to an embodiment, the processor 1590 may control the third switch 1593 to electrically connect the sixth terminal 1593a and the seventh terminal 1593b, in the folded state of the electronic device 1500. If the sixth terminal 1593a and the seventh terminal 1593b are electrically connected, the fifth conductive unit E5 may be electrically connected to the ground G9 through the at least one fourth lumped element 1595.

According to an embodiment, the fifth frequency adjustment circuit 1592 may provide an electrical element (e.g., loading of the electrical device) such as inductance, capacitance, or conductance to the first antenna system 1550 and/or the second antenna system 1560 in the folded state of the electronic device 1500. For example, the fifth frequency adjustment circuit 1592 may move a resonance frequency of the first antenna system 1550 (or, the first antenna radiator ①) and/or the second antenna system 1560 (or, the second antenna radiator ②) to a designated frequency, or move it as designated in the folded state of the electronic device 1500. According to various embodiments, the fifth frequency adjustment circuit 1592 may reduce the electrical influence of the second side member 1520 on the first antenna system 1550 and/or the second antenna system 1560 in the folded state of the electronic device 1500.

According to various embodiments, the fifth frequency adjustment circuit 1592 may be implemented to change various values of the electrical element under of the processor 1590 or the at least one wireless communication circuit 1580. For example, the fourth lumped element 1595 of the fifth frequency adjustment circuit 1592 may include an element such as a variable inductor, a variable capacitor.

Referring to FIGS. 15C and 16, 1601 indicates the antenna radiation performance on the frequency distribution for the first antenna system 1550, if the third switch 1593 of the fifth frequency adjustment circuit 1592 is turned off and the inductance of 0 nanohenry (nH) is applied to the first antenna system 1550 in the folded state of the electronic device 1500. 1602 indicates the antenna radiation performance on the frequency distribution for the first antenna system 1550, if the fifth frequency adjustment circuit 1592 applies the inductance of about 5.6 nH to the first antenna system 1550 in the folded state of the electronic device 1500. 1603 indicates the antenna radiation performance on the frequency distribution for the first antenna system 1550, if the fifth frequency adjustment circuit 1592 applies the inductance of about 1 nH to the first antenna system 1550 in the folded state of the electronic device 1500. Referring to 1601, 1602, and 1603, in the folded state of the electronic device 1500, the resonance frequency of the first antenna system 1550 (or, the first antenna radiator ①) may be moved in a corresponding frequency band (e.g., the LB) (see 1605), according to the inductance value applied by the fifth frequency adjustment circuit 1592 to the first antenna system 1550.

According to various embodiments (not shown), the electronic device 1500 may further include a third frequency adjustment circuit (e.g., the third frequency adjustment circuit 593 of FIG. 5) disposed in a first housing structure (e.g., the first housing structure 210 of FIG. 2) including the first side member 1510. The third frequency adjustment circuit may be electrically connected to the first antenna radiator ① and the ground (e.g., the ground G7 of FIG. 5). The third frequency adjustment circuit may be disposed in the first housing structure 1510, to be involved in the resonance frequency movement of the first antenna system 1550 (or the first antenna radiator ①) in the folded state of the electronic device 1500 (e.g., see 1605 of FIG. 16). According to some embodiment, the fifth frequency adjustment circuit 1592 may be omitted in the embodiment which mounts the third frequency adjustment circuit in the first housing structure 210.

Figure 17A:
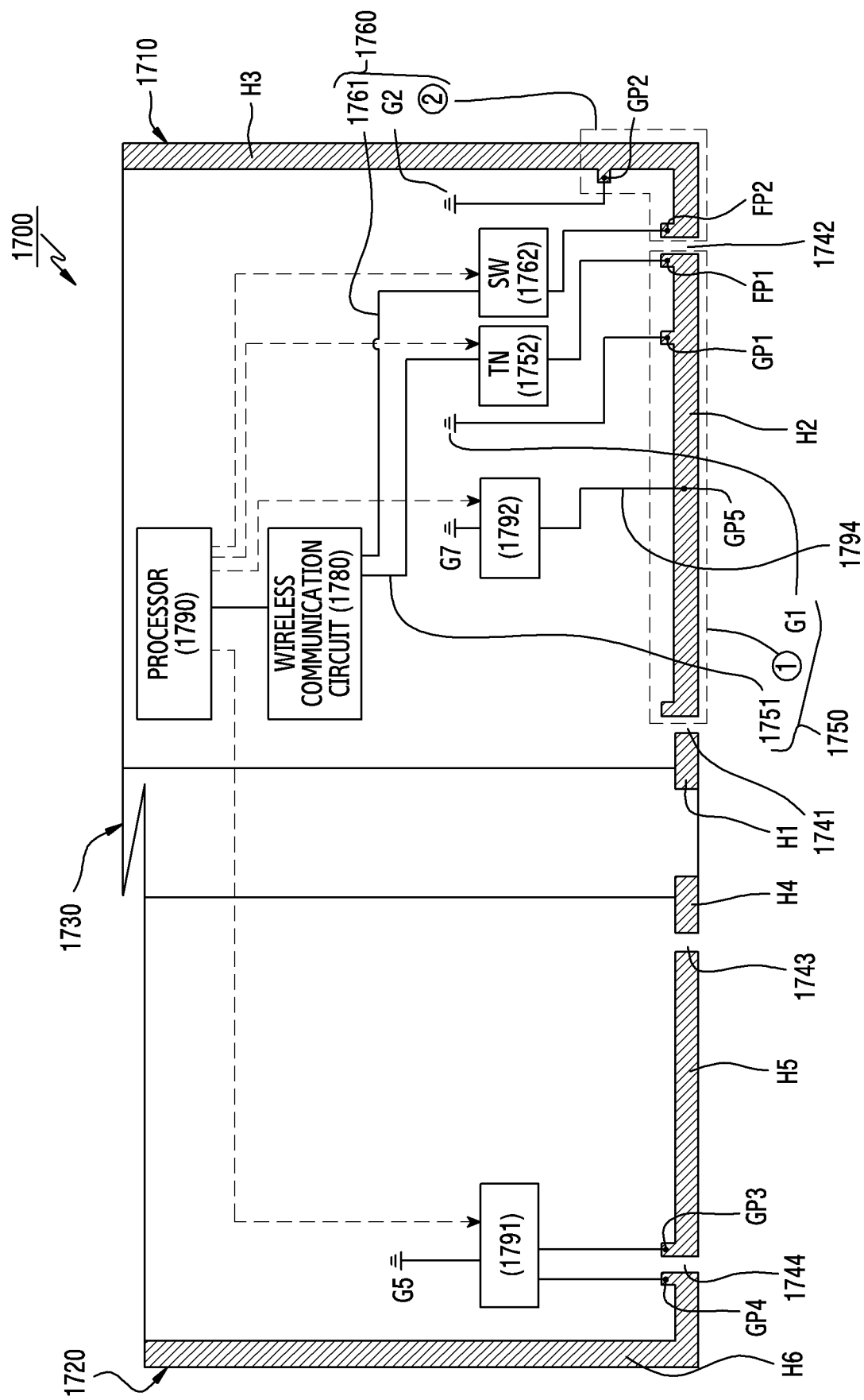
FIG. 17A illustrates a circuit of an electronic device of an unfolded state according to an embodiment of the disclosure.
Figure 17B:
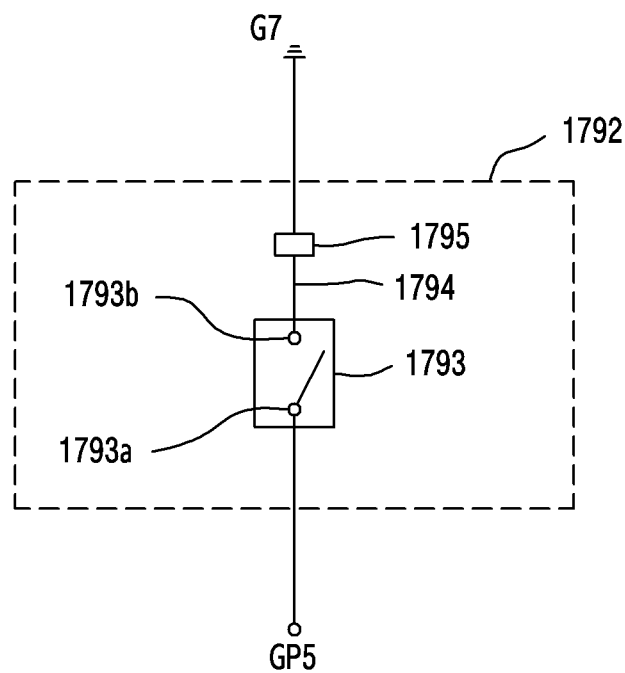
FIG. 17B illustrates a frequency adjustment circuit according to an embodiment of the disclosure.
Figure 17C:
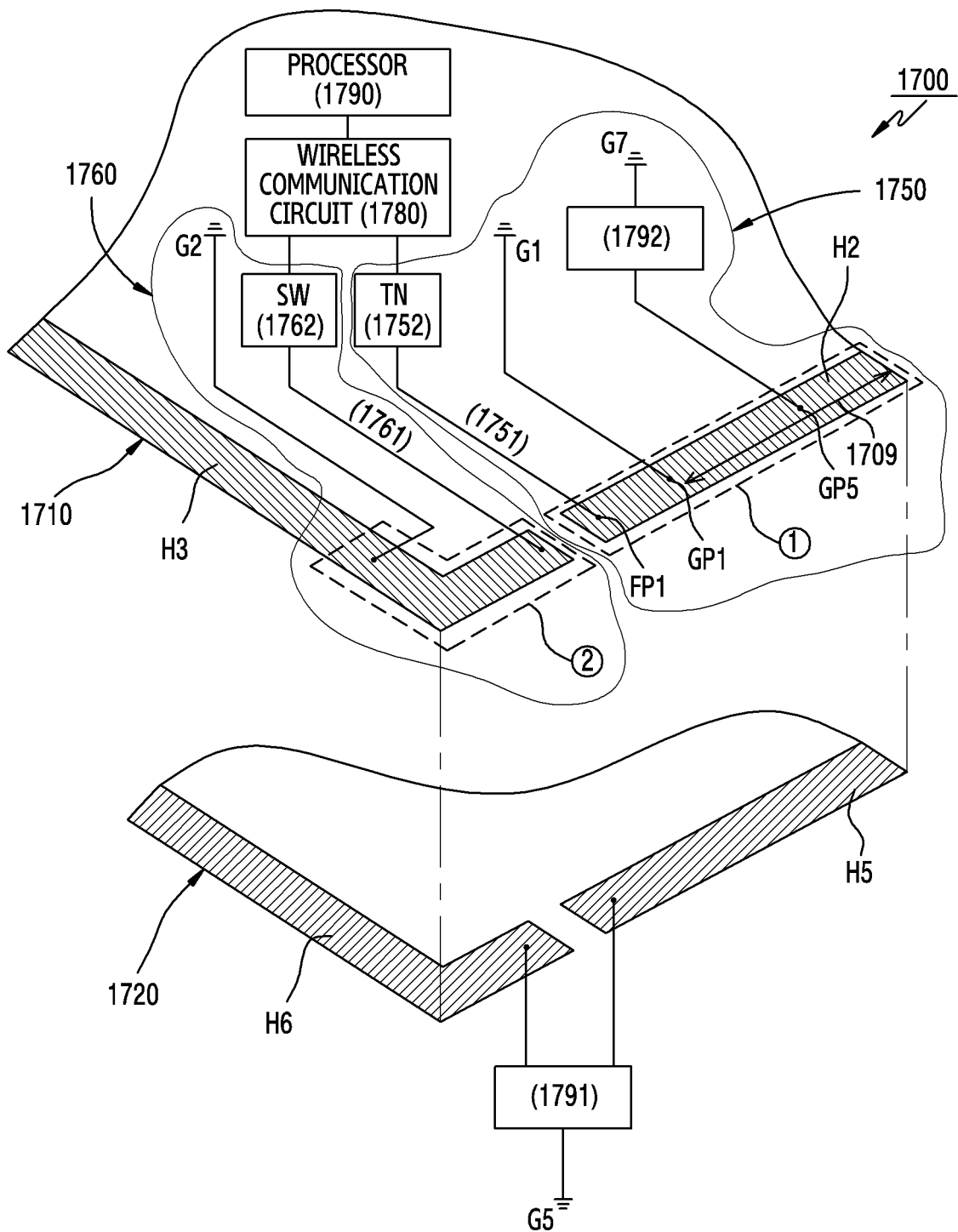
FIG. 17C illustrates a circuit of an electronic device of a folded state according to an embodiment of the disclosure.
Figure 18:
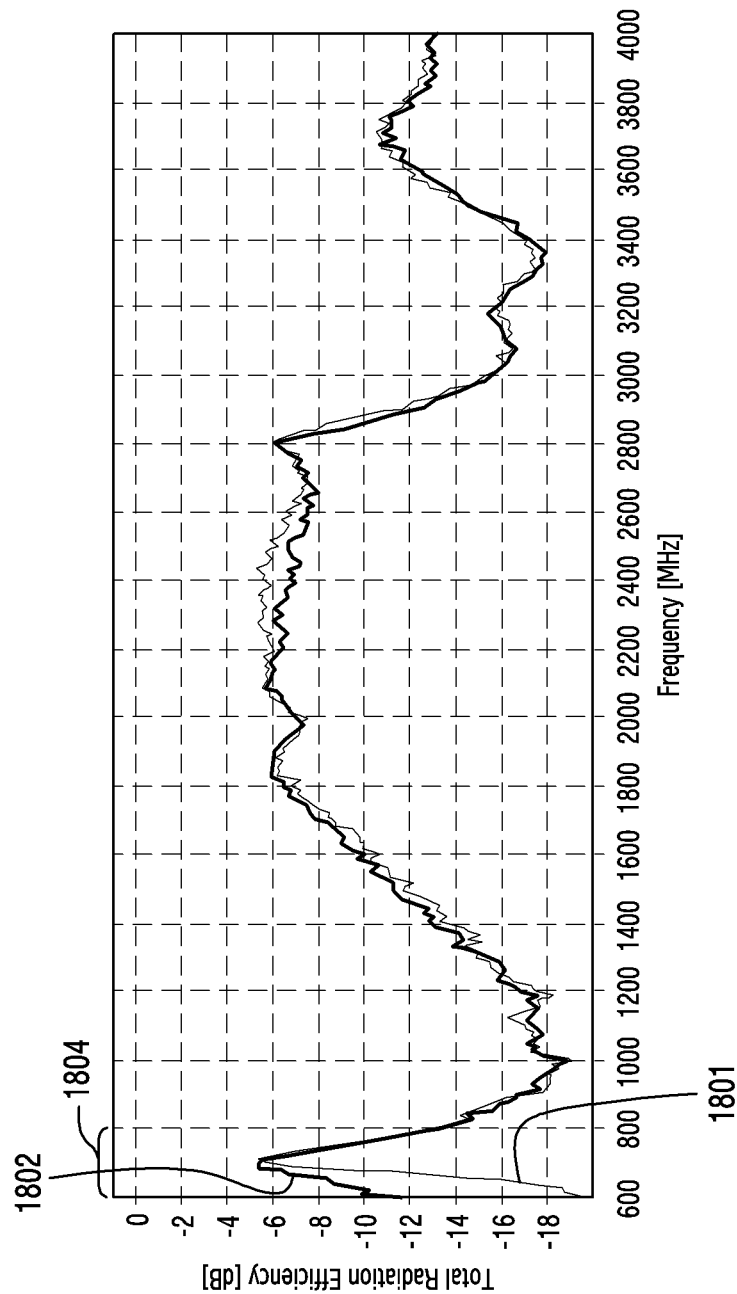
FIG. 18 is a graph showing antenna radiation performance on a frequency distribution of a first antenna system in an electronic device of a folded state according to an embodiment of the disclosure.
Figure 19:
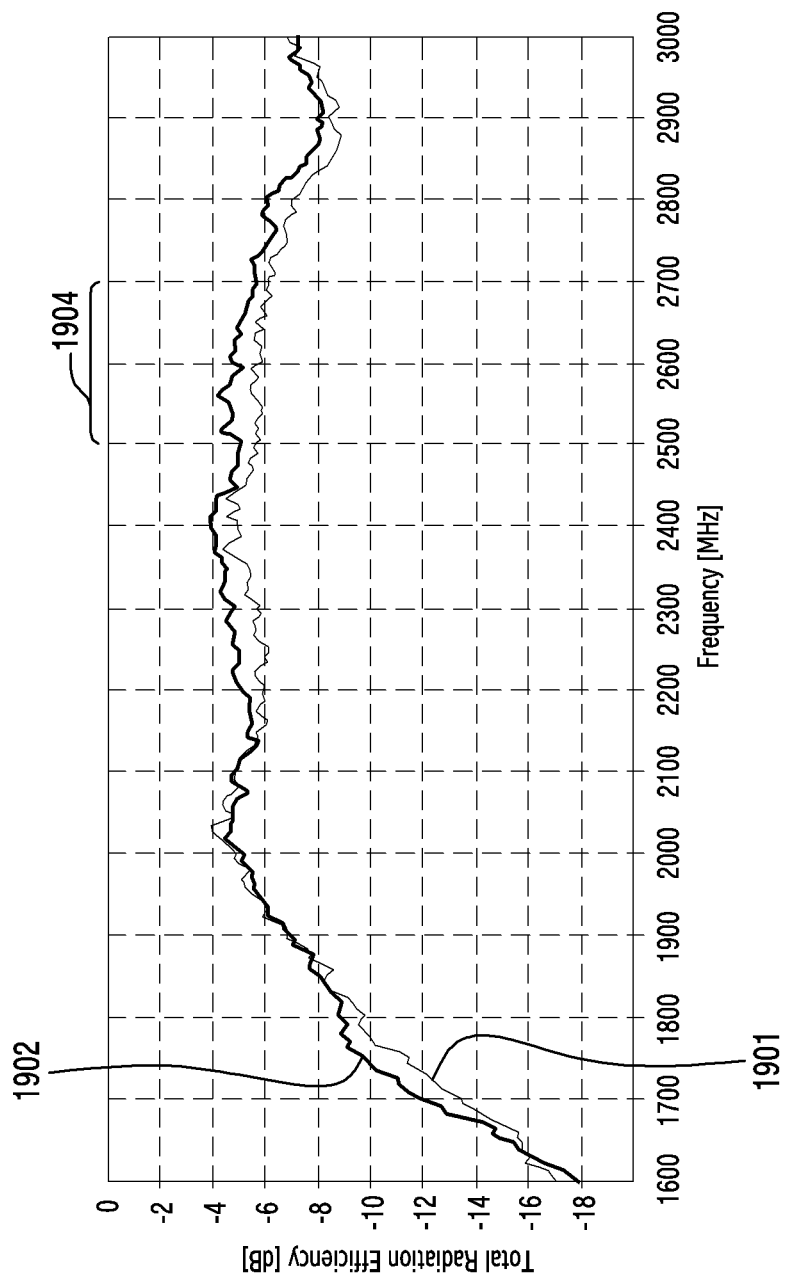
FIG. 19 is a graph showing antenna radiation performance on a frequency distribution of a second antenna system in an electronic device of a folded state according to an embodiment of the disclosure.

FIG. 17A illustrates a circuit of an electronic device in an unfolded state according to an embodiment of the disclosure. FIG. 17B illustrates a frequency adjustment circuit according to an embodiment of the disclosure. FIG. 17C illustrates a circuit of the electronic device in a folded state according to an embodiment of the disclosure. FIG. 18 is a graph showing antenna radiation performance on a frequency distribution of a first antenna system in an electronic device of a folded state according to an embodiment of the disclosure. FIG. 19 is a graph showing antenna radiation performance on a frequency distribution of a second antenna system in an electronic device of a folded state according to an embodiment of the disclosure.

Referring to FIGS. 17A, 17B, and 17C, in an embodiment, an electronic device 1700 (e.g., the electronic device 500 of FIG. 5) may include at least one of a first side member 1710 (e.g., the first side member 510 of FIG. 5), a second side member 1720 (e.g., the second side member 520 of FIG. 5), a hinge structure 1730 (e.g., the hinge structure 530 of FIG. 5), at least one wireless communication circuit 1780 (e.g., the at least one wireless communication circuit 580 of FIG. 5), a processor 1790 (e.g., the processor 590 of FIG. 5), a first frequency adjustment circuit 1791 or a third frequency adjustment circuit 1792.

According to an embodiment, the first side member 1710 may include at least one of a first conductive unit H1 (e.g., the first conductive unit A1 of FIG. 5), a first insulating unit 1741 (e.g., the first insulating unit 541 of FIG. 5), a second conductive unit H2 (e.g., the second conductive unit A2 of FIG. 5), a second insulating unit 1742 (e.g., the second insulating unit 542 of FIG. 5), and a third conductive unit H3 (e.g., the third conductive unit A3 of FIG. 5) which are sequentially disposed from the hinge structure 1730.

According to an embodiment, the second side member 1720 may include at least one of a fourth conductive unit H4 (e.g., the fourth conductive unit A4 of FIG. 5), a third insulating unit 1743 (e.g., the third insulating unit 543 of FIG. 5), a fifth conductive unit H5 (e.g., the fifth conductive unit A5 of FIG. 5), a fourth insulating unit 1744 (e.g., the fourth insulating unit 544 of FIG. 5), and a sixth conductive unit H6 (e.g., the sixth conductive unit A6 of FIG. 5) which are sequentially disposed from the hinge structure 1730.

According to an embodiment, the first antenna radiator ① (e.g., the first antenna radiator ① of FIG. 5, the first antenna radiator ① of FIG. 6A, or the first antenna radiator ① of FIG. 7A) may be formed as at least part of a second conductive unit H2 (e.g., the second conductive unit A2 of FIG. 5, the second conductive unit B2 of FIG. 6A, or the second conductive unit C2 of FIG. 7A) included in the first side member 1710. The second antenna radiator ② (e.g., the second antenna radiator ② of FIG. 5, the second antenna radiator ② of FIG. 6A, or the second antenna radiator ② of FIG. 7A) may be formed as at least part of a third conductive unit H3 (e.g., the third conductive unit A3 of FIG. 5, the third conductive unit B3 of FIG. 6A, or the third conductive unit C3 of FIG. 7A) included in the first side member 1710. According to an embodiment, the second side member 1720 may include a fifth conductive unit H5 (e.g., the fifth conductive unit A5 of FIG. 5, the fifth conductive unit B5 of FIG. 6A, or the fifth conductive unit C5 of FIG. 7A) disposed close to the first antenna radiator ①, and a sixth conductive unit H6 (e.g., the sixth conductive unit A6 of FIG. 5, the sixth conductive unit B6 of FIG. 6A, or the sixth conductive unit C6 of FIG. 7A) disposed close to the second antenna radiator ②, in the folded state of the electronic device 1700 (see FIG. 17C).

According to an embodiment, the first antenna system 1750 (e.g., the first antenna system 550 of FIG. 5, the first antenna system 650 of FIG. 6A, or the first antenna system 750 of FIG. 7A) may include the first antenna radiator ①, the ground G1 electrically connected to the first antenna radiator ①, a first transmission line 1751 (e.g., the first transmission line 551 of FIG. 5, the first transmission line 651 of FIG. 6A, or the first transmission line 751 of FIG. 7A) between the first antenna radiator ① and the at least one wireless communication circuit 1780, or a tuner 1752 (e.g., the tuner 652 of FIG. 6A, or the tuner 752 of FIG. 7A) connected to the first transmission line 1751. According to an embodiment, the second antenna system 1760 (e.g., the second antenna system 560 of FIG. 5, the second antenna system 660 of FIG. 6A, or the second antenna system 760 of FIG. 7A) may include the second antenna radiator ②, the ground G2 electrically connected to the second antenna radiator ②, a second transmission line 1761 (e.g., the second transmission line 561 of FIG. 5, the second transmission line 661 of FIG. 6A, or the second transmission line 761 of FIG. 7A) between the second antenna radiator ② and the at least one wireless communication circuit 1780, or a switch 1762 (e.g., the switch 662 of FIG. 6A, or the switch 762 of FIG. 7A) connected to the second transmission line 1761. Since the first antenna system 1750 or the second antenna system 1760 is substantially the same as FIG. 5, 6A, or 7A, detailed descriptions thereof are omitted.

According to an embodiment, the first frequency adjustment circuit 1791 may include an electrical element (e.g., an inductor) having the component such as inductance, capacitance or conductance acting on the first antenna system 1750 and/or the second antenna system 1760, in the folded state of the electronic device 1700 (see FIG. 17C). The first frequency adjustment circuit 1791 may include the first frequency adjustment circuit 591 of FIG. 5, the frequency adjustment circuit 691 of FIG. 6A, or the frequency adjustment circuit 791 of FIG. 7A, and detailed descriptions thereof are omitted.

According to an embodiment, the third frequency adjusting circuit 1792 (e.g., the third frequency adjusting circuit 593 of FIG. 5) may be electrically connected with the first antenna radiator ① and a ground G7 (e.g., the ground G7 of FIG. 5). The first antenna radiator ① may be electrically connected to the ground G7 through the third frequency adjustment circuit 1792.

Referring to FIGS. 17A, 17B, and 17C, in an embodiment, the third frequency adjustment circuit 1792 may include a second switch 1793 including a fourth terminal 1793a and a fifth terminal 1793b. The fourth terminal 1793a may be electrically connected to a fifth position (e.g., a fifth grounding point GP5) on the second conductive unit H2 between a first position (e.g., a first feeding point FP1) and the first insulating unit 1741 (e.g., the first insulating unit 541 of FIG. 5, the first insulating unit 641 of FIG. 6A, or first insulating unit 741 of FIG. 7A). The fifth terminal 1793b may be electrically connected to a ground G7 (e.g., the ground G7 of FIG. 5). For example, referring to FIG. 17C, the fifth grounding point GP5 may be positioned in an area 1709 opposite to the feeding point FP1 based on the first grounding point GP1.

According to an embodiment, the third frequency adjustment circuit 1792 may include at least one third lumped element (or a third passive element) 1795 such as an inductor disposed on a third electrical path 1794 electrically connected between the fifth grounding point GP5 and the ground G7. According to an embodiment, the processor 1590 may control the second switch 1793 to electrically connect the fourth terminal 1793a and the fifth terminal 1793b, in the folded state of the electronic device 1500. If the fourth terminal 1793a and the fifth terminal 1793b are electrically connected, the second conductive unit H2 may be electrically connected to the ground G7 through the at least one third lumped element 1795.

According to an embodiment, the third frequency adjustment circuit 1792 may include an electrical element having the component such as inductance, capacitance or conductance acting on the first antenna system 1750 and/or the second antenna system 1760 in the folded state of the electronic device 1700. For example, the third frequency adjustment circuit 1792 may move the resonance frequency of the first antenna system 1750 (or, the first antenna radiator ①) and/or the second antenna system 1760 (or, the second antenna radiator ②) to a designated frequency, or move it as designated in the folded state of the electronic device 1700. According to various embodiments, the third frequency adjustment circuit 1792 may reduce the electrical influence of the second side member 1720 on the first antenna system 1750 and/or the second antenna system 1760 in the folded state of the electronic device 1700.

According to various embodiments, the third frequency adjustment circuit 1792 may be implemented to change various values of the electrical element under control of the processor 1790 or the at least one wireless communication circuit 1780. For example, the third lumped element 1795 of the third frequency adjustment circuit 1792 may include an element such as a variable inductor, or a variable capacitor.

In an embodiment, referring to FIG. 17C, in the folded state of the electronic device 1700, the fifth conductive unit H5 may be electrically connected to the ground G5 through the first frequency adjusting circuit 1791, and the antenna radiator ① may be electrically connected to the ground G7 through the third frequency adjustment circuit 1792. Referring to FIG. 18, 1801 indicates the antenna radiation performance on the frequency distribution for the first antenna system 1750, if the third frequency adjustment circuit 1792 applies the capacitance of 0 picofarad (pF) to the first antenna system 1750, and the first frequency adjustment circuit 1791 applies the inductance of about 5.6 nH to the first antenna system 1750, in the folded state of the electronic device 1500. 1802 indicates the antenna radiation performance on the frequency distribution for the first antenna system 1750, if the third frequency adjustment circuit 1792 applies the capacitance of about 1 pF to the first antenna system 1750, and the first frequency adjustment circuit 1791 applies the inductance of about 10 nH to the first antenna system 1750, in the folded state of the electronic device 1700. Referring to 1801 and 1802, for example, the antenna radiation performance for the first antenna system 1750 in a corresponding frequency band 1804 (e.g., the LB) may vary depending on the inductance applied by the first frequency adjustment circuit 1791 to the first antenna system 1750. For example, referring to 1801 and 1802, the resonance frequency of the first antenna system 1750 (or, the first antenna radiator ①) may be moved to about 700 MHz by the capacitance of about 1 pF applied by the first frequency adjustment circuit 1791 to the first antenna system 1750.

In an embodiment, referring to FIG. 17C, in the folded state of the electronic device 1700, the sixth conductive unit H6 may be electrically connected to the ground G5 through the first frequency adjusting circuit 1791, and the antenna radiator ① may be electrically connected to the ground G7 through the third frequency adjustment circuit 1792. Referring to FIG. 19, 1901 indicates the antenna radiation performance on the frequency distribution for the second antenna system 1760, if the first frequency adjustment circuit 1791 applies the inductance of about 1 nH to the second antenna system 1760 and the third frequency adjustment circuit 1792 applies the inductance of 0 nH to the second antenna system 1760, in the folded state of the electronic device 1700. 1902 indicates the antenna radiation performance on the frequency distribution for the second antenna system 1760, if the first frequency adjustment circuit 1791 applies the inductance of about 1 nH to the second antenna system 1760 and the third frequency adjustment circuit 1792 applies the inductance of about 1 nH to the second antenna system 1760, in the folded state of the electronic device 1700. Referring to 1901 and 1902, for example, the antenna radiation performance for the second antenna system 1760 in a corresponding frequency band 1904 (e.g., the LB) may vary depending on the inductance applied by the third frequency adjustment circuit 1792 to the second antenna system 1760.

Figure 20:
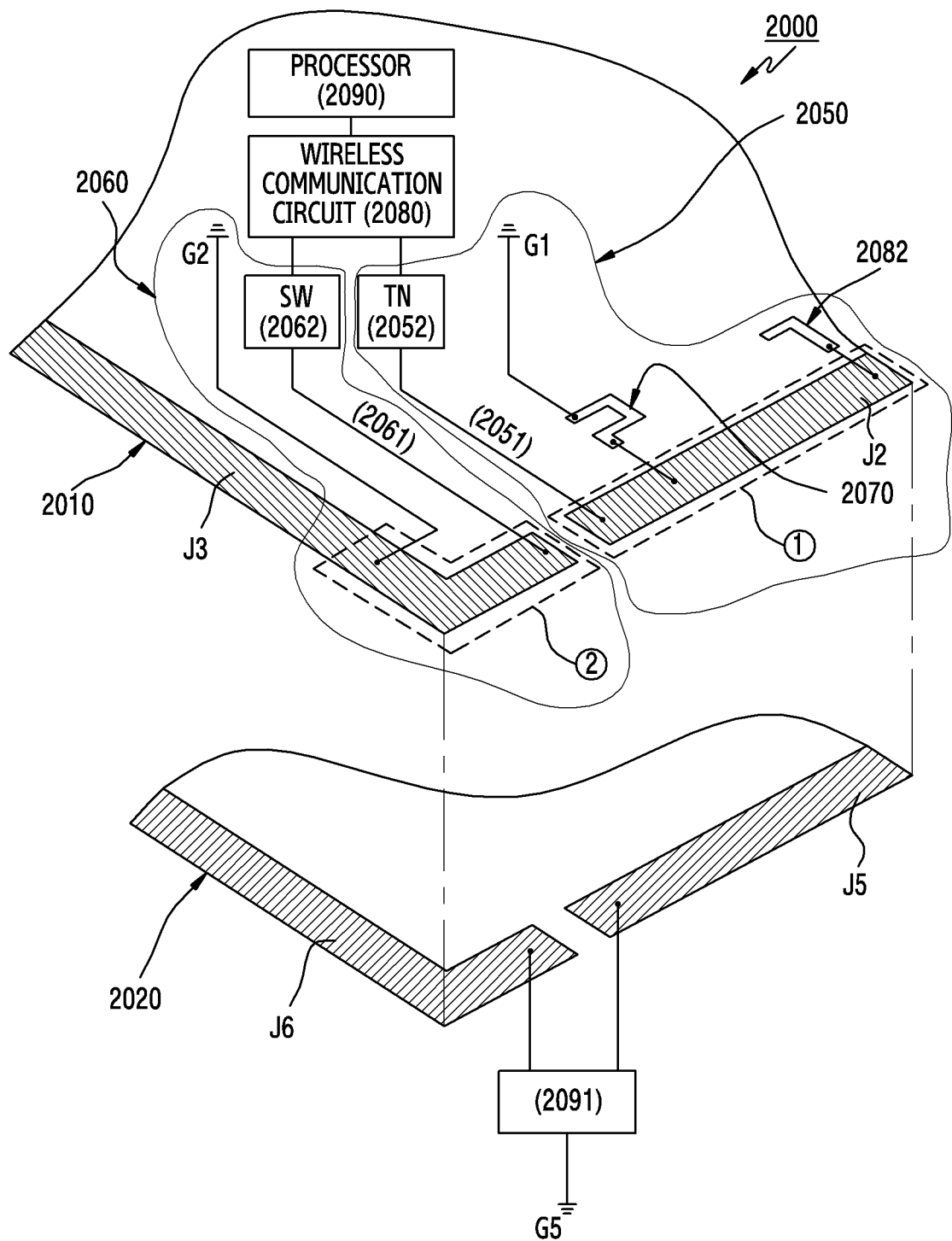
FIG. 20 illustrates a circuit of an electronic device of a folded state according to an embodiment of the disclosure.
Figure 21:
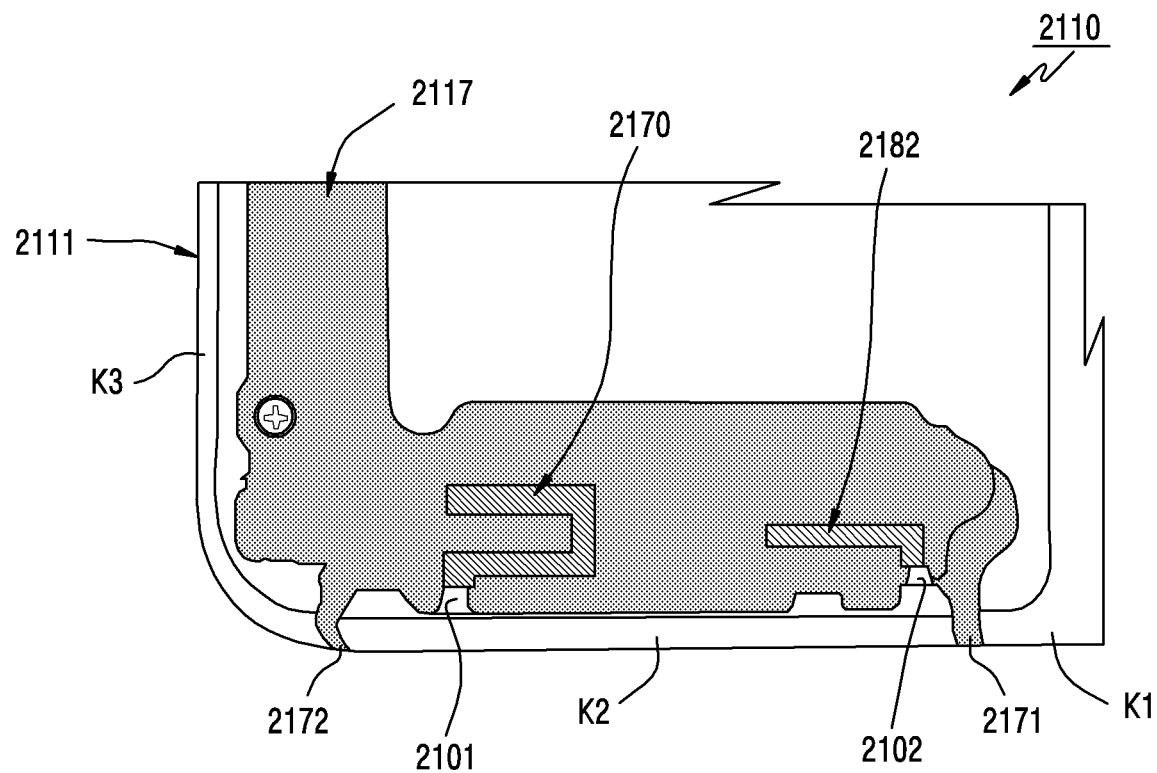
FIG. 21 illustrates an antenna extension structure according to an embodiment of the disclosure.
Figure 22:
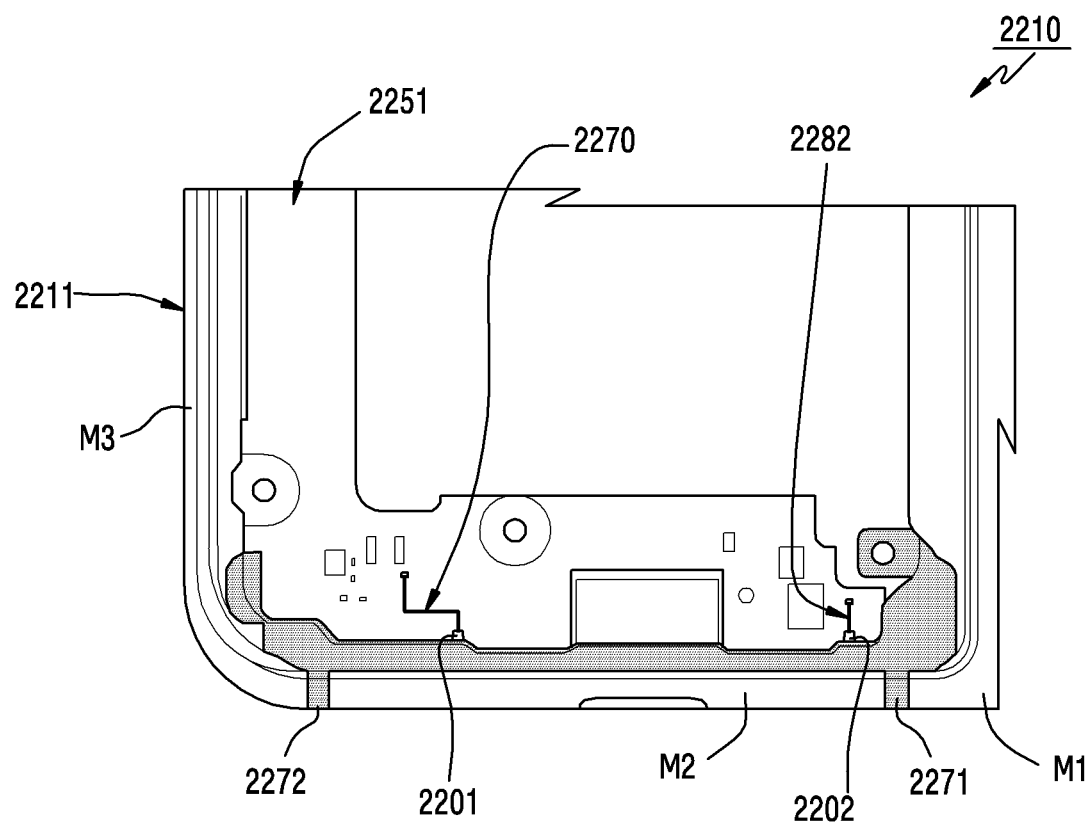
FIG. 22 illustrates an antenna extension structure according to an embodiment of the disclosure.
Figure 23:
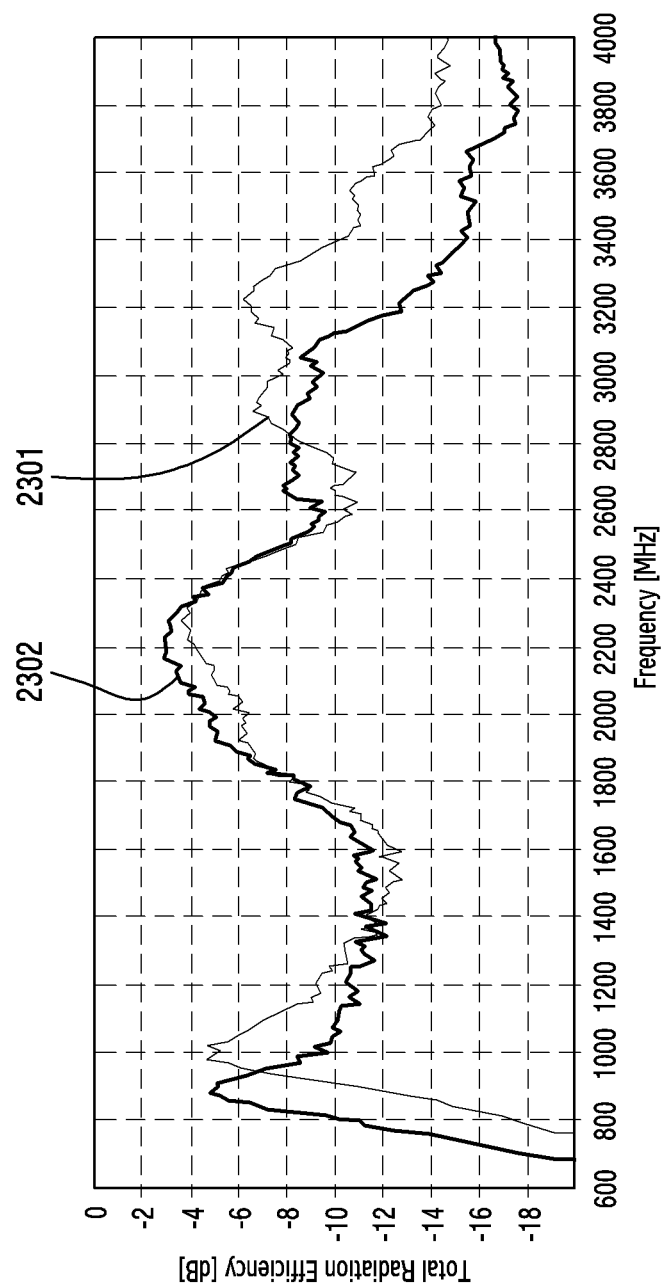
FIG. 23 is a graph showing antenna radiation performance of a first antenna system according to whether an antenna extension structure is applied or not according to an embodiment of the disclosure.

FIG. 20 illustrates a circuit of an electronic device in a folded state according to an embodiment of the disclosure. FIG. 21 illustrates an antenna extension structure according to an embodiment. FIG. 22 illustrates an antenna extension structure according to an embodiment of the disclosure. FIG. 23 is a graph showing antenna radiation performance of a first antenna system according to whether an antenna extension structure is applied or not according to an embodiment of the disclosure.

Referring to FIG. 20, in an embodiment, an electronic device 2000 (e.g., the electronic device 500 of FIG. 5) may include at least one of a first side member 2010 (e.g., the first side member 510 of FIG. 5), a second side member 2020 (e.g., the second side member 520 of FIG. 5), at least one wireless communication circuit 2080 (e.g., the at least one wireless communication circuit 580 of FIG. 5), a processor 2090 (e.g., the processor 590 of FIG. 5), a frequency adjustment circuit 2091, a first radiator extension structure 2070 or a second radiator extension structure 2082.

According to an embodiment, a first antenna radiator ① (e.g., the first antenna radiator ① of FIG. 5, the first antenna radiator ① of FIG. 6A, or the first antenna radiator ① of FIG. 7A) may be formed as at least part of a second conductive unit J2 (e.g., the second conductive unit A2 of FIG. 5, the second conductive unit B2 of FIG. 6A, or the second conductive unit C2 of FIG. 7A) included in the first side member 2010. A second antenna radiator ② (e.g., the second antenna radiator ② of FIG. 5, the second antenna radiator ② of FIG. 6A, or the second antenna radiator ② of FIG. 7A) may be formed as at least part of a third conductive unit J3 (e.g., the third conductive unit A3 of FIG. 5, the third conductive unit B3 of FIG. 6A, or the third conductive unit C3 of FIG. 7A) included in the first side member 2010. A fifth conductive unit J5 (e.g., the fifth conductive unit A5 of FIG. 5, the fifth conductive unit B5 of FIG. 6A, or the fifth conductive unit C5 of FIG. 7A) of the second side member 1720 may be disposed close to the first antenna radiator ① in the folded state of the electronic device 2000. A sixth conductive unit J6 (e.g., the sixth conductive unit B6 of FIG. 5, the sixth conductive unit B6 of FIG. 6A, or the sixth conductive unit C6 of FIG. 7A) of the second side member 1720 may be disposed close to the second antenna radiator ② in the folded state of the electronic device 2000. According to an embodiment, a first antenna system 2050 (e.g., the first antenna system 550 of FIG. 5, the first antenna system 650 of FIG. 6A, the first antenna system 750 of FIG. 7A, or the first antenna system 1550 of FIG. 15C) may include at least one the first antenna radiator ①, a ground G1 electrically connected to the first antenna radiator ①, a first transmission line 2051 (e.g., the first transmission line 1551 of FIG. 15C) between the first antenna radiator ① and the at least one wireless communication 2080, a tuner 2052 (e.g., the tuner 1552 of FIG. 15C) connected to the first transmission line 2051, the first radiator extension structure 2070 or the second radiator extension structure 2082. According to an embodiment, a second antenna system 1760 (e.g., the second antenna system 560 of FIG. 5, the second antenna system 660 of FIG. 6A, the second antenna system 760 of FIG. 7A, or the second antenna system 1560 of FIG. 15B) may include at least one of the second antenna radiator ②, a ground G2 electrically connected to the second antenna radiator ②, a second transmission line 2061 (e.g., the second transmission line 1561 of FIG. 15C) between the second antenna radiator ② and the at least one wireless communication circuit 2080, or a switch 2062 (e.g., the switch 1562 of FIG. 15C) connected to the second transmission line 2061.

According to an embodiment, in the folded state of the electronic device 2000, the frequency adjustment circuit 2091 may include an electrical device (e.g., an inductor) having a component such as inductance, capacitance or conductance acting on the first antenna system 2050 and/or the second antenna system 2060. The frequency adjustment circuit 2091 may include the first frequency adjustment circuit 591 of FIG. 5, the frequency adjustment circuit 691 of FIG. 6A or the frequency adjustment circuit 791 of FIG. 7A, and detailed descriptions thereof are omitted.

According to an embodiment, the first radiator extension structure 2070 may include a conductive pattern electrically connected to the first antenna radiator ① and the ground G1. According to an embodiment, the second radiator extension structure 2082 may include a conductive pattern electrically connected to the first antenna radiator ①. The first antenna radiator ① receives power from the at least one wireless communication circuit 2080, and a current may be transmitted to the first antenna radiator ①, the first radiator extension structure 2070 and the second radiator extension structure 2082 and flow into the ground G1. A width of the electronic device 2000 in the folded state (e.g., see FIG. 3) may be designed restrictively in consideration of portability, and accordingly the first antenna radiator ① may have a physical length with which it is difficult to achieve the resonance frequency in a corresponding frequency band (e.g., the LB). According to an embodiment, the first radiator extension structure 2070 or the second radiator extension structure 2082 may operate as a radiator together with the first antenna radiator ①, and extend an electrical length for the first antenna radiator ①. The electrical length may refer to an electrical wavelength unit length of a line or an element against a wavelength of a frequency to use in the electronic device 2000. The electrical length may refer to a value produced by dividing a physical length by the wavelength (λ). According to some embodiment, the electrical length (or a phase length) may refer to a length of a conductive pattern (or an electrical conductor) for a phase shift exhibited by transmission through a conductor at a specific frequency. According to various embodiments, the electrical length may vary depending on the shape the length, width (or breadth), area (or extent) or shape of the conductive pattern which may be formed by the first radiator extension structure 2070 or the second radiator extension structure 2082.

According to an embodiment, the first radiator extension structure 2070 and/or the second radiator extension structure 2082 may extend the electrical length of the first antenna radiator ①, thus generating the resonance frequency for the corresponding frequency band (e.g., the LB).

According to various embodiments, at least one of the first radiator extension structure 2070 or the second radiator extension structure 2082 may be omitted.

Referring to FIG. 21, in an embodiment, a first housing structure 2110 (e.g., the first housing structure 210 of FIG. 2) may include a first side member 2111 (e.g., the first side member 2010 of FIG. 20) and/or a first internal structure 2117. The first side member 2111 may include a plurality of conductive units (e.g., a first conductive unit K1, a second conductive unit K2, and a third conductive unit K7) which are physically or electrically separated. For example, the first conductive unit K1 may be the first conductive unit A1 of FIG. 5, the second conductive unit K2 may be the second conductive unit A2 of FIG. 5 or the second conductive unit J2 of FIG. 20, and the third conductive unit K3 may be the third conductive unit A3 of FIG. 5 or the third conductive unit J3 of FIG. 20. A first insulating unit 2171 (e.g., the first insulating unit 541 of FIG. 5) may be disposed between the first conductive unit K1 and the second conductive unit K2. A second insulating unit 2172 (e.g., the second insulating unit 542 of FIG. 5) may be disposed between the second conductive unit K2 and the third conductive unit K3. According to an embodiment, the first insulating unit 2171 and/or the second insulating unit 2172 may extend from the first internal structure 2117 which is nonconductive and disposed inside the first housing structure 2110. The first internal structure 2117 may be coupled with the first side member 2111, and thus the first, second and third conductive units K1, K2, and K3 may be physically separated by the first internal structure 2117. For example, the first internal structure 2117 may be formed to be coupled with the first side member 2111 by the insert injection.

According to an embodiment, at least part of the second conductive unit K2 may be utilized as the first antenna radiator ① of FIG. 20, and at least part of the third conductive unit K3 may be utilized as the second antenna radiator ② of FIG. 20.

According to an embodiment, the first housing structure 2110 may include a first radiator extension structure 2170 (e.g., the first radiator extension structure 2070 of FIG. 20) or a second radiator extension structure 2182 (e.g., the second radiator extension structure 2082 of FIG. 20) electrically connected to the second conductive unit K2 (e.g., the first antenna radiator ① of FIG. 20). The first radiator extension structure 2170 or the second radiator extension structure 2082 may include a conductive pattern which is at least in part fixed on the first internal structure 2117. According to some embodiment, the first radiator extension structure 2170 or the second radiator extension structure 2182 may be at least in part disposed inside the first internal structure 2117.

According to an embodiment, the first radiator extension structure 2170 or the second radiator extension structure 2182 may be implemented with laser direct structuring (LDS). For example, the first radiator extension structure 2170 or the second radiator extension structure 2182 may be formed by designing a pattern on the first internal structure 2117 (e.g., a structure formed of a resin such as polycarbonate) using laser, and plating a conductive material such as copper or nickel thereon.

According to an embodiment, the second conductive unit K2 may include a first terminal 2101 or a second terminal 2102 protruding and extending from the second conductive unit K2 into the inner space of the first housing structure 2110. The first terminal 2101 may be electrically connected with the first radiator extension structure 2170. The second terminal 2102 may be electrically connected with the second radiator extension structure 2182. For example, a conductive material such as solder may electrically interconnect the first terminal 2101 and the first radiator extension structure 2170, and/or the second terminal 2102 and the second radiator extension structure 2182.

According to some embodiment, the first radiator extension structure 2170 or the second radiator extension structure 2182 may be implemented as a flexible PCB (FPCB). According to various embodiments, the first radiator extension structure 2170 or the second radiator extension structure 2182 may be implemented as various conductive paths such as a conductive pattern or a cable provided on a PCB (e.g., the first substrate 451 of FIG. 4).

According to an embodiment, the first radiator extension structure 2170 and/or the second radiator extension structure 2182 may extend the electrical length of the first antenna radiator ① including at least part of the second conductive unit (K2), thus forming the resonance frequency for the selected or designated frequency band (e.g., the LB).

Referring to FIG. 22, in an embodiment, a first housing structure 2210 (e.g., the first housing structure 210 of FIG. 2) may include a first side member 2211 (e.g., the first side member 2010 of FIG. 20) and a first PCB 2251 (e.g., the first substrate 451 of FIG. 4). The first side member 2211 may include a plurality of conductive units (e.g., a first conductive unit M1, a second conductive unit M2, and a third conductive unit M3) which are physically or electrically separated. For example, the first conductive unit M1 may be the first conductive unit A1 of FIG. 5, the second conductive unit M2 may be the second conductive unit A2 of FIG. 5 or the second conductive unit J2 of FIG. 20, and the third conductive unit M3 may be the third conductive unit A3 of FIG. 5 or the third conductive unit J3 of FIG. 20. A first insulating unit 2271 (e.g., the first insulating unit 541 of FIG. 5) may be disposed between the first conductive unit M1 and the second conductive unit M2. A second insulating unit 2272 (e.g., the second insulating unit 542 of FIG. 5) may be disposed between the second conductive unit M2 and the third conductive unit M3.

According to an embodiment, at least part of the second conductive unit M2 may be utilized as the first antenna radiator ① of FIG. 20, and at least part of the third conductive unit M3 may be utilized as the second antenna radiator ② of FIG. 20.

According to an embodiment, the first housing structure 2210 may include a first radiator extension structure 2270 (e.g., the first radiator extension structure 2070 of FIG. 20) or a second radiator extension structure 2282 (e.g., the second radiator extension structure 2082 of FIG. 20) electrically connected to the second conductive unit M2 (e.g., the first antenna radiator ① of FIG. 20). According to an embodiment, the first radiator extension structure 2270 or the second radiator extension structure 2282 may include a conductive pattern or a conductive path disposed on the first PCB 2251.

According to an embodiment, the second conductive unit M2 may include a first terminal 2201 or a second terminal 2202 protruding and extending from the second conductive unit M2 into an inner space of the first housing structure 2210. The first terminal 2201 may be electrically connected to the first radiator extension structure 2270. The second terminal 2202 may be electrically connected to the second radiator extension structure 2282.

According to various embodiments (not shown), a flexible conductive member such as a C clip, a pogo-pin, a spring, a conductive poron and rubber or a conductive tape may be disposed between the first terminal 2201 and the first radiator extension structure 2270, or between the second terminal 2202 and the second radiator extension structure 2282. The first terminal 2201 may elastically contact the first radiator extension structure 2270 by the flexible conductive member. The second terminal 2202 may elastically contact the second radiator extension structure 2282 by the flexible conductive member.

According to an embodiment, the first radiator extension structure 2270 and/or the second radiator extension structure 2282 may extend the electrical length of the first antenna radiator ① including at least part of the second conductive unit M2, thus forming the resonance frequency for the selected or designated frequency band (e.g., the LB).

Referring to FIG. 23, 2301 indicates the antenna radiation performance on the frequency distribution with respect to the first antenna radiator if the radiator extension structure is not applied. 2302 indicates the antenna radiation performance on the frequency distribution with respect to the first antenna radiator (e.g., the first antenna radiator ① of FIG. 20), if the radiator extension structure (e.g., the first or second radiator extension structure 2070 or 2082 of FIG. 20, the first or second radiator extension structure 2170 or 2182 of FIG. 21, or the first or second radiator extension structure 2270 or 2282 of FIG. 22) is applied. Referring to 2301 and 2302, the resonance frequency of the first antenna radiator is moved in the frequency band such as the LB if the radiator extension structure is applied.

Figure 24:
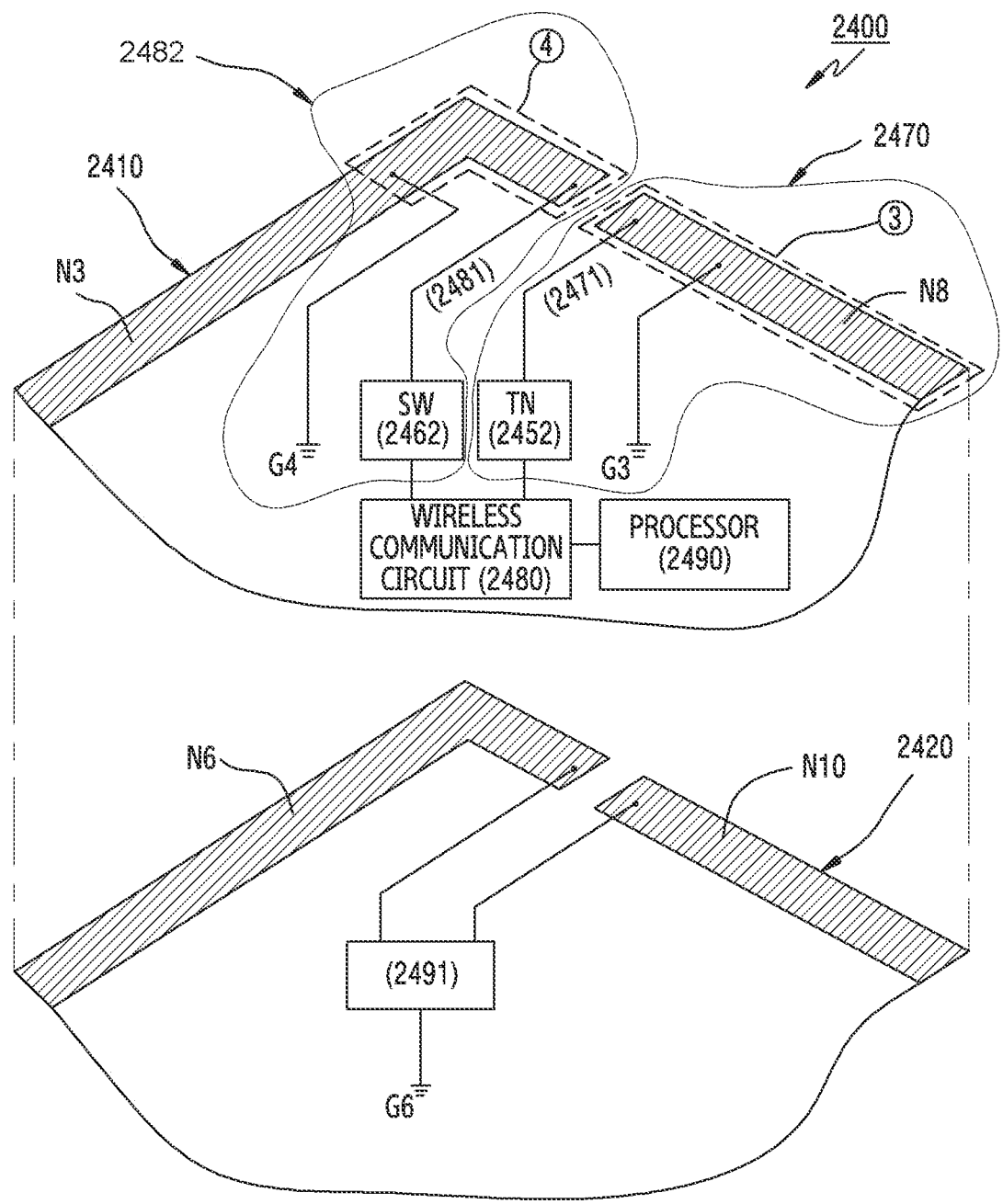
FIG. 24 illustrates a circuit of an electronic device of a folded state according to an embodiment of the disclosure.
Figure 25:
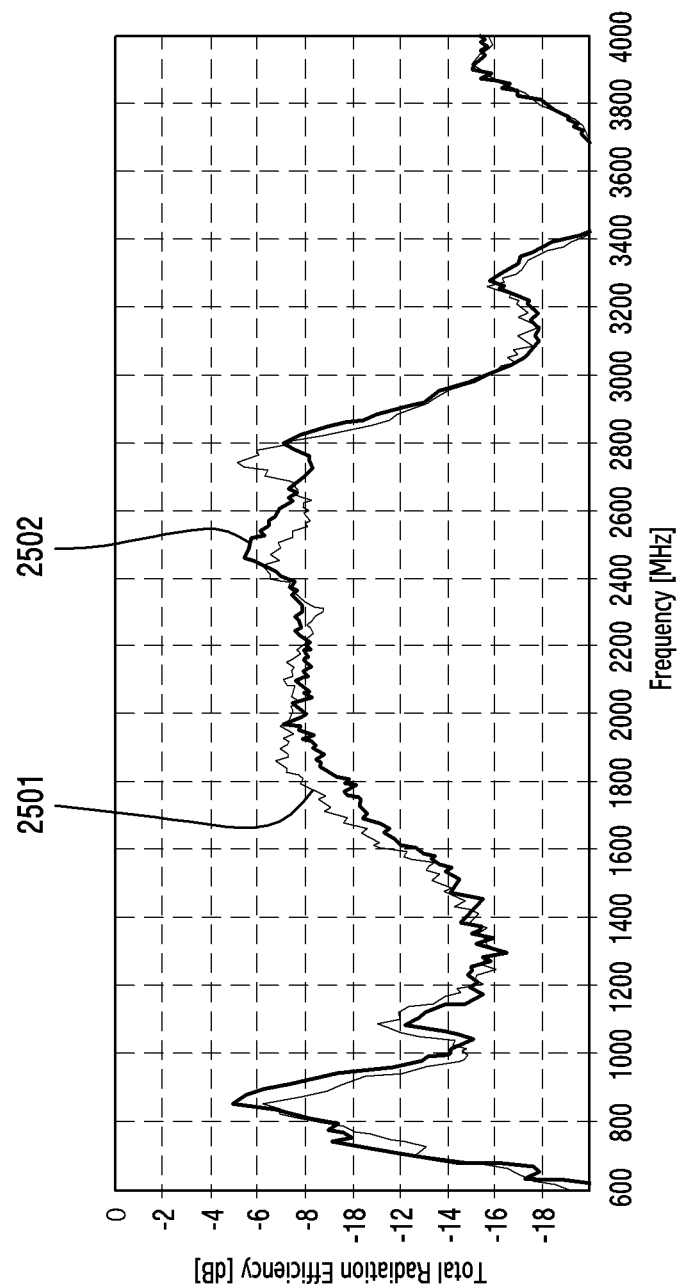
FIG. 25 is a graph showing antenna radiation performance on a frequency distribution of an antenna system according to a frequency adjustment circuit while an electronic device of FIG. 24 is folded according to an embodiment of the disclosure.

FIG. 24 illustrates a circuit of an electronic device in a folded state according to an embodiment of the disclosure. FIG. 25 is a graph showing antenna radiation performance on a frequency distribution of an antenna system according to a frequency adjustment circuit while an electronic device of FIG. 24 is folded according to an embodiment of the disclosure.

Referring to FIG. 24, in an embodiment, an electronic device 2400 (e.g., the electronic device 500 of FIG. 5) may include at least one of a first side member 2410 (e.g., the first side member 510 of FIG. 5), a second side member 2420 (e.g., the second side member 520 of FIG. 5), at least one wireless communication circuit 2480 (e.g., the at least one wireless communication circuit 580 of FIG. 5), a processor 2490 (e.g., the processor 590 of FIG. 5) or a frequency adjustment circuit 2491.

According to an embodiment, a third antenna radiator ③ (e.g., the third antenna radiator ③ of FIG. 5) may be formed as at least part of an eighth conductive unit N8 (e.g., the eighth conductive unit A8 of FIG. 5) included in the first side member 2410. A fourth antenna radiator ④ (e.g., the fourth antenna radiator ④ of FIG. 5) may be formed as at least part of a third conductive unit N3 (e.g., the third conductive unit A3 of FIG. 5) included in the first side member 2410. A tenth conductive unit N10 (e.g., the tenth conductive unit A10 of FIG. 5) of the second side member 2420 may be disposed close to the third antenna radiator ③ in the folded state of the electronic device 2400. A sixth conductive unit N6 (e.g., the sixth conductive unit A6 of FIG. 5) of the second side member 2420 may be disposed close to the fourth antenna radiator ④ in the folded state of the electronic device 2400.

According to an embodiment, the electronic device 2400 may include a third antenna system 2470 or a fourth antenna system 2482 electrically connected to the at least one wireless communication circuit 2480. The third antenna system 2470 (e.g., the third antenna system 570 of FIG. 5) may include at least one of the third antenna radiator ③, a ground G3 (e.g., the ground G3 of FIG. 5) electrically connected to the third antenna radiator ③, a third transmission line 2471 (e.g., the third transmission line 571 of FIG. 5) between the third antenna radiator ③ and the wireless communication circuit 2480, or a tuner 2452 (e.g., the tuner 652 of FIG. 6A) connected to the third transmission line 2471. The fourth antenna system 2482 (e.g., the fourth antenna system 582 of FIG. 5) may include at least one of the fourth antenna radiator ④, a ground G4 (e.g., the ground G4 of FIG. 5) electrically connected to the fourth antenna radiator ④, a fourth transmission line 2481 (e.g., the fourth transmission line 581 of FIG. 5) between the fourth antenna radiator ④ and the wireless communication circuit 2480, or a switch 2462 (e.g., the switch 662 of FIG. 6A) connected to the fourth transmission line 2481.

According to an embodiment, the frequency adjustment circuit 2491 (e.g., the second frequency adjustment circuit 592 of FIG. 5) may include, in the folded state of the electronic device 2400, an electrical element (e.g., an inductor) having the component such as inductance, capacitance or conductance acting on the third antenna system 2470 and/or the fourth antenna system 2482. The frequency adjustment circuit 2491 may include the frequency adjustment circuit 691 of FIG. 6A or the frequency adjustment circuit 791 of FIG. 7A, and detailed descriptions thereof are omitted.

Referring to FIGS. 24 and 25, 2501 indicates the antenna radiation performance on the frequency distribution of the third antenna system 2470, if the tenth conductive unit N10 (e.g., the tenth conductive unit A10 of FIG. 5) controls the frequency adjustment circuit 2491 not to electrically connect the ground G6 (e.g., the ground G6 of FIG. 5) in the folded state of the electronic device 2400. 2502 indicates the antenna radiation performance on the frequency distribution of the third antenna system 2470, if the tenth conductive unit N10 controls the frequency adjustment circuit 2491 to electrically connect the ground G6 through at least one lumped element (e.g., an inductor) in the folded state of the electronic device 2400. If the tenth conductive unit N10 is electrically connected to the ground G6 through the at least one lumped element, the component such as inductance, capacitance or conductance of the at least one lumped element may act on the third antenna system 2470. Referring to 2501 and 2502, if the tenth conductive unit N10 is electrically connected to the ground G6 through the at least one lumped element, the antenna radiation performance for the third antenna system 2470 may be improved in at least some frequency band.

Figure 26:
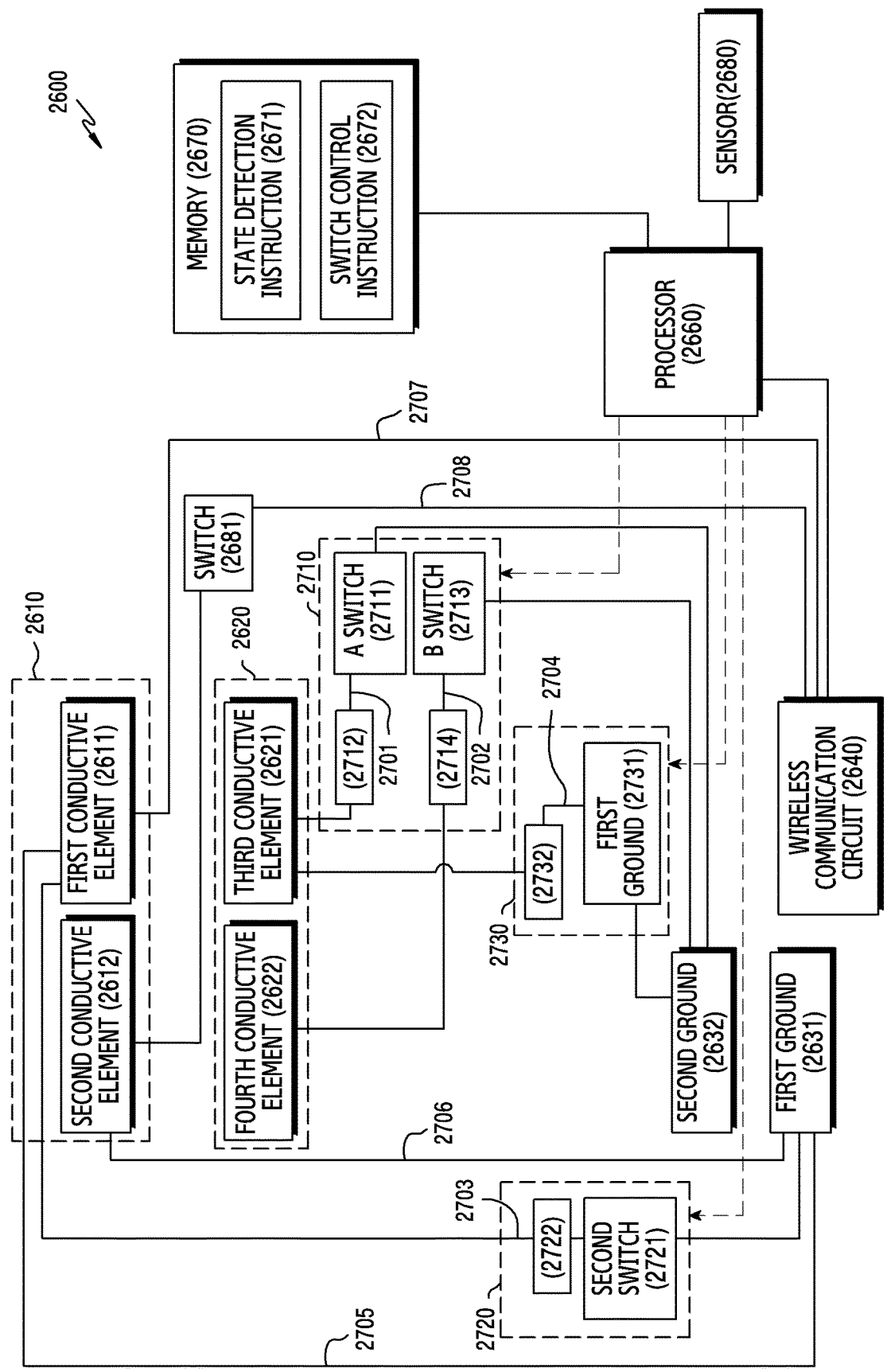
FIG. 26 is a block diagram of an electronic device including a frequency adjustment circuit according to an embodiment of the disclosure.

FIG. 26 is a block diagram of an electronic device including a frequency adjustment circuit according to an embodiment of the disclosure. FIG. 27 is a table for explaining control on a frequency adjustment circuit of FIG. 26 according to an embodiment of the disclosure.

Referring to FIG. 26, an electronic device 2600 (e.g., the electronic device 101 of FIG. 1, the electronic device 20 of FIG. 2, the electronic device 500 of FIG. 5, the electronic device 600 of FIG. 6A, the electronic device 700 of FIG. 7A, the electronic device 1500 of FIG. 15A, the electronic device 1700 of FIG. 17A, the electronic device 2000 of FIG. 20, or the electronic device 2400 of FIG. 24) may include at least one of a first conductive element 2611 and a second conductive element 2612 included a first housing structure 2610 (e.g., the first side member 510 of FIG. 5), a third conductive element 2621 and a fourth conductive element 2622 included in a second housing structure 2620, a first ground 2631, a second ground 2632, a wireless communication circuit 2640, a first frequency adjustment circuit 2710, a second frequency adjustment circuit 2720, a third frequency adjustment circuit 2730, a processor 2660, a memory 2670, or at least one sensor 2680.

According to an embodiment, at least part of the first conductive element 2611 may be electrically connected to the wireless communication circuit 2640 to operate as a first antenna radiator (e.g., the first antenna radiator ① of FIG. 5). According to an embodiment, at least part of the second conductive element 2612 may be electrically connected to the wireless communication circuit 2640 to operate as a second antenna radiator (e.g., the second antenna radiator ② of FIG. 5).

According to an embodiment, the third conductive element 2621 may be disposed close to the first conductive element 2611, in the folded state of the electronic device 2600 (e.g., see FIG. 3). According to an embodiment, the fourth conductive element 2622 may be disposed close to the second conductive element 2612, in the folded state of the electronic device 2600.

According to various embodiments, the first conductive element 2611 may be the second conductive unit A2 of FIG. 5, the second conductive unit B2 of FIG. 6A, the second conductive unit C2 of FIG. 7A, the second conductive unit E2 of FIG. 15A, the second conductive unit H2 of FIG. 17A, the second conductive unit J2 of FIG. 20, or the eighth conductive unit N8 of FIG. 24. According to an embodiment, the second conductive element 2612 may be the third conductive unit A3 of FIG. 5, the third conductive unit B3 of FIG. 6A, the third conductive unit C3 of FIG. 7A, the third conductive unit E3 of FIG. 15A, the third conductive unit H3 of FIG. 17A, the second conductive unit J3 of FIG. 20, or the third conductive unit N3 of FIG. 24.

According to an embodiment, the third conductive element 2621 may be the fifth conductive unit A5 of FIG. 5, the fifth conductive unit B5 of FIG. 6A, the fifth conductive unit C5 of FIG. 7A, the fifth conductive unit E5 of FIG. 15A, the fifth conductive unit H5 of FIG. 17A, the fifth conductive unit J5 of FIG. 20, or the tenth conductive unit N10 of FIG. 24. According to an embodiment, the fourth conductive element 2622 may be the sixth conductive unit A6 of FIG. 5, the sixth conductive unit B6 of FIG. 6A, the sixth conductive unit C6 of FIG. 7A, the sixth conductive unit E6 of FIG. 15A, the sixth conductive unit H6 of FIG. 17A, the sixth conductive unit J6 of FIG. 20, or the sixth conductive unit N6 of FIG. 24.

According to an embodiment, at least part of the first ground 2631 may be a ground G1, G2, G3, G4, G7 or G8 included in a first ground layer or a first ground plane (e.g., the first PCB 501 of FIG. 5) accommodated in the first housing structure 2610. According to an embodiment, at least part of the second ground 2632 may be a ground G5, G6, G9 or G10 included in a second ground layer or a second ground plane (e.g., the second PCB 502 of FIG. 5) accommodated in the second housing structure 2620.

According to an embodiment, the first ground 2631 may be electrically connected to the first conductive element 2611 through at least one fifth electrical path 2705. According to an embodiment, the first ground 2631 may be electrically connected to the second conductive element 2612 through at least one sixth electrical path 2706. The first ground 2631 may serve as an antenna ground for an antenna radiator (e.g., the first conductive element 2611 and/or the second conductive element 2612). According to various embodiments, the first ground 2631 and the second ground 2632 may be electrically connected. For example, referring to FIG. 5, the electronic device 500 may include a connection member such as an FPCB which electrically interconnects the first printed circuit board 501 and the second printed circuit board 502, and the connection member may be disposed across the hinge structure 530. The first ground 2631 and the second ground 2632 may be electrically connected through at least part of the connection member.

The wireless communication circuit 2640 may establish communication between, for example, the electronic device 2500 and an external electronic device (e.g., the electronic device 102 or 104 or the server 108 of FIG. 1). For example, the wireless communication circuit 2640 may be connected to a network (e.g., the first network 198 or the second network 199 of FIG. 1) through wireless communication to communicate with the external electronic device.

According to an embodiment, the wireless communication circuit 2640 may be electrically connected to the first conductive element 2611 through the seventh electrical path 2707, and the first conductive element 2611 may be utilized as a first antenna radiator (e.g., the first antenna radiator ①, or the third antenna radiator ③ of FIG. 5). The wireless communication circuit 2640 may transmit or receive a signal of a first frequency band, through the first antenna radiator including at least part of the first conductive element 2611.

According to an embodiment, the wireless communication circuit 2640 may be electrically connected to the second conductive element 2612 through the eighth electrical path 2708, and the second conductive element 2612 may be utilized as a second antenna radiator (e.g., the second antenna radiator ②, or the fourth antenna radiator ④ of FIG. 5). The wireless communication circuit 2640 may transmit or receive a signal of a second frequency band, through the second antenna radiator including at least part of the second conductive element 2612.

According to various embodiments, the electronic device 2600 may include a fourth switch 2801 (e.g., the switch 662 of FIG. 6A) connected to the eighth electrical path 2708 between the wireless communication circuit 2640 and the second conductive element 2612. The second conductive element 2612 may be electrically connected to the wireless communication circuit 2640 if the fourth switch 2681 is turned on, and may be electrically separated from the wireless communication circuit 2640 if the fourth switch 2681 is turned off.

According to an embodiment, the wireless communication circuit 2640 may include at least one of a cellular module, a WiFi module, a Bluetooth module, a GNSS module (e.g., a global positioning system (GPS) module, a Glonass module, a Beidou module, or a Galileo module), a near field communication (NFC) module or an RF module.

The cellular module may include, for example, a voice call, a video call, a text service, or an Internet service through a communication network. According to an embodiment, the cellular module may distinguish and authenticate the electronic device 2600 in the communication network using a subscriber identification module (e.g., the subscriber identification module 196 of FIG. 1). According to an embodiment, the cellular module may perform at least some function of functions included in the processor 2660. According to an embodiment, the cellular module may include a communication processor (CP).

The WiFi module, the Bluetooth module, the GNSS module or the NFC module each may include, for example, a processor for processing data transmitted and received through a corresponding module. According to some embodiment, at least some (e.g., two or more) of the cellular module, the WiFi module, the Bluetooth module, the GNSS module or the NFC module may be included in one integrated chip (IC) or IC package.

The RF module may transmit and receive, for example, a communication signal (e.g., an RF signal). The RF module may include, for example, at least one of a transceiver, a power amp module (PAM), a frequency filter or a low noise amplifier (LNA). According to another embodiment, at least one of the cellular module, the WiFi module, the Bluetooth module, the GNSS module or the NFC module may transmit and receive an RF signal through a separate RF module.

According to an embodiment, the wireless communication circuit 2640 (e.g., the wireless communication module 192 of FIG. 1) may support communication of various types (e.g., the first network 198 or the second network 199 of FIG. 1) by utilizing the first conductive element 2611 and/or the second conductive element 2612 as the antenna radiator. The wireless communication circuit 2640 may transmit and/or receive the RF signal through the first conductive element 2611 and/or the second conductive element 2612. The wireless communication circuit 2640 may include various RF components (e.g., an RFIC, a front end module (FEM)) between the antenna radiator (e.g., the first conductive element 2611 or the second conductive element 2612) and the processor 2660.

For example, in the radio signal reception, the wireless communication circuit 2640 (e.g., an RFIC) may receive a radio signal from the first conductive element 2611 and/or the second conductive element 2612, convert the received radio signal into a baseband signal, and transmit the converted baseband signal to the processor 2660. The processor 2660 may process the received baseband signal, and control a human/mechanical interface of the electronic device 2600 corresponding to the received baseband signal. For example, in the radio signal transmission, the processor 2660 may generate and output a baseband signal to the wireless communication circuit 2640. The wireless communication circuit 2640 may receive a baseband signal from the processor 2660, convert the received baseband signal into a radio signal, and transmit it over the air through the first conductive element 2611 and/or the second conductive element 2612.

For example, the wireless communication circuit 2640 (e.g., an FEM) may include a transmission/reception device for controlling the radio signal. The wireless communication circuit 2640 may connect at least one antenna and the RFIC and separate transmission and reception signals. For example, the FEM may server as filtering and amplification, and may include a receiving stage front end module which embeds a filter for filtering the received signal, and a transmitting stage front end module which embeds a power amplifier module (PAM) for amplifying the transmit signal.

According to various embodiments, the wireless communication circuit 2640 may support at least one communication scheme of single input multiple output (SIMO), multiple input single output (MISO), diversity or multiple input multiple output (MIMO) using the first conductive element 2611 and/or the second conductive element 2612.

According to various embodiments, the wireless communication circuit 2640 may process a transmit signal or a receive signal in at least one designated frequency band by using the first conductive element 2611 and/or the second conductive element 2612. For example, the designated frequency band may include at least one of the LB (about 600~1 GHz), the MB (about 1~2.2 GHz), the HB (about 2.2~2.7 GHz) or the UHB (about 2.7~3.6 GHz).

According to an embodiment, the processor 2660 may be electrically connected with the wireless communication circuit 2640, the fourth switch 2801, the first frequency adjustment circuit 2710, the second frequency adjustment circuit 2720, the third frequency adjustment circuit 2730, the memory 2670 and/or the at least one sensor 2680. The processor 2660 may control the fourth switch 2801, the first frequency adjustment circuit 2710, the second frequency adjustment circuit 2720, or the third frequency adjustment circuit 2730 according to instructions stored in the memory 2670.

The memory 2670 may store, for example, instructions for the processor 2660 to control the fourth switch 2801, the first frequency adjustment circuit 2710, the second frequency adjustment circuit 2720, or the frequency adjustment circuit 2730. According to an embodiment, the memory 2670 may store at least one of a state detection instruction 2671 or a switch control instruction 2672.

According to an embodiment, the state detection instruction 2671 may include routines for the processor 2660 to detect the unfolded state (e.g., see FIG. 2) or the folded state (e.g., see FIG. 3) of the electronic device 2600 using the at least one sensor 2680.

According to an embodiment, the at least one sensor 2680 may include a proximity sensor (e.g., the proximity sensor disposed in the component mounting area 214 of the first housing structure 210, in FIG. 2). For example, if the electronic device 2600 is in the folded state (e.g., see FIG. 3), the proximity sensor disposed in the first housing structure 2610 may output an electrical signal relating to the proximity of the second housing structure 2620.

According to another embodiment, the at least one sensor 2680 may include a hall IC. For example, the first housing structure 2610 may include the hall IC, and the second housing structure 2620 may include a magnet. If the electronic device 2600 is in the folded state (e.g., see FIG. 3), the hall IC disposed in the first housing structure 2610 and the magnet disposed in the second housing structure 2620 may be aligned, and the hall IC may recognize the magnet and output an electrical signal.

According to another embodiment, the at least one sensor 2680 may include an image sensor (e.g., the front camera disposed in the component mounting area 214 of the first housing structure 210, in FIG. 2). For example, the image sensor disposed in the first housing structure 2610 may acquire image data related to the second housing structure 2620, and the processor 2660 may determine the unfolded state or the folded state of the electronic device 2600 based on the image data.

According to various embodiments, the unfolded state or the folded state of the electronic device 2600 may be detected, using other various sensors.

According to some embodiment, the first housing structure 2610 may include a first contact, and the second housing structure 2620 may include a second contact. If the electronic device 2600 is in the folded state (e.g., see FIG. 3), the first contact disposed on the first housing structure 2610 and the second contact disposed on the second housing structure 2620 may physically contact to conduct, and the processor 2660 may recognize the folded state based on the conduction.

According to an embodiment, the switch control instruction 2672 may include routines causing the processor 2660 to control the fourth switch 2801 based on the unfolded state or the folded state of the electronic device 2600. For example, the second conductive element 2612 may be selectively connected to the wireless communication circuit 2640 electrically based on the folded state or the unfolded state. For example, the processor 2660 may turn on the fourth switch 2801 in the unfolded state of the electronic device 2600, and turn off the fourth switch 2801 in the folded state of the electronic device 2600.

According to an embodiment, the switch control instruction 2672 may include routines causing the processor 2660 to control the fourth switch 2801 based on the communication mode. For example, the processor 690 may turn on the fourth switch 2681 in the first communication mode, and the wireless communication circuit 2640 may transmit or receive the signal of the designated frequency related to the first communication mode through the second conductive element 2612. For example, the processor 2660 may turn off the fourth switch 2861 in the second communication mode which utilizes other frequency than the first communication mode.

According to an embodiment, the first frequency adjustment circuit 2710 may include a first electrical path 2701 (e.g., the first electrical path 671 of FIG. 6A, or the first electrical path 781 of FIG. 7A) electrically connected between the third conductive element 2621 and the second ground 2632. The first frequency adjustment circuit 2710 may include an A switch 2711 (e.g., the first switch 672 of FIG. 6A) connected to the first electrical path 2701. The first frequency adjustment circuit 2710 may include a first lumped element 2712 (e.g., the first lumped element 673 of FIG. 6A, or the first lumped element 793 of FIG. 7A) connected to the first electrical path 2701. If the A switch 2711 is turned on, the third conductive element 2621 may be electrically connected to the second ground 2632 through the first lumped element 2712. If the A switch 2711 is turned off, the third conductive element 2621 may be electrically separated from the second ground 2632.

According to an embodiment, the first frequency adjustment circuit 2710 may include a second electrical path 2702 (e.g., the second electrical path 681 of FIG. 6A, or the second electrical path 782 of FIG. 7A) electrically connected between the third conductive element 2621 and the second ground 2632. The first frequency adjustment circuit 2710 may include a B switch 2713 (e.g., the second switch 682 of FIG. 6A) connected to the second electrical path 2702. The first frequency adjustment circuit 2710 may include a second lumped element 2714 (e.g., the second lumped element 683 of FIG. 6A, or the second lumped element 794 of FIG. 7A) connected to the second electrical path 2702. If the B switch 2713 is turned on, the fourth conductive element 2622 may be electrically connected to the second ground 2632 through the second lumped element 2714. If the B switch 2713 is turned off, the fourth conductive element 2622 may be electrically separated from the second ground 2632.

According to various embodiments, the A switch 2711 and the B switch 2713 may be implemented as the first switch 792 of FIG. 7A.

According to an embodiment, the switch control instruction 2672 stored in the memory 2670 may include routines causing the processor 2660 to control the A switch 2711 or the B switch 2713 according to the communication mode. The communication mode may include, for example, the first communication mode utilizing the LB (about 600~1 GHz), the second communication mode utilizing the MB (about 1~2.2 GHz), the third communication mode utilizing the HB (about 2.2~2.7 GHz), or the fourth communication mode utilizing the UHB (about 2.7~3.6 GHz). According to an embodiment, the processor 2660 turns on or off the first switch 2651 or the second switch 2652, according to the first communication mode, the second communication mode, the third communication mode, or the fourth communication mode.

According to an embodiment, the switch control instruction 2672 stored in the memory 2670 may include routines causing the processor 2660 to control the A switch 2711 or the B switch 2713 based on the unfolded state or the folded state of the electronic device 2600.

According to an embodiment, in the folded state of the electronic device 2600 (see FIG. 3), the first frequency adjustment circuit 2710 may include the first lumped element 2712 and/or the second lumped element 2714 having the component such as inductance, capacitance or conductance, thus reducing the influence of the second housing structure 2620 on the antenna radiation performance of the first conductive element 2611 and/or the second conductive element 2612.

For example, the processor 2660 may turn on the A switch 2711 in the folded state of the electronic device 2600 (see FIG. 3), and the third conductive element 2621 may be electrically connected to the second ground 2632 through the first lumped element 2712. The first lumped element 2712 may, in the folded state of the electronic device 2600, reduce the influence of the third conductive element 2621 on the antenna radiation performance of the first conductive element 2611 and/or the antenna radiation performance of the second conductive element 2612. In the folded state of the electronic device 2600, at least part of the second housing structure 2620 may be close to the first conductive element 2611 and/or the second conductive element 2612 to generate capacitance (or capacitance component) (e.g., parasitic capacitance), and a parasitic resonance frequency may be generated by the capacitance. According to an embodiment, the first lumped element 2712 may adjust the parasitic resonance frequency not to include the parasitic resonance frequency generated in the folded state of the electronic device 2600 in a parasitic resonance frequency of the first conductive element 2611 and/or the second conductive element 2612. The parasitic resonance frequency generated in the folded state of the electronic device 2600 may be moved out of the resonance frequency band of the first conductive element 2611 and/or the second conductive element 2612 by the first lumped element 2712, thus reducing degradation of the antenna radiation performance due to the parasitic resonance frequency.

According to an embodiment, at least part of the third conductive element 2621 electrically connected to the first lumped element 2712 may operate as an additional antenna radiator for transmitting or receiving the signal having the selected or designated frequency, together with the first conductive element 2611 and/or the second conductive element 2612, in the folded state of the electronic device 2600 (see FIG. 3). For example, at least part of the third conductive element 2621 may operate as the antenna radiator electromagnetically coupled with the first conductive element 2611 and/or the second conductive element 2612 in the folded state of the electronic device 2600. According to an embodiment, the first lumped element 2712 may have inductance (e.g., inductance component) for reducing capacitance (e.g., parasitic capacitance) which may occur if the third conductive element 2621 is close to the first conductive element 2611. For example, the first lumped element 2611 electrically connected to the second ground 2632 may be electrically connected to the third conductive element 2621 to operate as an inductor. According to an embodiment, the first lumped element 2712 may adjust impedance of at least part of the third conductive element 2621 to match impedance of a transmission line with respect to the first conductive element 2611 and/or the second conductive element 2612. For example, the inductance of the first lumped element 2712 may adjust the impedance of at least part of the third conductive element 2621.

For example, the processor 2660 may turn on the B switch 2713 in the folded state of the electronic device 2600 (see FIG. 3), and the fourth conductive element 2622 may be electrically connected to the second ground 2632 through the second lumped element 2714. The second lumped element 2714 may, in the folded state of the electronic device 2600, reduce the influence of the fourth conductive element 2622 on the antenna radiation performance of to the first conductive element 2611 and/or the antenna radiation performance of the second conductive element 2612. In the folded state of the electronic device 2600, at least part of the second housing structure 2620 may be close to the first conductive element 2611 and/or the second conductive element 2612 to generate capacitance (or capacitance component) (e.g., parasitic capacitance), and a parasitic resonance frequency may be generated due to the capacitance. According to an embodiment, the second lumped element 2714 may adjust the parasitic resonance frequency not to include the parasitic resonance frequency generated in the folded state of the electronic device 2600 in the parasitic resonance frequency of the first conductive element 2611 and/or the second conductive element 2612. The parasitic resonance frequency generated in the folded state of the electronic device 2600 may be moved out of the resonance frequency band of the first conductive element 2611 and/or the second conductive element 2612 by the second lumped element 2714, thus reducing degradation of the antenna radiation performance due to the parasitic resonance frequency.

According to an embodiment, at least part of the fourth conductive element 2622 electrically connected to the second lumped element 2714 may operate as an additional antenna radiator for transmitting or receiving the signal having the selected or designated frequency, together with the first conductive element 2611 and/or the second conductive element 2612 in the folded state of the electronic device 2600 (see FIG. 3).). For example, at least part of the fourth conductive element 2622 may operate as the antenna radiator electromagnetically coupled with the first conductive element 2611 and/or the second conductive element 2612 in the folded state of the electronic device 2600. According to an embodiment, the second lumped element 2714 may have inductance (or inductance component) for reducing capacitance (e.g., parasitic capacitance) which may occur if at least part of the fourth conductive element 2622 is close to the second conductive element 2612. For example, the second lumped element 2714 electrically connected to the second ground 2632 may be electrically connected to the fourth conductive element 2622 to operate as an inductor. According to an embodiment, the second lumped element 2714 may adjust impedance of at least part of the fourth conductive element 2622 to match the impedance of the transmission line with respect to the first conductive element 2611 and/or the second conductive element 2612. For example, the inductance of the second lumped element 2714 may adjust the impedance of at least part of the fourth conductive element 2622.

According to an embodiment, in the folded state of the electronic device 2600 (see FIG. 3), the frequency adjustment circuit 2710 may function to reduce the degradation of the antenna radiating performance due to the parasitic resonance frequency by moving the parasitic resonance frequency generated by at least part of the second side member 620 which is close to the first conductive element 2611 and/or the second conductive element 2612, and function to operate at least part of the second housing structure 2620 as the additional antenna radiator coupled with the first conductive element 2611 and/or the second conductive element 2612 by adjusting the impedance.

According to various embodiments, the first frequency adjustment circuit 2710 may move the resonance frequency of the first conductive element 2611 and/or the resonance frequency of the second conductive element 2612 to a designated frequency, or move it as designated in the folded state of the electronic device 20 (see FIG. 3), according to on or off of the A switch 2711 or the B switch 2713.

For example, in the folded state of the electronic device 2600 (see FIG. 3), if the A switch 2711 is turned on under the control of the processor 2660, the first lumped element 2712 may be electrically connected to the third conductive element 2621, thus reducing the resonance frequency of the parasitic component which may occur in the frequency band related to the first conductive element 2611 if the third conductive element 2621 is close to the first conductive element 2611, and/or the resonance frequency of the parasitic component which may occur in the frequency band related to the second conductive element 2612 if the fourth conductive element 2622 is close to the second conductive element 2612. In the folded state of the electronic device 2600, if the A switch 2711 is turned off under the control of the processor 2660, the third conductive element 2621 may be electrically separated from the second ground 2632. If the third conductive element 2621 is electrically separated from the second ground 2632, the impedance (or the condition of the parasitic resonance) may be changed and thus reduce the antenna radiation performance degradation of the antenna system utilizing the first conductive element 2611 and/or the second conductive element 2612 due to the parasitic resonance.

For example, in the folded state of the electronic device 2600 (see FIG. 3), if the B switch 2713 is turned on by the control of the processor 2660, the second lumped element 2714 may be electrically connected with the fourth conductive element 2622, and thus reduce the resonance frequency of the parasitic component which may occur in the frequency band related to the second conductive element 2612 if the fourth conductive element 2622 is close to the second conductive element 2612, and/or the resonance frequency of the parasitic component which may occur in the frequency band related to the first conductive element 2611 if the third conductive element 2621 is close to the first conductive element 2611. In the folded state of the electronic device 2600, if the B switch 2713 is turned off under the control of the processor 2660, the fourth conductive element 2622 may be electrically separated from the second ground 2632. If the fourth conductive element 2622 is electrically separated from the second ground 2632, the impedance (or the condition of the parasitic resonance) may be changed and thus reduce the antenna radiation performance degradation of the antenna system utilizing the first conductive element 2611 and/or the second conductive element 2612 due to the parasitic resonance.

Referring to FIGS. 26 and 27, in an embodiment, if executing the first communication mode related to the LB in the folded state, the electronic device 2600 may transmit or receive a signal related to the first communication mode through the first conductive element 2611 utilized as the first antenna radiator. If executing the first communication mode related to the LB in the folded state of the electronic device 2600, the processor 2660 may turn on the A switch 2711 and turn off the B switch 2713.

Referring to FIGS. 26 and 27, in an embodiment, if executing the second communication mode related to the MB in the folded state, the electronic device 2600 may transmit or receive a signal related to the second communication mode through the first conductive element 2611 utilized as the first antenna radiator. If executing the second communication mode related to the MB in the folded state of the electronic device 2600, the processor 2660 may turn on the A switch 2711 and turn off the B switch 2713.

Referring to FIGS. 26 and 27, in an embodiment, if executing the second communication mode for the MB in the folded state, the electronic device 2600 may transmit or receive a signal related to the second communication mode through the second conductive element 2612 utilized as the first antenna radiator. If executing the second communication mode related to the MB in the folded state of the electronic device 2600, the processor 2660 may turn on both the A switch 2711 and the B switch 2713.

Referring to FIGS. 26 and 27, in an embodiment, if executing the third communication mode for the HB in the folded state, the electronic device 2600 may transmit or receive a signal related to the third communication mode through the second conductive element 2612 utilized as the second antenna radiator. If executing the third communication mode related to the HB in the folded state of the electronic device 2600, the processor 2660 may turn on the A switch 2711 and turn off the B switch 2713.

According to an embodiment, the second frequency adjustment circuit 2720 (e.g., the third frequency adjustment circuit 593 of FIG. 5, or the third frequency adjustment circuit 1792 of FIG. 17A) may include a third electrical path 2703 (e.g., the third electrical path 1794 of FIG. 17B) electrically connected between the first conductive element 2611 and the first ground 2631 implemented at least in part as the first antenna radiator. According to an embodiment, the second frequency adjustment circuit 2720 may include a second switch 2721 (e.g., the second switch 1793 of FIG. 17B) connected to the third electrical path 2703. The second frequency adjustment circuit 2720 may include a third lumped element 2722 (e.g., the third lumped element 1795 of FIG. 17B) connected to the third electrical path 2703.

According to an embodiment, the switch control instruction 2672 stored in the memory 2670 may include routines causing the processor 2660 to turn on or off the second switch 2721 of the second frequency adjustment circuit 2720 according to the communication mode (e.g., the first communication mode utilizing the LB, the second communication mode utilizing the MB, the third communication mode utilizing the HB, or the fourth communication mode utilizing the UHB). According to an embodiment, the switch control instruction 2672 stored in the memory 2670 may include routines causing the processor 2660 to control the second switch 2721 of the second frequency adjustment circuit 2720 based on the unfolded state or the folded state of the electronic device 2600.

According to an embodiment, in the folded state of the electronic device 2600, the second switch 2721 may be turned on, and the first conductive element 2611 may be electrically connected to the first ground 2631 through the third lumped element 2722. According to an embodiment, the third lumped element 2722 may apply the component such as inductance, capacitance or conductance to the antenna system utilizing the first conductive element 2611 and/or the second conductive element 2612, in the folded state of the electronic device 2600.

According to an embodiment, the third lumped element 2722 may move the resonance frequency of the first conductive element 2611 and/or the second conductive element 2612 to a designated frequency, or move it as designated in the folded state of the electronic device 2600. According to various embodiments, the third lumped element 2722 may reduce the electrical influence of the second housing structure 2620 on the antenna system utilizing the first conductive element 2611 and/or the second conductive element 2612 in the folded state of the electronic device 2600.

According to an embodiment, the third frequency adjustment circuit 2730 (e.g., the fifth frequency adjustment circuit 595 of FIG. 5, or the fifth frequency adjustment circuit 1592 of FIG. 17A) may include a fourth electrical path 2704 (e.g., the fourth electrical path 1594 of FIG. 15B) electrically connected between the third conductive element 2621 and the second ground 2632. According to an embodiment, the third frequency adjustment circuit 2730 may include a third switch 2731 (e.g., the third switch 1593 of FIG. 15B) connected to the fourth electrical path 2704. The third frequency adjustment circuit 2730 may include a fourth lumped element 2732 (e.g., the third lumped element 1595 of FIG. 15B) connected to the fourth electrical path 2704.

According to an embodiment, the switch control instruction 2672 stored in the memory 2670 may include routines causing the processor 2660 to turn on or off the third switch 2731 of the third frequency adjustment circuit 2730 according to the communication mode (e.g., the first communication mode utilizing the LB, the second communication mode utilizing the MB, the third communication mode utilizing the HB, or the fourth communication mode utilizing the UHB). According to an embodiment, the switch control instruction 2672 stored in the memory 2670 may include routines causing the processor 2660 to control the third switch 2731 of the third frequency adjustment circuit 2730 based on the unfolded state or the folded state of the electronic device 2600.

According to an embodiment, in the folded state of the electronic device 2600, the third switch 2731 is turned on, and the third conductive element 2621 may be electrically connected to the second ground 2632 through the fourth lumped element 2732. According to an embodiment, the fourth lumped element 2732 may apply the component such as inductance, capacitance or conductance to the antenna system utilizing the first conductive element 2611 and/or the second conductive element 2612, in the folded state of the electronic device 2600.

According to an embodiment, the fourth lumped element 2723 may move the resonance frequency of the first conductive element 2611 and/or the second conductive element 2612 to a designated frequency, or move it as designated in the folded state of the electronic device 2600. According to various embodiments, the third lumped element 2722 may reduce the electrical influence of the second housing structure 2620 on the antenna system utilizing the first conductive element 2611 and/or the second conductive element 2612 in the folded state of the electronic device 2600.

According to various embodiments, at least one of the second frequency adjustment circuit 2720 and the third frequency adjustment circuit 2730 may be omitted.

According to various embodiments, based on the technical ideas of various embodiments of the disclosure, an electronic device of other various rotation types (e.g., a slide type, a swivel type, etc.) in which at least two housings are rotatably operated by a connection unit may be implemented.

According to an embodiment of the disclosure, an electronic device (e.g., the electronic device 700 of FIG. 7A) may include a foldable housing (e.g., the foldable housing 200 of FIG. 2). The foldable housing may include a hinge structure (e.g., the hinge structure 730 of FIG. 7A), and a first housing structure (e.g., the first housing structure 210 of FIG. 2) connected to the hinge structure, and including a first surface (e.g., the first surface 2001 of FIG. 2) facing a first direction (e.g., the first direction 201 of FIG. 2), a second surface (e.g., the second surface 2002 of FIG. 2) facing a second direction (e.g., the second direction 202 of FIG. 2) opposite to the first direction, and a first side member (e.g., the first side member 710 of FIG. 7A) at least partially surrounding a space between the first surface and the second surface, and including a first conductive unit (e.g., the first conductive unit C1 of FIG. 7A), a first insulating unit (e.g., the first insulating unit 741 of FIG. 7A), a second conductive unit (e.g., the second conductive unit C2 of FIG. 7A), a second insulating unit (e.g., the second insulating unit 742 of FIG. 7A) and a third conductive unit (e.g., the third conductive unit C3 of FIG. 7A) sequentially disposed from the hinge structure. The foldable housing may include a second housing structure (e.g., the second housing structure 220 of FIG. 2) connected to the hinge structure, including a third surface (e.g., the third surface 2003 of FIG. 2) facing a third direction (e.g., the third direction 203 of FIG. 2), a fourth surface (e.g., the fourth surface 2004 of FIG. 2) facing a fourth direction (e.g., the fourth direction 204 of FIG. 2) opposite to the third direction, and a second side member (e.g., the first side member 710 of FIG. 7A) at least partially surrounding a space between the third surface and the fourth surface, and including a fourth conductive unit (e.g., the fourth conductive unit C4 of FIG. 7A), a third insulating unit (e.g., the third insulating unit 743 of FIG. 7A), a fifth conductive unit (e.g., the fifth conductive unit C5 of FIG. 7A), a fourth insulating unit (e.g., the fourth insulating unit 744 of FIG. 7A) and a sixth conductive unit (e.g., the sixth conductive unit C6 of FIG. 7A) sequentially disposed from the hinge structure, and folding with the first housing structure based on the hinge structure. The first surface may face the third surface in a folded state, the third direction may be the same as the first direction in an unfolded state, the first insulating unit and the third insulating unit may substantially align in the folded state, and the second insulating unit and the fourth insulating unit may substantially align. The electronic device may include a flexible display (e.g., the display 300 of FIG. 2) extending from the first surface to the third surface. The electronic device may include a first PCB (e.g., the first PCB 501 of FIG. 5) disposed between the first surface and the second surface, and including at least one first ground layer (e.g., the grounds G1, G2, G3, G4, G7, and G8 of FIG. 5). The electronic device may include a second PCB (e.g., the second PCB 502 of FIG. 5) disposed between the third surface and the fourth surface, and including at least one second ground layer (e.g., the grounds G5, G9, G6, and G10 of FIG. 5). The electronic device may include at least one wireless communication circuit (e.g., the wireless communication circuit 780 of FIG. 7A) disposed on the first PCB, and configured to transmit and/or receive a first signal of a first frequency band by electrically connecting a first position (e.g., the first feeding point FP1 of FIG. 7A) closer to the second insulating unit than the first insulating unit, of the second conductive unit, and a second signal of a second frequency band by electrically connecting a second position (e.g., the second feeding point FP2 of FIG. 7A) close the second insulating unit of the third conductive unit. The electronic device may include at least one first switch (e.g., the first switch 792 of FIG. 7A or 7B) including a first terminal (e.g., the first terminal 792a of FIG. 7A) electrically connected to the second ground layer, a second terminal (e.g., the second terminal 792b of FIG. 7B) electrically connected to a third position (e.g., the third grounding point GP3 of FIG. 7A or 7B) of the fifth conductive unit closer to the fourth insulating unit than the third insulating unit, and a third terminal (e.g., the third terminal 792c of FIG. 7B) electrically connected to a fourth position (e.g., the fourth grounding point GP4 of FIG. 7A or 7B) of the sixth conductive unit close to the fourth insulating unit.

According to an embodiment of the disclosure, the electronic device (e.g., the electronic device 700 of FIG. 7A) may further include at least one first passive element (e.g., the first lumped element 793 of FIG. 7A or 7B) on a first electrical path (e.g., the first electric path 781 of FIG. 7A or 7B) electrically connected between the third position and the second ground layer.

According to an embodiment of the disclosure, the electronic device (e.g., the electronic device 700 of FIG. 7A) may further include at least one second passive element (e.g., the second lumped element 794 of FIG. 7A or 7B) on a second electrical path (e.g., the second electric path 782 of FIG. 7A or 7B) electrically connected between the fourth position and the second ground layer.

According to an embodiment of the disclosure, the at least one first passive element (e.g., the first lumped element 793 of FIG. 7A), or the at least one second passive element (e.g., the second lumped element 794 of FIG. 7A) may include an inductor.

According to an embodiment of the disclosure, the electronic device (e.g., the electronic device 1700 of FIG. 17A) may further include a second switch (e.g., the second switch 1793 of FIG. 17B) including a fourth terminal (e.g., the fourth terminal 1793*a* of FIG. 17B) and a fifth terminal (e.g., the fifth terminal 1793*b* of FIG. 17B). The fourth terminal may be electrically connected to a fifth position (e.g., the fifth grounding point GP5 of FIG. 17A or 17B) between the first position of the second conductive unit and the first insulating unit. The fifth terminal may be electrically connected to the first ground layer (e.g., the ground G7 of FIG. 17A or 17B).

According to an embodiment of the disclosure, the electronic device (e.g., the electronic device 1700 of FIG. 17A) may further include at least one third passive element (e.g., the third lumped element 1795 of FIG. 17B) on a third electrical path (e.g., the third electrical path 1794 of FIG. 17A or 17B) electrically connected between the fifth position and the first ground layer.

According to an embodiment of the disclosure, the electronic device (e.g., the electronic device 1500 of FIG. 15A) may further include a third switch (e.g., the third switch 1593 of FIG. 15B) including a sixth terminal (e.g., the sixth terminal 1593*a* of FIG. 15B) and a seventh terminal (e.g., the seventh terminal 1593*b* of FIG. 15B). The sixth terminal may be electrically connected to a sixth position (e.g., the sixth grounding point GP6 of FIG. 15A or 15B) between the third position of the fifth conductive unit and the third insulating unit. The seventh terminal may be electrically connected to the second ground layer (e.g., the ground G9 of FIG. 15A or 15B).

According to an embodiment of the disclosure, the electronic device (e.g., the electronic device 1500 of FIG. 15A) may further include at least one fourth passive element (e.g., the fourth lumped element 1595 of FIG. 15B) on a fourth electrical path (e.g., the fourth electrical path 1594 of FIG. 15A or 15B) electrically connected between the sixth position and the second ground layer.

According to an embodiment of the disclosure, the electronic device (e.g., the electronic device 700 of FIG. 7A) may further include a fifth electric path (e.g., the fifth electric path 2705 of FIG. 26) electrically connected between a seventh position (e.g., the first ground point GP1 of FIG. 7A) of the second conductive unit between the first insulating unit and the first position and the first ground.

According to an embodiment of the disclosure, in the folded state, when viewed from above the second surface (e.g., the second surface 2002 of FIG. 2), the fourth conductive unit (e.g., the fourth conductive unit of FIG. 7A) may overlap at least in part the first conductive unit (e.g., the first conductive unit C1 of FIG. 7A), the fifth conductive unit (e.g., the fifth conductive unit C5 of FIG. 7A) may overlap at least in part the second conductive unit (e.g., the second conductive unit C2 of FIG. 7A), and the sixth conductive unit (e.g., the sixth conductive unit C6 of FIG. 7A) may at least in part overlap the third conducive unit (e.g., the third conductive unit C3 of FIG. 7A).

According to an embodiment of the disclosure, the first side member (e.g., the first side member 510 of FIG. 5) may form a first side surface (e.g., the first side surface 511 of FIG. 5) and a second side surface (e.g., the second side surface 521 of FIG. 5) facing opposite directions, and a third side surface (e.g., the third side surface 531 of FIG. 5) interconnecting the first side surface and the second side surface and perpendicular to the first side surface. The third conductive unit (e.g., the third conductive unit C3 of FIG. 5) may form the third side surface, part of the first side surface and part of the second side surface. The first conductive unit (e.g., the first conductive unit C1 of FIG. 5) and the second conductive unit (e.g., the second conductive unit C2 of FIG. 5) may form part of the first side surface or part of the second side surface.

According to an embodiment of the disclosure, the electronic device (e.g., the electronic device 700 of FIG. 7A) may further include a sixth electrical path (e.g., the sixth electrical path 2706 of FIG. 26) electrically connected between an eighth position (e.g., the second grounding point GP2 of FIG. 7A), of the third conductive unit, of a portion forming the third side surface and the first ground layer (e.g., the ground G2 of FIG. 7A).

According to an embodiment of the disclosure, the electronic device (e.g., the electronic device 700 of FIG. 7A) may further include at least one tuner (e.g., the tuner 752 of FIG. 7A) on a seventh electrical path (e.g., the seventh electrical path 2707 of FIG. 26) electrically connected between the first position and the at least one wireless communication circuit.

According to an embodiment of the disclosure, the electronic device (e.g., the electronic device 700 of FIG. 7A) may further include a fourth switch (e.g., the switch 762 of FIG. 7A, or the switch 2681 of FIG. 26) on an eighth electrical path (e.g., the eighth electrical path 2708 of FIG. 26) electrically connected between the second position and the at least one wireless communication circuit.

According to an embodiment of the disclosure, the fourth switch (e.g., the switch 762 of FIG. 7A) may be controlled to electrically separate the second position and the at least one wireless communication circuit in the first frequency band, and to electrically connect the second position and the at least one wireless communication in the second frequency band.

According to an embodiment of the disclosure, the electronic device (e.g., the electronic device 700 of FIG. 7A) may further include a processor (e.g., the processor 790 of FIG. 7A, or the processor 2660 of FIG. 26) electrically connected to the flexible display, the at least one wireless communication circuit, and the first switch, and a memory (e.g., the memory 2670 of FIG. 26) operatively connected with the processor. The memory may store instructions, when executed, causing the processor to control the first switch (e.g., the first switch 792 of FIG. 7A) to electrically connect the first terminal to at least one of the second terminal and the third terminal according to the first frequency band or the second frequency band, in the folded state.

According to an embodiment of the disclosure, the electronic device (e.g., the electronic device 2000 of FIG. 20) may further include at least one conductive pattern (e.g., the first radiator extension structure 2070 or the second radiator extension structure 2082 of FIG. 20, the first radiator extension structure 2170 or the second radiator extension structure 2182 of FIG. 21, or the first radiator extension structure 2270 or the second radiator extension structure 2282 of FIG. 22) disposed in a first housing structure (e.g., the first housing structure 2110 of FIG. 21, or the first housing structure 2210 of FIG. 22), and electrically connected to the second conductive unit.

According to an embodiment of the disclosure, the at least one conductive pattern (e.g., the first radiator extension structure 2170 or the second radiator extension structure 2182 of FIG. 21) may be formed in a nonconductive structure (e.g., the first internal structure 2117 of FIG. 21) disposed in the first housing structure. According to various embodiments of the disclosure, the at least one conductive pattern (e.g., the first radiator extension structure 2270 or the second radiator extension structure 2282 of FIG. 22) may be formed on the first PCB (e.g., the first PCB 2251 of FIG. 22).

According to an embodiment of the disclosure, the at least one conductive pattern (e.g., the first radiator extension structure 2070 of FIG. 20) may be electrically connected to the first ground layer (e.g., the ground G1 of FIG. 20).

According to various embodiments of the disclosure, an electronic device (e.g., the electronic device 700 of FIG. 7A) may include a foldable housing (e.g., the foldable housing 200 of FIG. 2). The foldable housing may include a hinge structure (e.g., the hinge structure 730 of FIG. 7A), and a first housing structure (e.g., the first housing structure 210 of FIG. 2) connected to the hinge structure, and including a first surface (e.g., the first surface 2001 of FIG. 2) facing a first direction (e.g., the first direction 201 of FIG. 2), a second surface (e.g., the second surface 2002 of FIG. 2) facing a second direction (e.g., the second direction 202 of FIG. 2) which is opposite to the first direction, and a first side member (e.g., the first side member 710 of FIG. 7A) which surrounds at least in part a space between the first surface and the second surface, and includes a first conductive unit (e.g., the first conductive unit C1 of FIG. 7A), a first insulating unit (e.g., the first insulating unit 741 of FIG. 7A), a second conductive unit (e.g., the second conductive unit C2 of FIG. 7A), a second insulating unit (e.g., the second insulating unit 742 of FIG. 7A) and a third conductive unit (e.g., the third conductive unit C3 of FIG. 7A) sequentially disposed from the hinge structure. The foldable housing may include a second housing structure (e.g., the second housing structure 220 of FIG. 2) connected to the hinge structure, including a third surface (e.g., the third surface 2003 of FIG. 2) facing a third direction (e.g., the third direction 203 of FIG. 2), a fourth surface (e.g., the fourth surface 2004 of FIG. 2) facing a fourth direction (e.g., the fourth direction 204 of FIG. 2) which is opposite to the third direction, and a second side member (e.g., the first second side member 720 of FIG. 7A) which surrounds at least in part a space between the third surface and the fourth surface, and including a fourth conductive unit (e.g., the fourth conductive unit C4 of FIG. 7A), a third insulating unit (e.g., the third insulating unit 743 of FIG. 7A), a fifth conductive unit (e.g., the fifth conductive unit C5 of FIG. 7A), a fourth insulating unit (e.g., the fourth insulating unit 744 of FIG. 7A) and a sixth conductive unit (e.g., the sixth conductive unit C6 of FIG. 7A) sequentially disposed from the hinge structure, and folding with the first housing structure based on the hinge structure. The first surface may face the third surface in a folded state, the third direction may be the same as the first direction in an unfolded state, the first insulating unit and the third insulating unit may substantially align in the folded state, and the second insulating unit and the fourth insulating unit may substantially align. The electronic device may include a flexible display (e.g., the display 300 of FIG. 2) extended from the first surface to the third surface. The electronic device may include a first PCB (e.g., the first PCB 501 of FIG. 5) disposed between the first surface and the second surface, and including at least one first ground layer (e.g., the grounds G1, G2, G3, G4, G7, and G8 of FIG. 5). The electronic device may include a second PCB (e.g., the second PCB 502 of FIG. 5) disposed between the third surface and the fourth surface, and including at least one second ground layer (e.g., the grounds G5, G9, G6, and G10 of FIG. 5). The electronic device may include at least one wireless communication circuit (e.g., the wireless communication circuit 780 of FIG. 7A) disposed on the first PCB, and configured to transmit and/or receive a first signal of a first frequency band by electrically connecting to a first position (e.g., the first feeding point FP1 of FIG. 7A) closer to the second insulating unit than the first insulating unit, of the second conductive unit, and a second signal of a second frequency band by electrically connecting to a second position (e.g., the second feeding point FP2 of FIG. 7A) close to the second insulating unit of the third conductive unit. The electronic device may include at least one first switch (e.g., the first switch 792 of FIG. 7A or FIG. 7B) including a first terminal (e.g., the first terminal 792a of FIG. 7A) electrically connected to the second ground layer, a second terminal (e.g., the second terminal 792b of FIG. 7B) electrically connected to a third position (e.g., the third ground point GP3 of FIG. 7A or 7B) of the fifth conductive unit closer to the fourth insulating unit than the third insulating unit, and a third terminal (e.g., the third terminal 792c of FIG. 7B) electrically connected to a fourth position (e.g., the fourth grounding point GP4 of FIG. 7A or 7B) of the sixth conductive unit close to the fourth insulating unit. The electronic device may include at least one first passive element (e.g., the first lumped element of FIG. 7A or 7B) on a first electrical path (e.g., the first electrical path 781 of FIG. 7A or 7B) electrically connected between the third position and the second ground layer. The electronic device may include at least one second passive element (e.g., the second lumped element 794 of FIG. 7A or 7B) on a second electrical path (e.g., the second electrical path 782 of FIG. 7A or 7B) electrically connected between the fourth position and the second ground layer. According to an embodiment of the disclosure, the electronic device (e.g., the electronic device 700 of FIG. 7A) may further include a processor (e.g., the processor 790 of FIG. 7A, or the processor 2660 of FIG. 26) electrically connected with the flexible display, the at least one wireless communication circuit, and the first switch, and a memory (e.g., the memory 2670 of FIG. 26) operatively connected with the processor. The memory may store instructions, when executed, causing the processor to control the first switch (e.g., the first switch 792 of FIG. 7A) to electrically connect the first terminal with at least one of the second terminal and the third terminal according to the first frequency band or the second frequency band, in the folded state.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
   a foldable housing comprising:
      a hinge structure,
      a first housing structure connected to the hinge structure, and comprising a first surface facing a first direction, a second surface facing a second direction which is opposite to the first direction, and a first side member which surrounds at least in part a space between the first surface and the second surface, and comprises a first conductive unit, a first insulating unit, a second conductive unit, a second insulating unit and a third conductive unit sequentially disposed from the hinge structure, and a second housing structure connected to the hinge structure, comprising a third surface facing a third direction, a fourth surface facing a fourth direction which is opposite to the third direction, and a second side member which surrounds at least in part a space between the third surface and the fourth surface, and comprises a fourth conductive unit, a third insulating unit, a fifth conductive unit, a fourth insulating unit and a sixth conductive unit sequentially disposed from the hinge structure, wherein the second housing structure folds with the first housing structure based on the hinge structure, the first surface faces the third surface in a folded state, the third direction is same as the first direction in an unfolded state, the first insulating unit and the third insulating unit substantially align in the folded state, and the second insulating unit and the fourth insulating unit substantially align in the folded state;

a flexible display extended from the first surface to the third surface;

a first printed circuit board disposed between the first surface and the second surface, and comprising at least one first ground layer;

a second printed circuit board disposed between the third surface and the fourth surface, and comprising at least one second ground layer;

at least one wireless communication circuit disposed on the first printed circuit board, and configured to at least one of transmit or receive:

a first signal of a first frequency band by electrically connecting to a first position of the second conductive unit, wherein the first position of the second conductive unit is closer to the second insulating unit than the first insulating unit, and a second signal of a second frequency band by electrically connecting to a second position of the third conductive unit, wherein the second position of the third conductive unit is closer to the second insulating unit than the first insulating unit;

and at least one first switch comprising:

a first terminal electrically connected to the second ground layer, a second terminal electrically connected to a third position of the fifth conductive unit, wherein the third position of the fifth conductive unit is closer to the fourth insulating unit than the third insulating unit, and a third terminal electrically connected to a fourth position of the sixth conductive unit, wherein the fourth position of the sixth conductive unit is close to the fourth insulating unit.

2. The electronic device of claim 1, further comprising:
at least one first passive element on a first electrical path electrically connected between the third position and the second ground layer.

3. The electronic device of claim 2, further comprising:
at least one second passive element on a second electrical path electrically connected between the fourth position and the second ground layer.

4. The electronic device of claim 3, further comprising:
a second switch comprising a fourth terminal and a fifth terminal, wherein the fourth terminal is electrically connected to a fifth position between the first position of the second conductive unit and the first insulating unit, and wherein the fifth terminal is electrically connected to the first ground layer.

5. The electronic device of claim 1, further comprising:
a fifth electrical path electrically connected between a seventh position of the second conductive unit, between the first insulating unit and the first position, and the first ground layer.

6. The electronic device of claim 1,
wherein, in the folded state, when viewed from above the second surface, the fourth conductive unit overlaps at least in part the first conductive unit, wherein, in the folded state, when viewed from above the second surface, the fifth conductive unit overlaps at least in part the second conductive unit, and wherein, in the folded state, when viewed from above the second surface, the sixth conductive unit overlaps at least in part the third conductive unit.

7. The electronic device of claim 1,
wherein the first side member forms a first side surface and a second side surface facing opposite directions, and a third side surface interconnects the first side surface and the second side surface and is perpendicular to the first side surface, wherein the third conductive unit forms the third side surface, part of the first side surface and part of the second side surface, and wherein the first conductive unit and the second conductive unit form part of the first side surface or part of the second side surface.

8. The electronic device of claim 7, further comprising:
a sixth electrical path electrically connected between an eighth position, of a portion which forms the third side surface, of the third conductive unit, and the first ground layer.

9. The electronic device of claim 1, further comprising:
at least one tuner on a seventh electrical path electrically connected between the first position and the at least one wireless communication circuit.

10. The electronic device of claim 1, further comprising:
a fourth switch on an eighth electrical path electrically connected between the second position and the at least one wireless communication circuit.

11. The electronic device of claim 10, wherein the fourth switch is configured to:
electrically separate the second position and the at least one wireless communication circuit in the first frequency band, and electrically connect the second position and the at least one wireless communication circuit in the second frequency band.

12. The electronic device of claim 1, further comprising:
a processor electrically connected with the flexible display, the at least one wireless communication circuit, and the first switch; and a memory operatively connected with the processor, wherein the memory stores instructions, when executed, causing the processor to control the first switch to electrically connect the first terminal with at least one of the second terminal and the third terminal according to the first frequency band or the second frequency band, in the folded state.

13. The electronic device of claim 1, further comprising:
at least one conductive pattern disposed in the first housing structure, and electrically connected to the second conductive unit.

14. The electronic device of claim 13, wherein the at least one conductive pattern is formed on the first printed circuit board, or on a nonconductive structure disposed in the first housing structure.

15. The electronic device of claim 13, wherein the at least one conductive pattern is electrically connected to the first ground layer.

16. The electronic device of claim 1, wherein at least one first switch comprises two first switches, each of the two first switches is electrically connected to the second ground layer, one of the two first switches is electrically connected to the third position, and the other one of the two first switches is electrically connected to the fourth position.

17. The electronic device of claim 1, further comprising:
a third switch comprising a sixth terminal and a seventh terminal,
wherein the sixth terminal is electrically connected to a ninth position between the third position of the fifth conductive unit and the third insulating unit, and
wherein the seventh terminal is electrically connected to the second ground layer.

18. The electronic device of claim 17, further comprising:
at least one third passive element on a ninth electrical path electrically connected between the ninth position and the second ground layer.

19. The electronic device of claim 1, further comprising:
a fifth switch comprising an eighth terminal and a ninth terminal,
wherein the eighth terminal is electrically connected to a tenth position between the first position of the second conductive unit and the first insulating unit, and
wherein the ninth terminal is electrically connected to the first ground layer.

20. The electronic device of claim 19, further comprising:
at least one fourth passive element on a tenth electrical path electrically connected between the tenth position and the first ground layer.

* * * * *